United States Patent [19]

Gupta et al.

[11] Patent Number: 5,485,409
[45] Date of Patent: Jan. 16, 1996

[54] AUTOMATED PENETRATION ANALYSIS SYSTEM AND METHOD

[75] Inventors: Sarbari Gupta, Rockville; Virgil D. Gligor, Chevy Chase, both of Md.

[73] Assignee: International Business Machines Corporation, Armonk, N.Y.

[21] Appl. No.: 875,945

[22] Filed: Apr. 30, 1992

[51] Int. Cl.$^6$ .............................. H04L 9/00; G06F 13/00
[52] U.S. Cl. ................................. 395/186; 364/DIG. 1; 364/286.4; 364/DIG. 2; 364/918.7; 395/600; 380/4
[58] Field of Search ..................... 364/580, 570, 364/918.7, 949.81, 286.4, 286.5, 286.6, 419; 395/50, 51, 61, 911, 912, 913, 914, 915, 916, 917, 918, 725; 340/825.31, 825.34; 380/4

[56] References Cited

U.S. PATENT DOCUMENTS

| | | | |
|---|---|---|---|
| 4,649,515 | 3/1987 | Thompson et al. | 395/911 X |
| 4,956,769 | 9/1990 | Smith | 364/200 |
| 5,060,279 | 10/1991 | Crawford et al. | 395/911 X |
| 5,099,436 | 3/1992 | McCown et al. | 395/911 X |
| 5,133,063 | 7/1992 | Naito et al. | 395/50 X |
| 5,161,245 | 11/1992 | Fenwick | 364/419 X |
| 5,197,004 | 3/1993 | Sobotka et al. | 364/419 |

OTHER PUBLICATIONS

Gupta et al., "Towards a Theory of Penetration-Resistant Systems and its Applications", Proc. of the 4th IEEE Workshop on Computer Security Foundations, Franconia, N.H., pp. 62–78, Jun. 1991.

Jiang et al., "Distributed System Security Research at FSD Gaithersburg", IBM Document No. FSDSS-9202, Jan. 8, 1992.

Gupta et al., "Experience with a Penetartion Analysis Method and Tool", U of MD, Electrical Engineering Department, Technical Report No. 2881, Apr. 1992.

Tsai et al., "Distributed System and Security Management with Centralized Control", 1992 EurOpen/USENIX Workshop, Jersey, U.K., Apr. 6–9, 1992.

Primary Examiner—Emanuel T. Voeltz
Assistant Examiner—Eric W. Stamber
Attorney, Agent, or Firm—Sterne, Kessler, Goldstein & Fox

[57] ABSTRACT

The present invention provides a penetration-analysis method, which (1) provides a systematic approach to penetration analysis, (2) enables the verification of penetration-resistance properties, and (3) is amenable to automation. An Automated Penetration Analysis (APA) tool is provided, to support the penetration analysis method. The penetration-analysis system and method is based on a theory of penetration-resistant computer systems, a model of penetration analysis, and a unified representation of penetration patterns. The theory consists of the Hypothesis of Penetration-Resistant Systems and a set of design properties that characterize resistance to penetration. The penetration-analysis model defines a set of states, a state-invariant for penetration resistance, and a set of rules that can be applied for analyzing the penetration vulnerability of a system. An interpretation of the Hypothesis of Penetration-Resistant Systems within a given system provides the Hypothesis of Penetration Patterns, which enables the present invention to define a unified representation for a large set of penetration instances as missing check patterns.

6 Claims, 31 Drawing Sheets

***COPYSEG***

ENTRY POINT: USTAT
PATHCOND: USTAT: MP < MOUNT
USTAT: (MP->M_DEV==U.U_AP->DEV)
USTAT: (SIZEOF(INO_T)) ⇒ COPYSEG: (CNT)
USTAT: (SIZEOF(DADDR_T)) ⇒ COPYSEG: (CNT)
USTAT: (U.U_AP->BUF) ⇒ COPYSEG: (DST)
USTAT: (&FP->S_TFREE) ⇒ COPYSEG: (SRC)
USTAT: → COPYSEG

AUTOMATED PENETRATION ANALYSIS SYSTEM AND METHOD

DESCRIPTION

1. Technical Field

The present invention relates generally to a system and method for assessing the adequacy of security and privacy protection mechanisms in operational computer systems and, more particularly, to a system and method for searching for software flaws that may cause penetration scenarios in an operating system.

2. Background Art

Computer system security involves protecting resources, such as data and machines, from unauthorized disclosure, modification, and denial of service in computer and communication systems. The presence of protection mechanisms does not guarantee security. If there are errors or design flaws in the operating system, processes may be able to acquire unauthorized access to objects or bypass the protection mechanisms. For example, a user may be able to bypass an authorization list for a file stored on disk by issuing I/O requests directly to the disk.

The penetration-resistance of a computer system is a separate security concern from that of supporting access control and accountability policies. Different systems may exhibit the same degree of penetration resistance, but implement widely different access control or accountability policies, or may implement the same policies, but exhibit different degrees of penetration resistance. Furthermore, not only the effectiveness of these policies, but that of other policies, such as that of system availability, depend on the penetration-resistance of a system.

Penetration analysis (sometimes called a "tiger team" approach) has helped locate security weaknesses. But like program testing, it does not prove the absence of flaws. In general, it is not possible to prove an arbitrary system is secure. However, it is possible to build provably secure systems. The key is to integrate the verification of a system into its specification, design, and implementation.

Penetration is a "technique for assessing the adequacy of security and privacy protection mechanisms in operational computer systems." All successful penetration analyses documented in the literature to date have used some variant of the Flaw Hypothesis Methodology (FHM) (see Ames et al., *TENEX Security Enhancements*, Tech. Rpt., MITRE—BBN TENEX Project (March 1976); Attanasio et al., *Penetrating an Operating System: A Study of VM/370 Integrity*, IBM Systems J. 15:1, pp. 102–116 (1976); Belady et al., *Experiments with Secure Resource Sharing for Virtual Machines*, Proc. Int'l Workshop on Protection in Operating Systems, IRIA/LABORIA, Rocquencourt, Le Chesnay, France (August 1974); Hebbard et al., *A Penetration Analysis of the Michigan Terminal System*, Operating Systems Rev. 14:1 (1980); and Wilkinson et al., *A Penetration Analysis of Burroughs Large System*, Operating System Review, 15:1 (1981)). In FHM, "flaw hypothesis" for a system are generated in a mostly ad-hoc manner and then confirmed by scenarios of actual system tests generated by the penetration analyst (Galie et al., *Security Analysis of the Texas Instruments Inc. Advanced Scientific Computer*, System Develop. Corp. Tech. Memo. TM-WD-6505/000/00 (June 1975); and Linde et al., *EXEC-8 Security Analysis*, Naval Res. Lab., Memo. Rep. 3205 (January 1976)). This is somewhat unsatisfactory for at least two reasons. First, systematic ways to generate and test the flaw hypotheses are generally unavailable in FHM. Therefore, the penetration resistance of any system area, such as the kernel or specific system processes, cannot be asserted. Second, FHM neither includes any automated tools for flaw-hypothesis generation and testing nor lends itself to development of such tools because the level of abstraction at which it is meant to be used is too high. Therefore, any assessment of a system's penetration resistance would have to rely on the special skills of the penetration analyst in the context of that system. Noteworthy attempts to improve the status quo in penetration analysis include the early efforts at the Rand Corporation (Hollingworth et al., *Security Test and Evaluation Tools: an Approach to Operating System Security Analysis*, The Rand Corporation, P-5298 (Sept. 1974)), the USC Information Sciences Institute (Carlstedt et al., *Pattern-Directed Protection Evaluation*, USC/Information Science Institute, ISI/RR-75-31 (June 1975)) (which advocated the use of automated tools for flaw detection and confirmation), the Multics kernel design project (Clark, D. D., *Ancillary Reports: Kernel Design Project*, MIT—TM87 (June 1977)), and Millen's analysis of the isolation requirements for a security kernel at MITRE Corporation (Millen, J. K., *Kernel Isolation for the PDP—11/70*, Proc. of the IEEE Symp. on Security and Privacy, pp. 57–65, Oakland, Calif. (April 1982)). At present, development of neither penetration-analysis tools nor concrete models or methodology on which such tools can be based has been reported. FHM appears to be the only practical method available to date for penetration analysis, and therefore, its use by security practitioners continues to be valuable.

Disclosure of Invention

The present invention provides a new penetration-analysis method, which (1) provides a systematic approach to penetration analysis, (2) enables the verification of penetration-resistance properties, and (3) is amenable to automation. An Automated Penetration Analysis (APA) tool is provided, to support the penetration analysis method.

The penetration-analysis method is based on a theory of penetration-resistant computer systems, a model of penetration analysis, and a unified representation of penetration patterns. The theory consists of the Hypothesis of Penetration-Resistant Systems and a set of design properties that characterize resistance to penetration. The penetration-analysis model defines a set of states, a state-invariant for penetration resistance, and a set of rules that can be applied for analyzing the penetration vulnerability of a system. An interpretation of the Hypothesis of Penetration-Resistant Systems within a given system provides the Hypothesis of Penetration Patterns, which enables the present invention to define a unified representation for a large set of penetration instances as missing check patterns.

The Hypothesis of Penetration-Resistant Systems states that a system (e.g., a Trusted Computer Base (TCB)) is largely resistant to penetration if it adheres to a specific set of design properties. The set of design properties, which are called the penetration-resistance properties, include: System Isolation (or Tamperproofness), System Noncircumventability, Consistency of System Global Variables and Objects, Timing Consistency of Condition (Validation) Checks, and Elimination of Undesirable System/User Dependencies.

The penetration-resistance properties are captured in the penetration-analysis model by the model constants and the state-transition rules. The model is a state-transition model based on the policy that a system entity may be altered or viewed, or a system internal function may be invoked, only if the set of conditions associated with the alter/view/invoke access specified by penetration-resistance properties are validated in an atomic sequence (with the alter/view/invoke operation itself). The model defines a system state as the set of integrated flow paths traversed by the system up to a certain point in time, a state invariant for penetration resistance, and a set of state transition rules that define secure state transforms.

The Hypothesis of Penetration Patterns suggests that system flaws, which are caused by incorrect implementation of the penetration-resistance properties, can be identified in system (e.g., TCB) source code as patterns of incorrect/absent validation-check statements or integrated flows that violate the intended design or code specifications.

The present invention provides an automated penetration analysis system for a C language Unix-type operating system TCB. It is designed to search for software flaws that may cause penetration scenarios in an operating system. This is done using the concepts of flow integration and pattern-directed search. The source code of the target TCB is first converted to a set of PROLOG facts. These PROLOG facts are then compounded using a flow-based integration tool to generate all possible execution paths within the target operating system source code. Each execution path records the information flows, the function calls and returns, and the conditions validated along that path. The integrated flow paths are then passed to a Flaw Detection Module that searches for defined "flaws" that may cause the operating system to be vulnerable to penetration attacks. Such an analysis allows a greater assurance of the penetration resistance of the target operating system.

BRIEF DESCRIPTION OF DRAWINGS

The foregoing and other features and advantages of the invention will be apparent from the following more particular description of preferred embodiments of the invention, as illustrated in the accompanying drawings, in which:

FIGS. 13A-1 and 13A-2 and FIG. 13(b) illustrate one of the integrated paths that alters the global variable mount → m_dev, and the penetration scenario within the TCB;

FIGS. 14 A-1 and 14A-2 and FIG. 14(b) illustrate an integrated flow path originating at the msgsnd system call and leading to an alteration of the message queue table, and the resulting scenario of penetration;

BEST MODE FOR CARRYING OUT THE INVENTION

Figure 1:
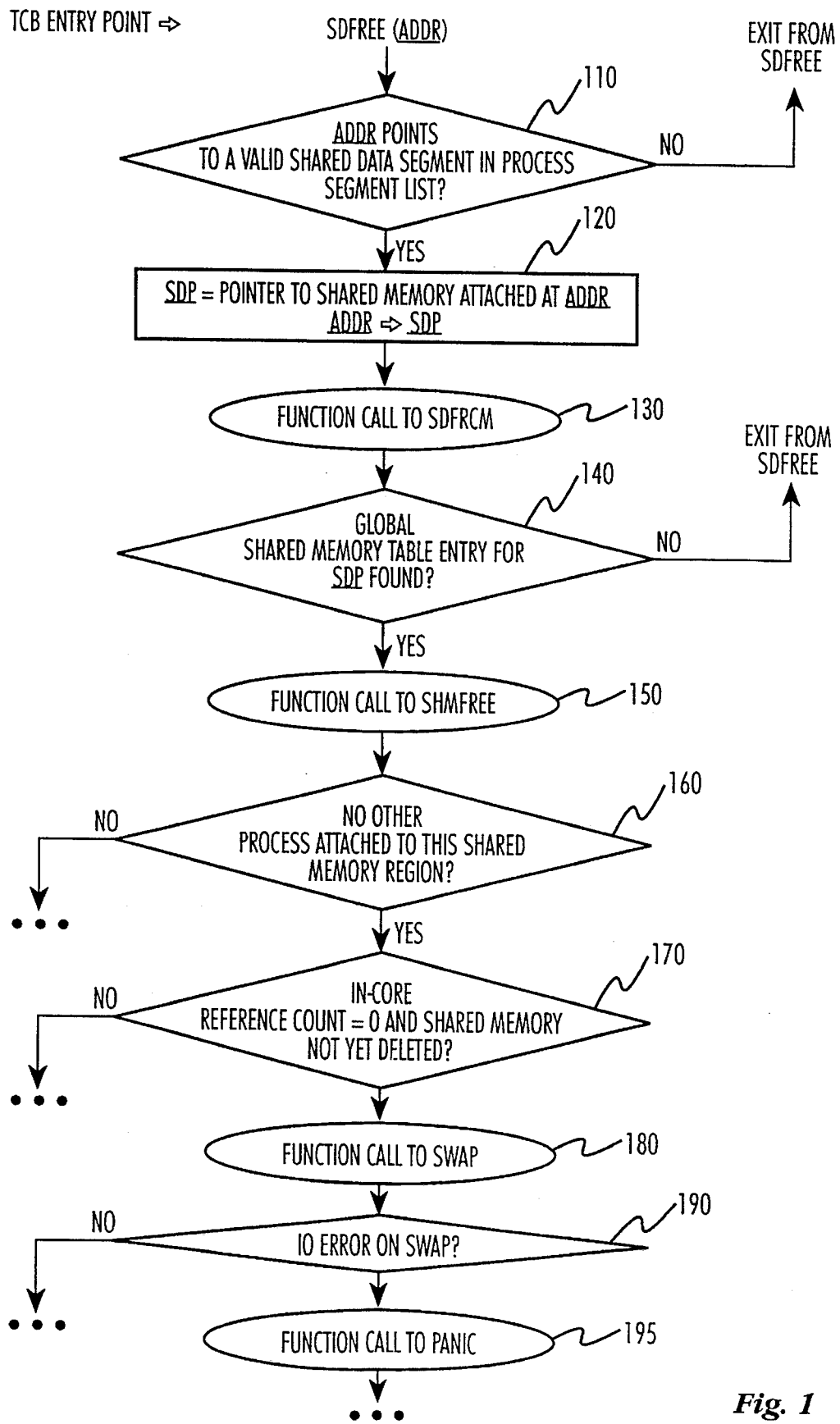
FIG. 1 illustrates an integrated flow path associated with a sdfree UNIX™ system call.

The present invention is governed by a theory of penetration-resistant computer systems. The theory is based on a set of formalized design properties that characterize resistance to penetration. Moreover, the present invention also provides a means of representing a varied set of penetration scenarios within a unified framework. By separating the security/integrity policy-enforcement mechanisms of a system from the mechanisms necessary to protect the system itself, and by using the unified representation framework, an extensible model for penetration analysis which is used to implement automated tools for penetration analysis is developed.

The boundary of a system that is subject to penetration analysis can be viewed as the boundary of a Trusted Computing Base (TCB). A TCB is defined as the totality of protection mechanisms within a computer system—including hardware, firmware, and software—the combination of which is responsible for enforcing a security policy. A TCB consists of one or more components that together enforce a unified security policy over a product or system. The ability of a TCB to correctly enforce a security policy depends solely on the mechanisms within the TCB and on the correct input by system administrative personnel of parameters (e.g., a user's clearance) related to the security policy (DoD Computer Security Center, CSC-STD-001-83 (Aug. 15, 1983)).

In should be noted that the theory, model, and tools of the present invention do not address system penetration caused by administrative subversion, by inadequate design of the hardware base, by system failures, or by insertion of miscreant code into tools necessary for system generation, distribution, or installation. Instead, they address system penetration patterns caused by unprivileged users' code interactions with a system. The class of penetration patterns that can be discovered can be characterized precisely within the model.

Analysis of the penetration-analysis system and method leads to three general observations. First, the penetration resistance of a computer system may not rely exclusively on the penetration resistance of its Reference Monitor Mechanism (see Anderson, J, *Computer Security Technology Planning Study Volume* 2, NTIS: AD-772 806, NTIS, (October 1972); National Computer Security Center, *Trusted Computer System Evaluation Criteria*, DoD STD-5200.28, (December 1985)), contrary to long-standing belief. Penetration resistance includes additional properties, which differ from those of the Reference Monitor Mechanism, and expands the scope of the existing Reference Monitor properties of isolation and noncircumventability. Thus, penetration analysis gains added significance in the design, implementation, and verification of secure systems beyond that of the Reference Monitor properties.

Second, the ability to verify penetration resistance using source code depends on the ability to correctly derive validation-check specifications—which are required to determine the correctness of source code—from abstract penetration-resistance properties. This derivation is dependent on the design and programming disciplines used in system development. For example, parameter validation checks may depend on the semantics of the system call, object type, and parameter type used; validation checks for trusted processes may depend on the privilege acquisition and inheritance disciplines used. These dependencies suggest that the use of certain design and programing disciplines may in fact aid the analysis of penetration-resistant systems.

Third, the penetration analysis of a computer system can follow a similar assurance process as that for access-control and accountability policies. For example, (1) the penetration-resistance properties must be interpreted in the internal architecture specifications of a system in an analogous manner to that used to interpret the policy models in the top-level specifications of a system (Gligor, V., *A Note on the Denial-of-Service Problem*, Proc. of the IEEE Symposium on Security and Privacy, pp. 139–49, Oakland, Calif. (April 1983); (2) the specification-to-code correspondence must be performed to show that the penetration-resistance properties are preserved by source code in an analogous manner to that used to show that access-control invariants are preserved by source code (National Computer Security Center, *Security Testing Guidelines*, NCSC-TG-023, (Draft) (October 1989); and (3) penetration testing must be performed to show that the penetration-resistance properties are preserved by object code produced by a (trusted) translator. Thus, the degree of assurance required for penetration resistance need not differ from that for access control and accountability policies.

The remainder of the disclosure is organized as follows. in Section I, four examples are presented which help illustrate typical-penetration-vulnerability areas of operating systems. In Section II, a review of the theory of penetration-resistant systems is provided. In Section III, the flow based model of penetration analysis is presented. In Section IV, the application of the model is discussed. In Section V, the penetration-resistance method is presented. In Section VI, the automated penetration analysis tool structure is described. In Section VII, experiments conducted using the tool and the insights gained from these experiments is presented.

I. Examples of Penetration Patterns

In this section, four examples of UNIX™ system calls including different types of access checks are presented. These examples are used to illustrate different types of penetration patterns which unprivileged user code might exploit to penetrate systems. The examples illustrate key requirements for representing very different penetration patterns in a unified framework, which is the basis for model and tool development. These examples will be used below to illustrate the design properties that form the basis for the theory, model, and tools for penetration-resistent systems.

The unified framework for representing penetration patterns requires the definition of an-integrated flow (execution) path within a system call. An integrated flow (execution) path consists of (1) the information flows along the path, (2) the function calls and function dependencies along the path, and (3) all the conditions checked along the path. An integrated flow path starts at an entry point of a system call and follows through internal functions via call/return statements until the execution of the system call concludes.

In the following four examples, sections of four UNIX™ integrated flow paths are shown, and their significance to penetration analysis is discussed. For simplicity, only the subsets of the information flows, function calls, and conditions checked that are relevant to the discussion are illustrated in the examples. The following conventions are adopted in illustrating integrated flows: (1) the information flows are represented by rectangles, (2) the function calls and dependencies are represented by ovals, (3) the conditions checked are represented as diamond shaped boxes, and (4) the sequencing between flows, calls, and condition checks are represented by arrows.

FIG. 1 refers to the "sdfree" system call whose function is to detach the current process from the data segment specified by the parameter addr. Blocks 110 through 195 will be described next. Parameter addr is validated to point to a shared data segment in the process segment list, then the corresponding global shared memory table entry is located and the current process is detached from it. If there are no other processes attached to this data segment and the segment is still in primary memory, it is swapped out of primary memory by the function swap. If the function swap returns the error flag set, the panic function is called causing the system to crash.

This example illustrates a flow path starting from the sdfree system call to the internal function panic. Since the set of conditions checked along such a flow path does not contain any contradictory conditions, a flaw exists in the system which can be exploited by an unprivileged user either directly or indirectly to cause denial of service to other users.

Figure 2:
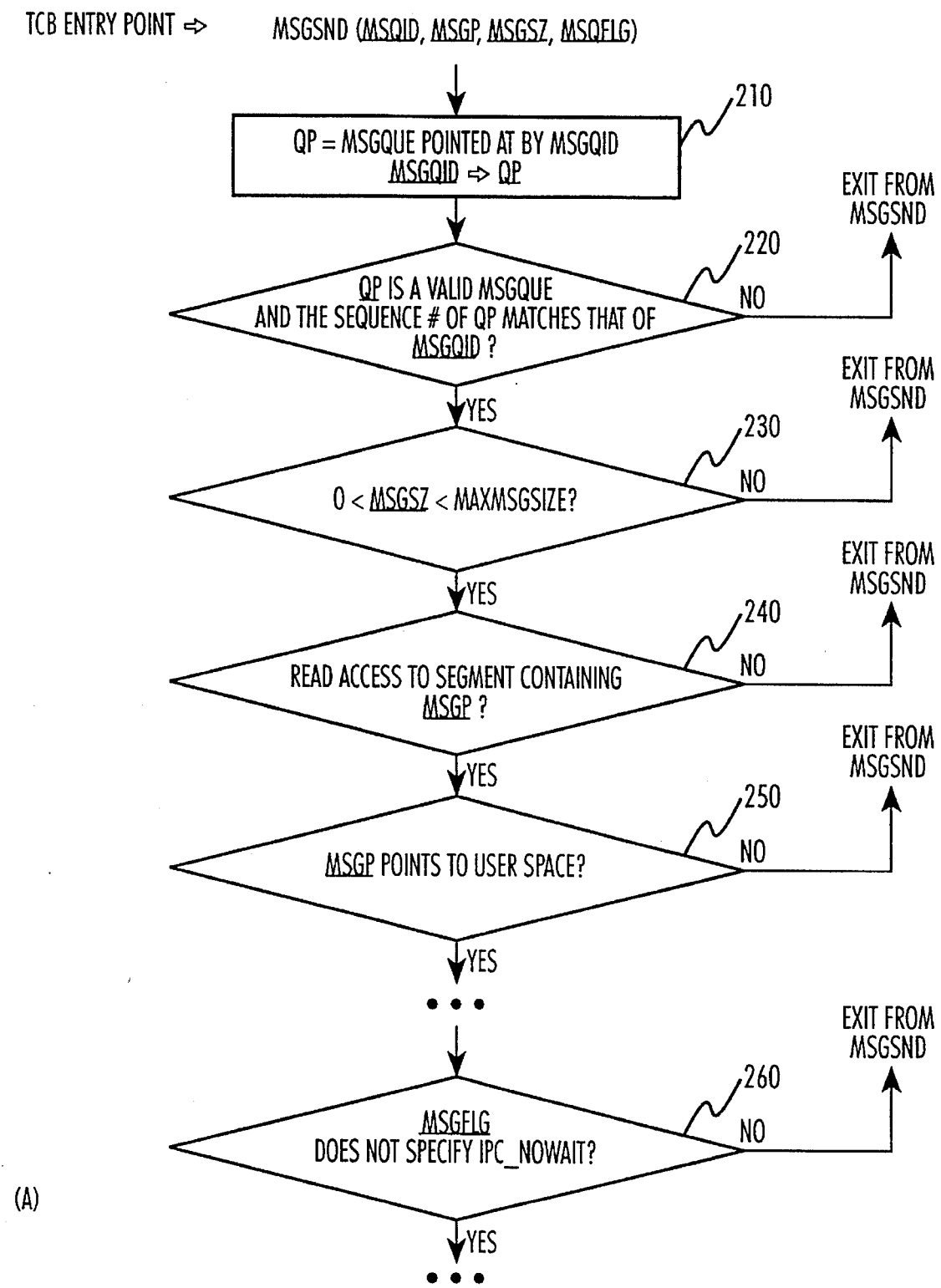
FIG. 2 illustrates a subpath of a flow path originating at the msgsnd UNIX™ system call.

Referring to FIG. 2, a subpath of a flow path originating at the msgsnd system call is shown. This system call is used to send a message to a queue identified by parameter msqid. Blocks 210 through 260 will be described next. Parameter msgp points to a data structure containing the message type and the message text; msgsz specifies the size of the message text in bytes; msgflg specifies the action to be taken when certain error conditions occur.

The purpose of this example is to show that every single parameter of the msgsnd system call is validated properly before any significant flow occurs. Since the parameters are user supplied, the system has to ensure that msqid indeed points to a valid message queue and that the memory location msgp (which has to be read from) lies within the user space. Parameter msgsz also has to be checked to be within the legal system limits for message size and the msgflg parameter has to be checked to determine what course of action to take when unusual situations occur. If every parameter to every single TCB entry point is not validated properly, then potential penetration scenarios resulting from inadequate parameter checking will exist in the system.

Figure 3:
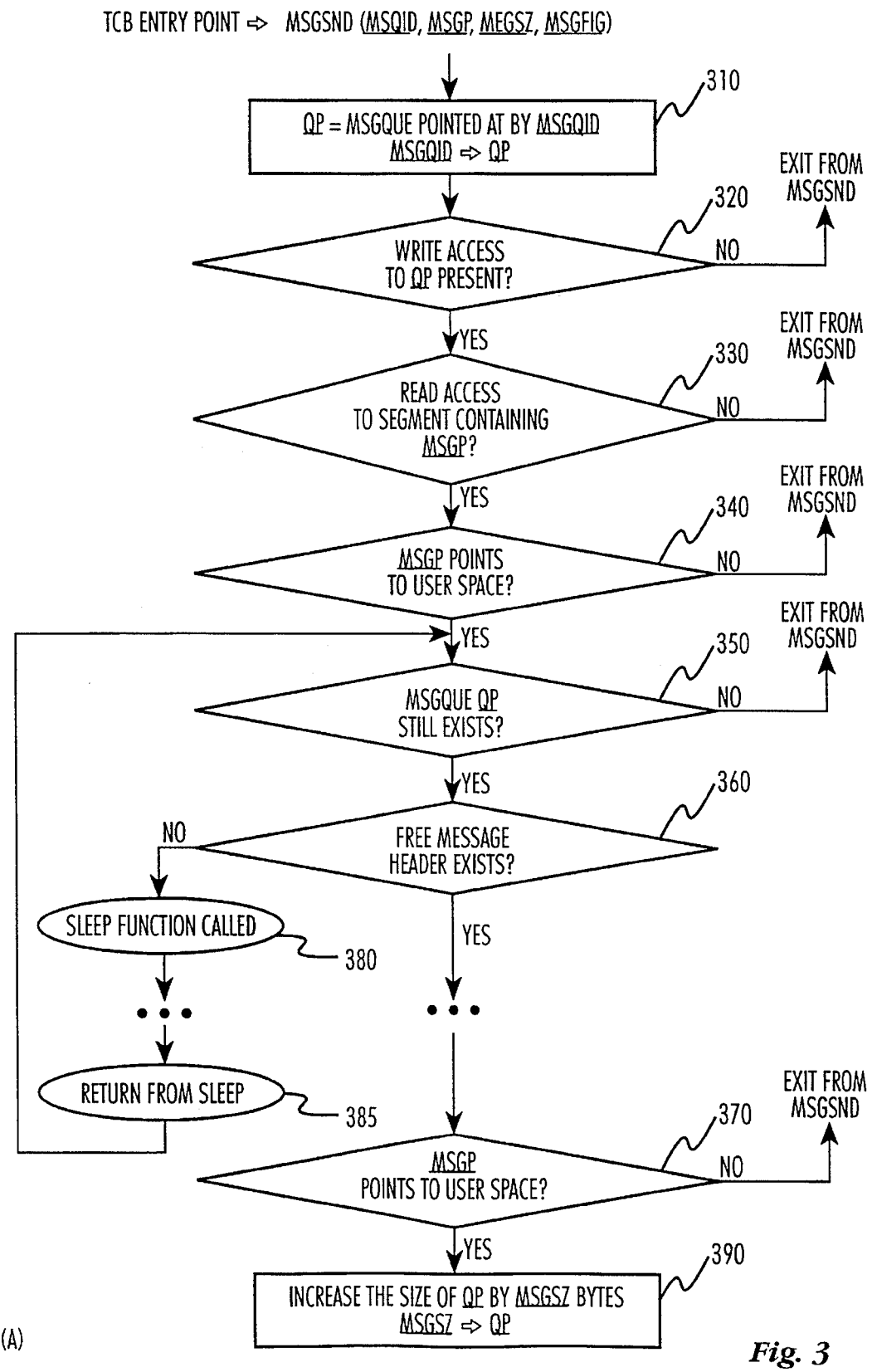
FIG. 3 illustrates the operation of the UNIX™ sleep operation and its associated penetration problems.

FIG. 3 illustrates the problem of ensuring that, whenever a flow occurs which depends on the validity of a condition, the condition remains valid at the instant the flow occurs. Since the condition check and the flow (action) depending on the result of that check occur at different points of time, it is possible that the condition changes in the time lapse before the flow (action) is taken. This illustrates the timing consistency problem (see Bisbey et al., *Protection Errors in Operating Systems: Inconsistencies of a Single Data Value Over Time*, USC/Information Sciences Institute, ISI/SR-75-4 (December 1975)).

In the example of FIG. 3, the process may deschedule itself within the kernel by going to sleep while waiting for a free message header. On waking up from sleep, the process fails to recheck the validity of the write access to the msque—which was checked before going to sleep—and goes on assuming that the condition still holds true. The problem is that it is possible that the access rights for the message queue were changed by some other process (which had control over the CPU) while the kernel process slept. Thus, a potential penetration flaw appears unless the kernel rechecks the validity of the write access to the message queue. Thus, whenever a flow requires that a set of conditions be valid at the moment the flow occurs, it must be ensured that the condition validations and the flow itself be conducted in an atomic sequence (i.e., the processor should not be released in the middle of this sequence).

Figure 4:
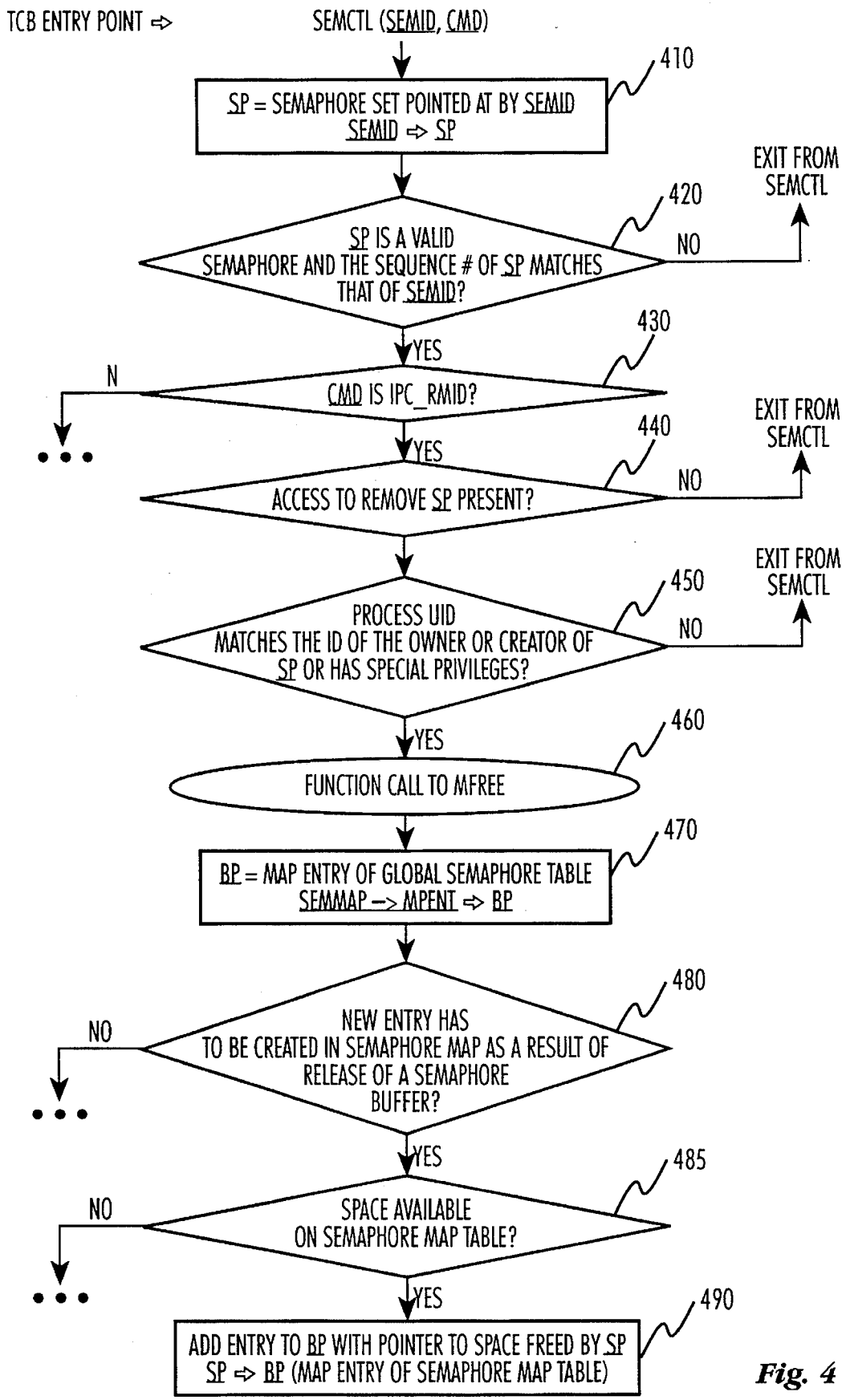
FIG. 4 illustrates the integrated flow path starting from the semctl UNIX™ system call and terminating at the variables making up the global semaphore-map table.

FIG. 4 illustrates an integrated flow path starting from the semctl system call and terminating at the variables making up the global semaphore-map table. The function of this system call is to provide a number of semaphore controls operations as specified by parameter cmd, on the semaphore specified by parameter semid. It is seen that before a new entry is added to the global semaphore-map table, the kernel correctly checks for a possible overflow of the table. If that were not the case, it would be possible to corrupt the system by overflowing the semaphore-map table.

For a majority of the system global variables, a flow to/from the global variable requires the validation of certain conditions prior to the occurrence of the flow. If the system fails to validate the required conditions, flaws that could cause a variety of penetration patterns may appear in the system.

The above examples show how four very different penetration patterns can be identified in integrated flow paths. This is the case because all coded activity can be represented as a series of information flows (e.g. assignment statements), function calls, dependencies (e.g. conditional call statements), and condition checks. Condition checks result in choices in the flow path and hence determine the final outcome of the flows. Hence, the present invention is based on the hypothesis that system flaws that cause a large class of penetration patterns can be identified in system (i.e. TCB) source code as incorrect/absent condition checks or integrated flows that violate the intentions of the system designers.

II. A Theory of Penetration-Resistant Systems

To represent penetration patterns uniformly, the notion of the integrated (execution) flow path within a system call is defined. The integrated flow path consists of (1) the information flows, (2) the function calls, and (3) all the conditions checked along the execution path. An integrated flow path (the terms an integrated (execution) flow path, integrated path, an integrated flow, or a flow path are used interchangeably throughout this document) starts at an entry point of a system call and follows through various internal functions via call/return statements until the execution of the system call concludes.

The central objective of security is providing controlled access. Since penetration refers to ways of violating the intended security controls caused by faulty system implementation, penetration is defined (for use in this disclosure) as: a method of exploiting system flaws to gain illegal or unintended access to system variables, objects, and/or operations.

In the definition above, the word "access" has been used in a very broad sense. Access to system variables and objects can be of two types: viewing access and altering access. Access to an operation refers to the capability to invoke a command, a function or a subroutine within the system. Our definition of penetration does not address illegal accesses obtained via operational security errors. It only considers errors in the source code, but not of hardware, that may cause vulnerability to partial or complete subversion of the security controls of the system by entrusted user processes and commands.

System penetration has three basic goals: 1) to gain unauthorized access, 2) to cause denial-of-service to other legitimate users, and 3) to bypass system accountability (Attanasio et al., *Penetrating An operating System: A Study of VM/370 Integrity*, IBM Systems J., 15(1), pp. 102–116 (1976); Clark, D. D., *Ancillary Reports: Kernel Design Project*, MIT—TM87 (June 1977)). These goals are unified under the penetration definition given above because not only the first goal but also the latter two are usually achieved by an unauthorized modification of sensitive data, code or variables that are pertinent to the various security and accountability policies of the system.

A system may support several security, integrity and/or accountability policies. Also, different systems may implement different policies. Formal verification and testing methods exist for policy designs and implementations. However, even if policies are implemented correctly, it may still be possible to penetrate the system as a result of faulty system—area protection. For these reasons, correctness concerns of policy enforcement can be separated from those of system-area (e.g., TCB) protection, and focus penetration analysis on discovery of system protection flaws.

Numerous penetration "patterns" have been documented in the literature (Anderson, J. P., *Computer Security Technology Planning Stud, Volume 2*, NTIS: AD-772 806, NTIS (October 1972); Carlstedt et al., *Pattern-Directed Protection Evaluation*, USC/Information Sciences Institute, ISI/RR-75-31 (June 1975); Carlstedt, J., *Protection Errors in Operating Systems: Validation of Critical Conditions*, USC/Information Sciences Institute, ISI/SR-76-5 (May 1976); Hollingworth et al., *Protection Errors in Operating Systems: Allocation/Deallocation Residuals*, ISI/SR-76-7 (June, 1976); Karger et al., *MULTICS Security Evaluation: Vulnerability Analysis*, NTIS: AD/A001120, NTIS (June 1974); Linde, R. R., *Operating Systems Penetration*, Proc. of the Ntl. Compt. Conf. vol 44, AFIPS Press, Montvale, N.J. (1975); and McPhee, W. S., *Operating System Integrity in OS/VS2*, IBM Sys. Journal No. 3, pp. 231–252 (1974)). These patterns were used to develop a penetration resistent system. The intent of this approach is to synthesize a set of properties defining penetration resistance or vulnerability. This approach led to the discovery of a set of generic flaws which cause a system to be vulnerable to penetration attacks. A large number of penetration scenarios result from a handful of generic flaws. Moreover, these generic flaws seemed to be relatively constant across several operating systems. Since the word flaw connotes a defect or error, implicit in the definition of a flaw is a violation of a design or implementation property. Following this reasoning, the set of generic flaws actually imply the existence of a set of design and implementation properties of penetration-resistant systems. Thus, a Hypothesis of Penetration-Resistant Systems is developed which states that a system (e.g., TCB) is largely resistant to penetration if it adheres to a specific set of design properties.

Typically, penetration scenarios arise due to violations of the following properties: system isolation, system noncircumventability, consistency of system global variables, timing consistency of system condition checks, and elimination of undesirable user and system dependencies.

It should be noted that the first two of the above properties differ from the similar properties of reference monitors (Anderson, J. P., *Computer Security Technology Planning Study, Volume* 2, NTIS:AD-772 806, NTIS (October 1972)) in the sense that they do not refer to any policy enforcement component. Each of the above properties is described in greater detail below. While the above set is not exhaustive, in the process of defining a set of generic design properties of penetration-resistant systems, a unified Theory of Penetration-Resistant Systems becomes apparent. It should also be noted that, although the terminology is biased towards UNIX™ systems, the above properties are applicable to all operating systems.

System Isolation or Tamperproofness: In systems with a clearly identifiable boundary (which corresponds to the user interface to the system internal functions and data structures), there are three aspects that need to be taken care of to guarantee that the system is isolated (or protected from tampering) from external users. These aspects are:

1) parameter checking at system interface—the parameters passed across the system boundary as arguments of a kernel or trusted process call must be checked for validity in the particular context of the call.

2) user/system address space separation—the user address space must be clearly separated from the system (kernel or trusted process) address space. No user should be able to directly refer to addresses in system space and the parameters passed across the system boundary should be stored in the system space before they are validated.

3) system cell selection and transfer of control—the entry into the system space should only be allowed through system-controlled, well-defined entry points. The mode should change from the unprivileged user mode to a privileged system mode. It should be ensured that transfer of control is to the correct system entry point.

In FIG. 2, there are four parameters to the system call msgsnd and all four parameters have to be checked for validity before they are used within the kernel. In UNIX™, the user address space is meant to be disjoint from the system process or kernel address space and all system entry point parameters are copied into system space before they are validated. As shown in FIGS. 2 and 3, the parameter msgp which points to a location in memory is validated to point to user space before any accesses are made to that location. In the examples from UNIX™, we see that the only way a user can invoke a function within the system is through system calls, which have well-defined entry points. The change from user to kernel mode is done by hardware mechanisms and thus, it is transparent at the software level, Hardware aspects of system isolation are discussed in Gligor, V. D., *A Note on the Denial-of-Service Problem*, Proc. of the IEEE Symp. on Sec. and Priv., pp. 139–49, Oakland, Calif. (April 1983); and Millen, J. K., *Kernel Isolation for the PDP*-11/70, Proc. of the IEEE Symp. on Security and Privacy, pp. 57–65, Oakland, Calif. (April 1982).

System Noncircumventability: An object reference is defined as the tuple {action; object identifier}, where the action can be represented by a system call and the object identifier can be represented by an object unique name, file descriptor, segment number, capability, or any other data structure that can be used to identify the object uniquely. Actions that refer to multiple objects simultaneously (n-ary actions) are considered to be part of multiple references.

The noncircumventability property ensures that all object references are mediated (checked) by the system. In other words, this property guarantees that it is impossible to bypass the access check modules of the system during an object reference. Object references are: (1) reference to object contents—e.g. file contents, process-control-block contents, etc; (2) reference to object-status variables and attributes—e.g. time of last update of a file, file length, file lock status, etc; (3) reference to object privileges—e.g. protection modes, access control lists, whenever privileges are distributed, reviewed, or revoked; and (4) reference to subjects—e.g. subject-to-subject signaling.

Although object attributes/status variables and privileges are not viewed as system objects, they must be included here since lack of access control on these can cause serious secrecy/integrity problems, such as covert channels.

Noncircumventability refers to the guarantee that every object reference passes through the (whatever) policy-enforcement modules the system provides in a correct way. Thus, the verification of system noncircumventability consists of two parts: (i) object references cannot bypass the system boundary whenever an object is accessed, and (ii) once inside the system boundary, object references are mediated (checked) by invocation of the policy enforcement modules with the correct arguments. Part (i) is usually satisfied for each reference to any object that is represented in system space whenever the system isolation property is satisfied. Part (ii) is dependent on the structure of the system code and must be independently verified.

The noncircumventability property is illustrated in FIG. 3. In this figure, message queue qp is being appended with a new message which is read from the memory location msgp. Thus, there are two object references involved here—a read reference to the location msgp and a write reference to the location msgp and a write reference to qp. In UNIX™, the IPC (interprocess communication) and Memory Subsystems are both implemented as parts of the kernel. Thus, if the isolation property is satisfied, part (i) of the noncircumventability property is also guaranteed for both references in the example. Part (ii) of the noncircumventability property is satisfied by the write access check to qp and the read access check to the memory location msgp.

Note that both system noncircumventability and isolation are unconcerned with the type of access control policy of the system, which may vary widely from one system to another.

Consistency of System Global Variables and Objects: Every system has certain invariant assertions that must hold over the global variables, objects, and internal functions of the system. The system should be coded in such a way as to maintain the system global variables and objects in a state that is consistent with the invariant assertions. System invariant assertions depend on the role of the global variables, objects and internal functions of the system. System invariant assertions may require that: a given global variable should not be alterable by unprivileged users, global tables that are alterable by unprivileged users should not overflow or underflow, a given global table should never contain duplicate entries (e.g., disk-sector allocation entries), and per-process and system wide resource limits must be enforced, etc.

System assertions may also refer to multiple global variables and internal functions. For example, system invariant assertions may require that: the lifetime of any object pointer (e.g., name, identifier) should be no greater than the life-time of the object map (e.g., object description, status, etc.) which, in turn, should be no greater than the lifetime of the object representation (e.g., disk allocation for the object) and internal system operations must be sequenced in a certain order (e.g., disk write operations for certain system calls).

In the example of FIG. 4, the global semaphore-map table carries the invariant assertion that the map table should never be allowed to overflow. Thus, before the semaphore-map table is modified, a check is made to see whether adding a new entry to the table causes an overflow.

Timing Consistency of Condition Checks: The timing consistency property of a system guarantees that the validity of conditions (already checked) is not lost at the moment when an action that depends on that condition is actually performed (Bisbey et al., ISI/SR-75-4 (December 1975)). This was illustrated in the example in FIG. 3, where the alteration of the global message queue variable qp is actually altered. Since the kernel slept in the interval between the access check and the alteration of qp, a timing consistency error may arise in the system code.

Let us refer to system "objects" and "globals" collectively as the "cells" of the system. Typically, there will be a set of conditions (to be validated) associated with the access to each "cell". In addition, certain system internal functions, may have a set of conditions (to be validated) associated with their invocation.

A sequence of operations during which the current process cannot be preempted from the processor is called an atomic sequence. (While the word atomic has been defined in numerous and varied ways in the literature, in our definition, atomicity refers to the temporal contiguity of a sequence of operations. In an atomic sequence, all that we are interested in is that the processor is not released (in the middle of the sequence) to another user process.) The system maintains timing consistency if each access to a "cell" or internal system function is conducted in an atomic sequence with the conditions associated with that access. This is the case because the conditions that are associated with access to "cells" and internal functions involve other "cells" in the system. The only way a condition on a "cell" validated by process A can change is when another process B gets control of the processor in between the time that A validates the condition and carries out the access based on the validity of the condition. Thus, timing inconsistencies in the system can be prevented altogether if condition validations and access are carried out in an atomic sequence with respect to each other.

Elimination of Undesirable System and User Dependencies: Denial-of-access to system services can be achieved through tampering with system global variables, unauthorized deletion of daemon processes or using up a large proportion of system resources. All of these are handled by the other properties mentioned in this section. In addition to these instances, denial of service occurs when "undesirable system and user dependencies" are built into a shared-user-visible services (e.g., within kernel or trusted processes) (see Gligor, V. D., Proc. of the IEEE Symp. on Sec. and Priv., pp. 139–49, Oakland, Calif. (April 1983); Gligor, V. D., *On Denial of Service in Computer Networks,* Proc. of the Int'l. Conf. on Data Eng., pp. 608–17, Los Angeles, Calif. (Feb. 86)). For example, an undesirable inter-user dependency exists within the system when an unprivileged user is able to either lock up or crash the system. As shown in FIG. 1, denial-of-service occurs in UNIX™ when an unprivileged user is able to invoke the panic function.

III. Flow Based Model of Penetration Analysis (1) Model Description

In this section a state-transition model of penetration analysis will be outlined based on the concept of integrated flows. The model is derived from the set of design properties presented in Section II. The model supports the following policy of penetration-resistant systems.

Penetration-Resistance Policy: A system entity may be altered or viewed, or a system internal function may be invoked only if the set of conditions associated with the alter/view/invoke access specified by the penetration-resistance properties are validated in an atomic sequence (with the alter/view/invoke operation itself).

Definitions

Abstract Cell: A global entity of a system (or an entity pointed to by a global entity of a system) that has a name and holds information. In other words, all kernel and trusted process globals, system objects and their attributes constitute the abstract cells in the system.

View: An abstract cell is said to be viewed if there is an information flow from that cell to a cell that is visible at the system interface.

Function Flow: When a function invokes another function or when a function returns to the calling function, a function flow is said to occur from the first function to the second.

Sleep Functions: Kernel functions that transfer a process within the kernel from the "running" state to the "asleep" state.

Critical Function: A kernel function deemed critical or significant for penetration analysis, such as, functions that can lock up or crash the system; e.g. the "panic" function in UNIX™, sleep functions, and functions that may be invoked only after a certain set of conditions are validated; e.g. functions that are available only to privileged users of the system.

Sequence: A set of elements in which the order of the elements has some significance. It should be noted that throughout our model, we will be using the set notation and the sequence notation interchangeably. This should not cause any problems because, although the elements of a sequence are ordered, they do in fact form a set and hence both notations are applicable. Sub-sequence: A piece or portion of a sequence where the original ordering of the elements is left intact. For example, given a sequence X={ a, b, c, d, e}, {a, b), {c, d, e}, and {a} are all sub-sequences of X, whereas, {a, c, d} and {b, e} are not sub-sequences of X.

Model Elements

Abstract cell set CL: The set of all the abstract cells in the system is denoted by CL={$CL_1$, $CL_2$, ...}.

System function set SF: The set of all the functions and subroutines in the system is denoted by SF={$SF_1$, $SF_2$, ...}.

System conditions set CC: The set of all the condition checks inside the system is denoted by CC={$CC_1$, $CC_2$, ...}.

System entry functions set SE: The set of all the system entry points is denoted by the set SE={$SE_1$, $SE_2$, ...}, thus, SE $\subseteq$ SF.

System critical functions set SC: The set of all the system critical functions is denoted by the set SC={$SC_1$, $SC_2$, ...}, SC $\subseteq$ SF. System sleep function set SS: The set of all the sleep functions is denoted by SS={$SS_1$, $SS_2$, ...}, thus, SS $\subseteq$ SF.

Information flow set IF: The set of all possible information flows between the abstract cells of the system is denoted by IF=CL×CL={$IF_1$, $IF_2$, ...}, where $IF_1$ =($CL_j$, $CL_k$) denotes an information flow from $CL_j$ to $CL_k$.

Function flow set FF: The set of all possible function flows between one system function and another is denoted by FF=SF×SF={$FF_1$, $FF_2$, ...}, where $FF_i$=($SF_j$, $SF_k$) denotes a function flow from function $SF_j$ to function $SF_k$.

Alter Set A: This set records the conditions that need to be checked for each abstract cell (as dictated by the penetration-resistance properties) before that cell can be altered. The set A={($CL_1$, $Condset_1$), ($CL_2$, $Condset_2$), ...}, where $Condset_l$ $\subseteq$ CC. Element ($CL_i$, $Condset_i$) denotes that (according to the penetration-resistance properties) the conditions in $Condset_i$ have to be checked before the cell $CL_i$ can be altered.

View Set V: This set records the conditions that need to be checked (for each abstract cell) before that cell can be legally viewed. The set V={($CL_1$, $Condset_1$), ($CL_2$, $Condset_2$), ...}, where $Condset_i$ $\subseteq$ CC. Each element of set V has the same meaning as an element of set A.

Critical Function Set C: The conditions that need to be checked before for each system critical function may be legally invoked are tabulated into the set C={$SC_1$, $Condset_i$), ($SC_2$, $Condset_2$), ...}, where $Condset_i$ $\subseteq$ CC. The element ($SC_i$, $Condset_i$) denotes that (according to the penetration-resistance properties) the conditions in condest, have to be validated before the function $SC_i$ can be invoked.

Entry Point Set E: The parameter validations and privilege checks required at each system entry point is recorded in set E={($SE_1$, $Condset_1$), ($SE_2$, $Condset_2$), ...}, where $Condset_i$ $\subseteq$ CC. The element ($SE_i$, $Condset_i$) denotes that (according to the penetration-resistance properties) the parameter validations and privilege checks in $Condset_i$ have to be carried out immediately after entry through the system entry point $SE_1$.

Model Interpretation Constants

The sets A, V, C and E are the interpretation constants of the model for a given system. These sets and the set SS are pertinent to the application of the model rules and invariant. The other elements of the model are important only for notational completeness. The interpretation constants of the model have to be generated before the model rules are applied. The sets A, V, C and E represent a data-base of the required conditions, parameter validations and privilege checks that are associated with the access to each abstract cell and critical function in the system. They are generated by applying the penetration-resistance properties to a given system. For example, the set E is generated by the application of the isolation property; sets A, V are generated by applying the noncircumventability and consistency of global assertion properties; and set C is derived from the elimination of undesirable dependencies and the noncircumventability properties. The specification of the penetration resistance properties within the model is explained in greater detail later.

Model State Variables

At the point in time when the system is not yet operational, no system call has yet been invoked and hence no abstract cell or system function has yet been accessed. As the system becomes operational, users invoke system calls for various purposes and, along the execution paths of these system calls, abstract cells are altered/viewed and internal system functions are invoked. The state variables of the model record the state of the system in the form of information regarding the flows and condition checks that were encountered along an integrated flow path to (1) an alter/view operation on an abstract cell or (2) a invoke operation on an internal system function. These state variables actually represent the integrated flow paths within the system code that have been traversed up to a given point in time and are defined as follows:

Altered Cells Set AC: At any given point in time, this set records data regarding all the abstract cells that have been altered through the system interface. The format of AC is: AC={($CL_1$, $SE_1$, $PathCond_1$), ($CL_2$, $SE_2$, $PathCond_2$), ...}, where entry $AC_i$=($CL_i$, $SE_i$, $PathCond_i$) denotes that abstract cell $CL_i$ has been altered through system entry point $SE_i$ and the flows and conditions along the viewing path are recorded in the sequence $PathCond_i$ in the order they were encountered. Since $PathCondo_i$ records the information flows, function flows and conditions checked along the path, its elements are drawn from the sets IF, FF and CC. Viewed Cells Set VC: At any given point in time, this set records data regarding all the abstract cells that have been viewed through the system interface. The format of VC is: VC={($CL_1$, $SE_1$, $PathCond_1$), ($CL_2$, $SE_2$, $PathCond_2$), ...}, where entry $VC_i$=($CL_i$, $SE_i$, $PathCond_i$) denotes that abstract cell $CL_i$ has been viewed through system entry point $SE_i$ and the flows and conditions along the altering path are recorded in the sequence PathCond in the order they were encountered. Again, the elements of $PathCond_i$ are drawn from the sets IF, FF and CC.

Critical Functions Invoked Set CFI: At any given point in time, this set records data regarding all the critical functions that have been invoked through a system entry point. The format of CFI is: CFI={($SC_1$, $SE_1$, $PathCond_1$), ($SC_2$, $SE_2$, $PathCond_2$), ...}, where entry $CFI_i$=($SC_1$, $SE_1$, $PathCond_i$) denotes that abstract cell $SC_i$ has been invoked through system entry point $SE_i$ and the flows and conditions along the invocation path are recorded in the sequence. $PathCond_i$ in the order they were encountered. Again, the elements of $PathCond_i$ are drawn from the sets IF, CF and CC.

State (AC, VC, CFI): At any point in time, the state is defined as (AC, VC, CFI), where AC, VC and CFI are the state variables for a given interpretation.

Let:

Cond(X, Set) represent the condition part Y of the entry (X, Y) in Set.Set can be A, V, C or E;

Sub(X) denote a sub-sequence of X which includes the last element of sequence X;

(x, y) denote an information or function flow element of a PathCond sequence where the first component is x and the second component is y.

Secure State: The definition of the secure state is a formulation of the penetration-resistance policy in the form of an invariant.

State Invariant SI: A state (AC, VC, CFI) is said to be penetration-resistant (for the types of penetrations defined in this disclosure) if:

I1: $\forall \forall X$=(Cell, Entry, PathCond) $\in$ AC:
  i) PathCond $\supseteq$ Cond (Entry, E),
  ii) PathCond $\supseteq$ Cond(Cell, A) and
  iii) {W$\in$ Sub(PathCond) and W$\supseteq$ Cond(Cell, A) , and $\forall s \in$ SS, (y, s) and (y, s)$\notin$W]

I2: $\forall x$=(Cell, Entry, PathCond)$\in$ VC:
  i) PathCond $\supseteq$ Cond (Entry, E),
  ii) PathCond $\supseteq$ Cond(Cell, V) and
  iii) {W$\in$ Sub(PathCond) and W$\supseteq$ Cond(Cell, V) , and $\forall s \in$ SS, (y, s) and (y, s) $\notin$W]

I3: $\forall x$=(Cell, Entry, PathCond) $\in$ CFI:
  i) PathCond $\supseteq$ Cond (Entry, E),
  ii) PathCond $\supseteq$ Cond(Func, C) and
  iii) {W$\in$ Sub(PathCond) and
  W$\supseteq$ Cond(Func, C) , and $\forall s \in$ SS, (y, s) and (y, s) $\notin$W]

State transitions occur when elements are added to the AC, VC and CFI sets as a result of information and function flows taking place. The state transition rules (described below) are indirectly applied whenever a user invokes a system call function with a set of parameters for the purpose of obtaining a certain service. Information and function flows occur along the path traversed within the system call (depending on the call parameters). Whenever a abstract cell is the target of a altering or viewing flow, a state transition occurs by the application of the transition rules alter_cell and view_cell, respectively. Whenever a function flow occurs to a system critical function, a state transition occurs by the application of the invoke_crit_func transition rule. We use the notational convention that the application of a state transition rule on a state V=(AC, VC, CFI) results in a new state denoted by V' (AC', VC', CFI').

State Transition Rules

1) R1: alter_cell (Cell, Entry, PathCond) Semantics: Abstract cell Cell is to be altered through system entry point Entry with the flows and conditions in sequence PathCond along the altering path.
The rule:
If Cell $\in$ CL, Entry $\in$ SE, PathCond $\subseteq$ (IF $\cup$ FF $\cup$ CC) and
  i) PathCond $\supseteq$ Cond ( Entry, E)
  ii) PathCond $\supseteq$ Cond(Cell, A) and
  iii) {W$\in$ Sub(PathCond) and W$\supseteq$ Cond(Cell, A) , and $\forall s \in$ SS, (y, s) $\notin$W} then AC'=AC $\cup$ {(Cell, Entry, PathCond)}
VC'=VC, and
CFI'=CFI else (AC', VC', CFI')=(AC, VC, CFI) /*potential violation of penetration- resistance properties*/

2) R2: view_cell (Cell, Entry, PathCond) Semantics: Abstract cell Cell is to be viewed through system entry point Entry with the flows and conditions in sequence PathCond along the viewing path.
The rule:
If Cell $\in$ CL, Entry $\in$ SE, PathCond $\subseteq$ (IF$\cup$FF$\cup$CC) and
  i) PathCond $\supseteq$ Cond (Entry, E)
  ii) PathCond $\supseteq$ Cond (Cell, V) and
  iii) $\exists$W: {W$\in$ Sub(PathCond) and W$\supseteq$ Cond(Cell, V) , and $\forall s \in$ SS, (y, s) $\notin$W} then AC'=AC
VC'=VC $\cup$ {(Cell, Entry, PathCond)}, and CFI'=CFI else (AC', VC', CFI')=(AC, VC, CFI) /*potential violation of penetration-resistance properties*/

R3: invoke_crit_func (Func, Entry, PathCond) Semantics: Critical function Func is to be invoked through system entry point Entry with the flows and conditions in sequence PathCond along the viewing path.
The rule:
If Func $\in$ SC, Entry $\in$ SE, PathCond $\subseteq$
$\subseteq$ (IF $\cup$FF$\cup$CC) and
  i) PathCond $\supseteq$ Cond(Entry, E)
  ii) PathCond $\supseteq$ Cond(Func, C) and
  iii) $\exists$W: {W$\in$ Sub(PathCond) and
  W$\supseteq$ Cond(Func, C) , and $\forall s \in$ SS, (y, s) $\notin$W}
then AC'=AC
VC'=VC $\cup$ {(Cell, Entry, PathCond)), and
CFI'=CFI$\cup$ {(Func, Entry, PathCond) } else (AC', VC', CFI')=(AC, VC, CFI)
/*potential violation of penetration-resistance properties*/

Initial State: The initial state is defined to be ({ }, { }, {}) and trivially satisfies the state invariant SI stated above.

The following two Principles show that the formulations of security based on the state invariant SI and the three state transition rules are identical.

(1) If state V, is the new state after application of a sequence of n state transition rules on state $V_o$ and if $V_o$ satisfies the invariant SI, then V, also satisfies the invariant SI.

(2) if $V_o$=($AC_o$, $VC_o$, $CFI_o$) and $V_n$=($AC_n$, $VC_n$, $CFI_n$) are two states that satisfy SI and $AC_n \supseteq AC_o$, $VC_n \supseteq VC_o$ and $CFI_n \supseteq CFI_o$, then there exists a sequence of rules that transforms $V_o$ to $V_n$ and is secure.

(2) Specification of the Penetration-Resistance Properties within the Model

The model interpretation constants A, V, C and E are derived through the application of the penetration-resistance properties. The model rules ensure that the properties are not violated by ensuring that the condition checks, parameter validations, and privilege checks specified in A, V, C and E are done correctly.

The isolation property is specified within the set E of the model. Parameter checking provides conditions to be validated associated with each system entry point. User/system address space separation is also specified in E, since all user supplied memory location parameters are to be validated to point to user space. The transfer of control translates to privilege checks associated with the privileged system entry points in E.

The noncircumventability property is specified by the sets A, V and C of the model. Object status variables and privileges are identifiable as "cells" in the model so the checks associated with their access is specified in sets A and V. Reference to subjects .also typically involves the alter operation on a "cell" (e.g. in UNIX™, signaling a process is equivalent to altering an element in the process control block of the process) and again the checks associated with that reference are specified in A. Reference to object contents can be viewed as the invocation of the low level internal functions that actually alter or view the object (e.g. in UNIX™, the readi and writei functions) and the access checks associated with such invocations are specified in set C. The access check condition itself can be formulated as the successful return of a call to the access policy module with the correct arguments.

Assertions over global variables ("cells") translate to conditions associated with "cells" in set A and V. Some assertions, such as the "lifetime invariant" of the previous section, require that certain operations be carried out in a given sequence. Internal operation sequencing is handled as follows. Suppose functions f1, f2 and f3 should be invoked in the sequence f1, f2, f3; within the set C we can associate the invocation of f2 with the condition that f1 returns successfully, and the invocation of f3 with f2 returning successfully. Through the "successful return" dependencies, any integrated flow path that contains function flows to f1, f2 and f3 will satisfy the original assertion. Thus, the lifetime assertion is satisfied if we ensure that, the creation process for an object always proceeds in the direction object representation→object map→object pointer and the deletion of the object always proceeds in the opposite direction.

The timing consistency property involves checking that the conditions (specified by A, V and C) associated with the alter/view/invoke operations are validated in an atomic sequence with the operation itself (clause three of each model rule). In a system where a privileged mode process releases the processor only by exiting or by voluntarily going to sleep, atomicity of a privileged mode process is broken only if the process invokes a sleep function. It may be noted that the entry point parameter and privilege validations cannot give rise to timing inconsistencies since the isolation property guarantees that the parameters are copied to system space (and hence outside the user's influence) before they are validated. The conditions in the sets A, V and C on the other hand, involve other "cells" of the system (which are accessible to users) and can give rise to timing inconsistencies.

The elimination of undesirable system and user dependencies is specified in set C by associating the "impossible" condition with the invocation of those system functions that may cause a system lock-up or crash. The "impossible" condition is meant to convey the notion that these functions should not be invocable from the user interface by non-privileged users. Thus, any (non-contradictory) integrated flow path which terminates with a function flow to one of these critical functions is illegal.

(3) Model Capabilities and Limitations

Any penetration scenario which can be translated to a pattern of missing or inadequate condition checks associated with (1) the system entry points, (2) the alter/view operation on a "cell" and (3) the invoke operation on a system internal function, can be detected in system source code with the help of the framework defined in this model. The model makes it possible to implement an automated penetration detection tool. This model only addresses flaws in system software and does not have any capability to detect flaws in the hardware base. The model can be extended for penetration-resistance properties other then those discussed above, since flaw characterization in terms of integrated flows and conditions is of a general nature. Thus, to detect violations of some additional penetration-resistance properties, the new properties can be applied while generating our model interpretation constants. If the interpretation constants are unable to express the desired new properties, the invariant and set of model rules may have to be augmented.

IV. Model Application

The integrated-flow-based model of penetration analysis discussed in the last section may be used either for a dynamic or a static penetration analysis of a computer system. Let us first discuss the dynamic mode of operation. Whenever a system call is invoked by a user, the user will implicitly be altering and viewing system globals and invoking system internal functions. The conditions associated with these accesses have to be checked if the system is to remain secure to penetration. Hence, before actually carrying out the operation requested by the user, the penetration model rules will be applied to the integrated flow path starting at the system entry point. If the model rules apply then we can allow the operation to take place since the applicability of the rules implies that there exists no violations of the penetration-resistance properties through the operation under consideration, otherwise the system call is aborted and an error notification is returned.

The dynamic mode of operation is usually redundant, since the flaws that cause penetrability are static in nature and exist from the time the system becomes operational. Thus, the static mode of penetration analysis is the recommended mode of use for the model. In this mode, a flow integration tool is applied to the system code to generate all the integrated flow paths within the system. Then the model rules are applied to each flow path based on the accesses along the flow path. If the rules are satisfied, then that flow path is good, otherwise there are flaws in the flow path which can cause penetrability. In this way, all the flaws in the system are identified statically so as to be corrected before the system becomes operational.

Thus, the present invention approach to penetration analysis of a given system essentially consists of three basic steps:

1) generation of the model interpretation constants based on the set of penetration-resistance properties.

2) use of an integrated-flow tool to generate integrated flow paths within system code.

3) application of the model rules to each such integrated flow path to determine whether the flow path conforms to the penetration-resistance properties. In case of nonconformity, the flow path is deemed a flawed flow path.

V. The Penetration Analysis Method

The theory of penetration-resistant systems described in Section II is used to derive the penetration-analysis method. The Hypothesis of Penetration Resistant-Systems tells us that a system becomes vulnerable to penetration attacks if the penetration-resistance properties are improperly implemented by the system. These properties are used to derive the validations (or condition checks) required to be done prior to the occurrence of various information and function flows within the system or TCB.

The Hypothesis of Penetration Patterns indicates that these required validations should be present in all execution paths within the system. Thus, the integrated flow paths provide a way to represent execution paths in a format which may be analyzed for the presence/absence of the required validations. The model supplies us with a set of rules to systematically analyze the integrated execution paths for the presence of the required checks. Thus, the penetration-analysis method is a judicious application of the theory of penetration-resistant systems.

The penetration analysis method consists of three stages:

Stage 1: execution path integration. In this stage, all the integrated (execution) flow paths for the system under consideration are generated using (information and control) flow based tools on the system source code.

Stage 2: derivation of the penetration resistance specifications. In this stage, the penetration-resistance properties are interpreted in (mapped to) the given system to generate the set of validation-check specifications, which are required for altering/viewing of the global variables and for invoking internal functions. These validation-check specifications are the penetration-resistance specifications, since they ensure the penetration resistance for the given system; i.e., they are used to verify that the conditions enabling integrated flows satisfy the penetration-resistance properties.

Stage 3. analysis of integrated execution paths. In this stage, each integrated (execution) flow path (from Stage 1) is analyzed for adherence to the penetration-resistance specifications (from Stage 2) using the model rules, to detect whether the set of required validation-check statements is actually present in the path; if absent, the path is flagged to signify the existence of a possible penetration-related flaw.

(1) Execution Path Integration

The integrated (execution) flow paths of Stage 1 are derived from the integration of the unit information flows, the unit function flows (flow of control from one function to a second), and the unit condition statements encountered while tracing an execution path through the TCB source code. A unit (information or function) flow is caused by a single program statement. For example, an assignment statement a=b causes a unit information flow from b to a; a function call statement call func2(a) occurring in funct1 causes a unit function flow from func1 to func2, as well as an unit information flow from the actual to the formal parameters of function func2. A unit condition statement enables a unit (information or function) flow to occur. For example, the conditional expression of an "if" statement is a unit condition statement that enables the information and function flows occurring within the body of the "if" statement.

A unit information flow is represented as a pair of <F:V> elements connected by a arrow. A <F:V> element represents the variable V within function F. A unit information flow given by <F1: V $\Rightarrow$: F2:V2> implies an information flow occurring from variable V1 in function F1 to variable V2 in function F2. (Within a unit flow or condition, the underscore character "–" is used as a wild-card identifier for any individual component that is irrelevant for analysis purposes.) Similarly, a unit function flow <F $\mapsto$ F2> implies a unit function flow from F1 to F2.

A unit condition statement <F:C> represents a unit condition statement C (in "C" language syntax) that occurs within function F.

Within the source code of the TCB of a system, we define the set of all unit information flows, the set of all unit function flows, and the set of all unit condition statements. The integrated flow path may then be represented as an ordered set of elements, where each element is a member of the union of the unit information-flow, function-flow, and condition sets. In other words, an integrated execution flow path is a sequential concatenation of the unit flows and conditions encountered along a given execution path within the system source code.

The integrated execution paths that are of interest in Stage 1 above, start at the system interface and end with i) the altering of a global variable, ii) the viewing of a global variable, iii) the invocation of certain internal functions within the system. For example, an altering flow path begins with a unit flow or condition in a system call, SC, and ends with a unit information flow to the global variable VAR as shown below:

$$SC: V \Rightarrow :V2 \text{ or } SC:C \text{ or } S \mapsto F, \ldots, F: \Rightarrow :VAR$$

Similarly, a viewing flow path begins with a unit flow or condition in a system call, SC; contains a sequence of unit information flows originating from the global variable VAR through a chain of other intermediate variables; and ends with a unit information flow to a variable which is either, i) visible at the user interface (UV), or ii) supplied as an argument (ARG) to an output (e.g., print) function as shown below:

$$SC: \Rightarrow : VV \text{ or } SC:C \text{ or } S \mapsto F, \ldots, VA \mapsto F1:V1, F1:V$$
$$\mapsto F1:V2, \ldots, Fn-1:VN-1 \Rightarrow Fn:Vn, \ldots, Fn:V \Rightarrow :UV \text{ or }$$
$$F:V \Rightarrow \text{print}:ARG$$

Finally, a flow path terminating with the invocation of an internal function will contain a sequence of unit function flows starting at the system call, SC, and ending with the internal function FUNC. These function flows may be interspersed with the unit condition statements that qualify the execution path and the unit information flows from the actual to formal parameters of FUNC (these may be useful to establish the context of invocation of FUNC). A flow path is represented as:

$$SC:C, \ldots S \mapsto F1, F \mapsto F2, \ldots, Fn-1 \mapsto Fn, Fn:V \Rightarrow FUNC:ARGn, F \mapsto FUNC$$

One could argue that, for penetration analysis, any condition checks we associate with a function flow could be replaced by conditions associated with information flows from actual to formal parameters or vice versa. However, this is not the case. One simple reason is that some functions do not have any formal parameters or return values. Intuitively, there are certain conditions that need to be checked before a process is allowed to invoke certain system functions and this translates naturally to conditions associated with function flows. These conditions are often dependent on the context in which the system function is invoked. The context definition may involve information flows from actual to formal parameters of the function, signifying that the function was invoked with a certain type of parameter.

(2) Penetration-resistance specifications

Integrated (execution) flow paths begin with system-call interfaces, and include information flows to variables and function flows. This suggests that three types of validations-check specification are necessary, namely (1) interface validation-check specifications, which include parameter validations, or parchecks, (2) validation-check specifications for information flows to variables, or yarcbecks, and (3) validation-check specifications for function flows, or funcchecks. These validation checks can be context dependent or context independent (discussed in Section VII(2) in some detail). Context definitions, which must accompany the validation check specification, consist of (1) a condition on functions or variables, (2) one or more function flows, and (3) one or more information flows. In contrast, a context-independent, validation-check specification will not include a context definition.

Interface validation-check specifications: These specifications are derived by interpreting the isolation or tamperproofness properties of a system. The predicates parchecks specify the validation checks required at the interface of a system (TCB) call entry.

The syntax of the interface validation-check specifications used in the tool is:
- —context-independent checks: parchecks ( Entry, [checks], ci, '–' and
- —context-dependent checks: parchecks ( Entry, [context], cd, [checks]), where the Entry denotes a system (TCB entry point, the context denotes the context definition, the flag (ci)cd denotes the context (in)dependence, checks denotes a set of context-(in)dependent, validation-check specifications, and "–" denotes an empty context. For example, the validation-check specification for the ustat system call of Secure Xenix:

parchecks (ustat, [buf is in user space and is writable], ci, '–']

is context independent because regardless of the type of call, parameter, or object, if the call (i.e., ustat) returns a value at an address specified by the user, that address must be in user space and must be writable. In contrast, the validation-check specification for the system call msgget:

parchecks (msgget, ,[key !=PC_PRIVATE & key not found in msq table], cd, [msgflg specifies IPC_CREAT]) is context dependent because user parameter msgflg must be validated to specify the creation of a message queue, when the value of the other parameter key is bound in the context-defining condition that the message queue is to be public but does not already exist in the system.

Validation-check specifications for function flows: These specifications determine the-conditions under which an internal system function can be invoked by a user-level entrusted process, and are usually derived by interpreting properties of noncircumventability and user/system dependencies. The predicates funcchecks specify the validation checks necessary to invoke such a function.

The syntax of the validation-check specifications for function flows used in the tool is:
- —context-independent checks: funcchecks (Function ci, [checks], '–'), and
- —context-dependent checks: funcchecks (Function, cd, [context],[checks])

where the Function denotes a system (TCB) internal function, the flag (ci) cd denotes the context (in) dependence, the context denotes the context definition, the checks denotes a set of validation-check specifications, and '–' denotes an empty context definition. For example, the validation check specification funcchecks (panic, ci, ['IMPOSSIBLE'], '_')

is context independent because, regardless of the context of use, the validation check for reaching the system internal function panic from the user interface must always fail. In contrast, the validation-check specification funcchecks (copyseg, cd, [source or destination address is specified by the inser], ['IMPOSSIBLE'], '_')

is context dependent because, if the source or destination address for the kernel internal function copysez is specified by a user, then the validation check must always fail.

Validation-check specifications for information flows: These specifications determine the conditions under which the alteration/viewing of a variable is allowed, and are usually derived by interpreting the properties of noncircumventability and consistency of system global variables. The predicates yarcbecks specify the validation checks necessary to either alter or view a global variable through a TCB entry point.

The syntax of the validation-check specifications for information flows used in the tool is:
- —context-independent checks: varchecks (Variable, alter/view, ci, [checks], '_'),
- —context-dependent checks: varchecks (Variable, alter/view, cd, [context], [checks]), where Variable denotes a system (TCB) global variable, the flag alter/view denotes whether the information flow alters or views the variable, the flag (ci) cd denotes the context (in) dependence, the checks denotes a set of validation-check specifications, and '_' denotes an empty context definition. For example, the specification varchecks (msgqine, alter, ci, [invoking process has write access to msgque], '_])

is context independent because regardless of the context of occurrence, alteration of a message queue (or its components,) always requires "write access validation for the current process. In contrast, the validation-check specification varchecks(proc→p_sig, alter, cd, [PR1V_KILL privilege not present], [current process owns the process being signaled])

is context dependent, because alteration of the process signaling variable proc→p-sig requires that the calling process be the owner of the signaled process, in the context that the calling process does not possess the privilege PRIV_KILL.

Note that multiple validation check specifications may be applicable to variable or function flows. Whenever this is true, the conjunction of the context-independent validation checks and the distinction of context-dependent validation checks are used for the flow.

(3) Analysis of the integrated execution paths

The analysis phase is a mechanical process of applying the rules of the penetration analysis model to detect violations of the penetration-resistance properties. The integrated execution paths are analyzed according to the model rules (using pattern-matching techniques) to detect the presence of the required validation checks (derived by interpreting the penetration-resistance specifications.) If a execution path does not include these checks, then that path is deemed flawed and flagged accordingly.

For example, consider the set of validation-check specifications:
yarchecks(VAR, alter, cd, [PCtxt1], [F1: C1]).
yarchecks(VAR, alter, cd, [PCtxt2], [F1: C2]).
varchecks(VAR, alter, ci, [F2:C3], '_').
yarcbecks(VAR, alter, ci, [F2:C4], '_').
yarchecks (VAR, alter, ci, [F2 :C5], '_').
where [PCtxt] denotes a context definition and [Fi:Ci] denotes validation checks represented as condition statements. Using these specifications, we can determine that among the two integrated altering flow paths P1 and P2: Path P1 Path P2 SC: Cnd1 SC:Cnd1 SC:V ⇒F1: V1 SC: ⇒1F1:V1 SC: ↦F1: SC: ↦F1 PCTxt2 PCTxt1 F1:C2 F2:C2 F1: V1 ⇒F2:V2 F1: V ⇒F2:V2 F ↦F2 F ↦F2 F2:C3 F2:C3 F2:C4 F2:C4 F2:C5 F2:C5 F2 V ⇒F2:VAR F2 V ⇒F2:VAR P1 is correct while path P2 is flawed, since after establishing the context by PCtxt1, P2 does not include the validation checks required in that context. Note that, in the above example, only one of the two context-dependent validation checks apply to each flow path, whereas all the context-independent checks apply to each path.

(4) Virtues and Limitations

A major advantage of our penetration-analysis method is that it allows the complete, systematic analysis of a system. It can be used to verify specific penetration-resistance properties of a systems source code, and can be used for automating the tedious and repetitive aspects of penetration analysis. For example, Stages 1 and 3 can been automated (viz., Section VI). Stage 2 is performed manually since it does not typically involve repetitive activities. The partial automation of this stage is Possible if proper design and programming disciplines are used (viz., discussion in Section VII).

The penetration-analysis method of the present invention does not address system penetration caused by administrative subversion, by inadequate design or use of the hardware base, by system failures, or by insertion of miscreant code into tools necessary for system generation, distribution, or installation. Instead, it addresses system-penetration patterns caused by unprivileged users' code interactions with a system. Thus, the class of penetration patterns that can be discovered can be characterized precisely using this method.

Figure 5:
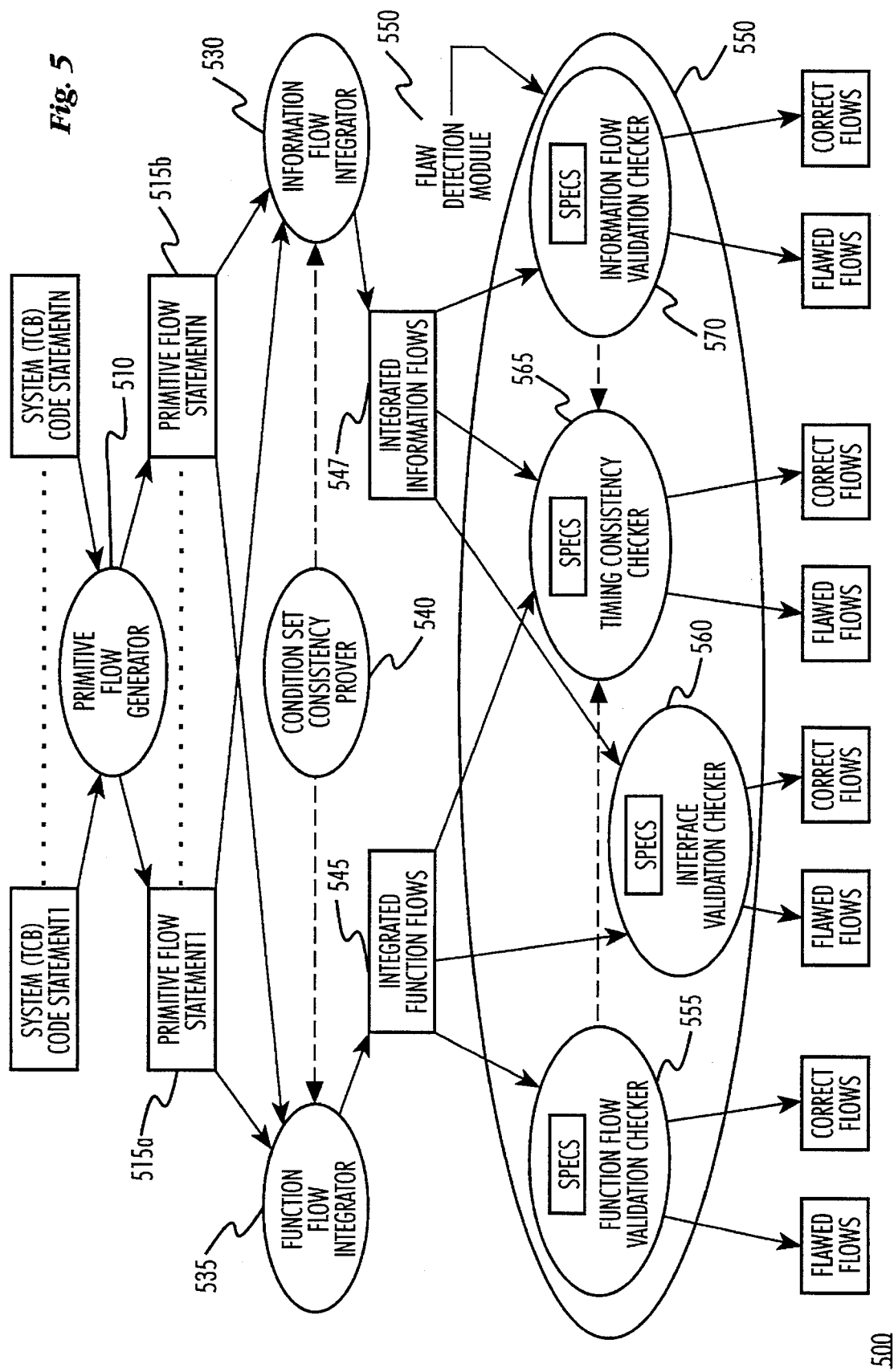
FIG. 5 illustrates an automated penetration analysis tool for Trusted Xenix™.

VI. A Tool for Automated penetration Analysis and its Applications (1) Tool Overview Referring to FIG. 5, the development of the Automated Penetration Analysis (APA) tool 500 is based on the penetration analysis method. FIG. 5 illustrates the basic structure of the APA tool 500. The ovals represent system modules while the rectangles represent data that is either input to or output from the modules. Most of the modules (all except the Primitive Flow Generator 510) have been written in Prolog. The preferred embodiment used Quintus Prolog 2.1 on an IBM RT, model 125, running AIX 2.2.1 for its implementation.

The source code of the system undergoing penetration analysis is the input to the Primitive Flow Generator (PFG) 510. This module converts each C source code statement into one or more Prolog facts called the primitive flow statements 515a, 515b. The primitive flow statements record all unit information flows, all unit function flows (call and return statements), all unit condition statements, and sequencing data so that the unit flows can be integrated. The PFG 510, which was developed as a part of a earlier covert storage-channel analysis project described in He, J., *Information Flow Analysis for Covert-Channel Identification in Multiple Secure Operating Systems*, Proc. of the 3rd IEEE Workshop on Computer Security Foundations, pp. 139–48, Franconia N.H. (June 1990) and He, J., *An Automated Security for Covert-Channel Analysis in Multilevel Secure Operating Systems*, Ph.D. Dissertation, Department of Electrical Engineering, University of Maryland (August 1990) is written in C, lex and yacc.

The PFG 510 is built on a parser which uses the lex and yacc software tools of Unix. It works on individual functions of an input C language program, and generates a set of Prolog facts that capture all relations in the original C function that are necessary to integrate all the unit function and information flows along with the conditions checked along the way. It must be noted that there is a one-to-many mapping relation between the set of C language statements and the set of Prolog facts.

A major issue in the design of the PFG 510 was the identification of the necessary set of Prolog predicates that will capture all the pertinent details of C language statements. As detailed in He, J., *An Automated System for Covert-Channel Analysis in Multilevel Secure Operating Systems*, (cited above), it was determined that a set of twelve primitive flow relations and two predicates were sufficient.

A second important design issue was to develop a method of ordering the primitive flow relations to preserve the sequence they represent in the source C language program. This was done by adding three extra digit arguments to each Prolog predicate to represent the sequencing information in the C program.

The use and handling of pointer variables in the C language gives rise to another important issue about the representation of the level of indirection of a certain variable. In C, the level of indirection of a variable is represented by prefixing the variable identifier by a string of "*"s and/or "&"s. The PFG 510 achieves the same effect by representing a variable as an association of an identifier and a numeral (for the number of "*"s and "&"s preceding the identifier of the variable.)

The Information Flow Integrator (IFI) 530 integrates the execution paths between a given entry point (system call or kernel call) at the system interface and a given global variable within the system, while the Function Flow Integrator (FFI) 535 integrates flows between a given system entry point and a given internal function within the system. The flow integrators 530, 535 execution time is exponential in relation to the size of the input program.

Information and control flow techniques are used to integrate the execution paths within the system source code, and generate integrated flow paths. These paths show, in a sequential manner, all the pertinent information flows, control flows between functions, and the choices made in the conditions encountered along the execution path.

The Condition Set Consistency Prover (CSCP) 540 is used to verify that the unit conditions along a path do not contradict each other.

Figure 21:
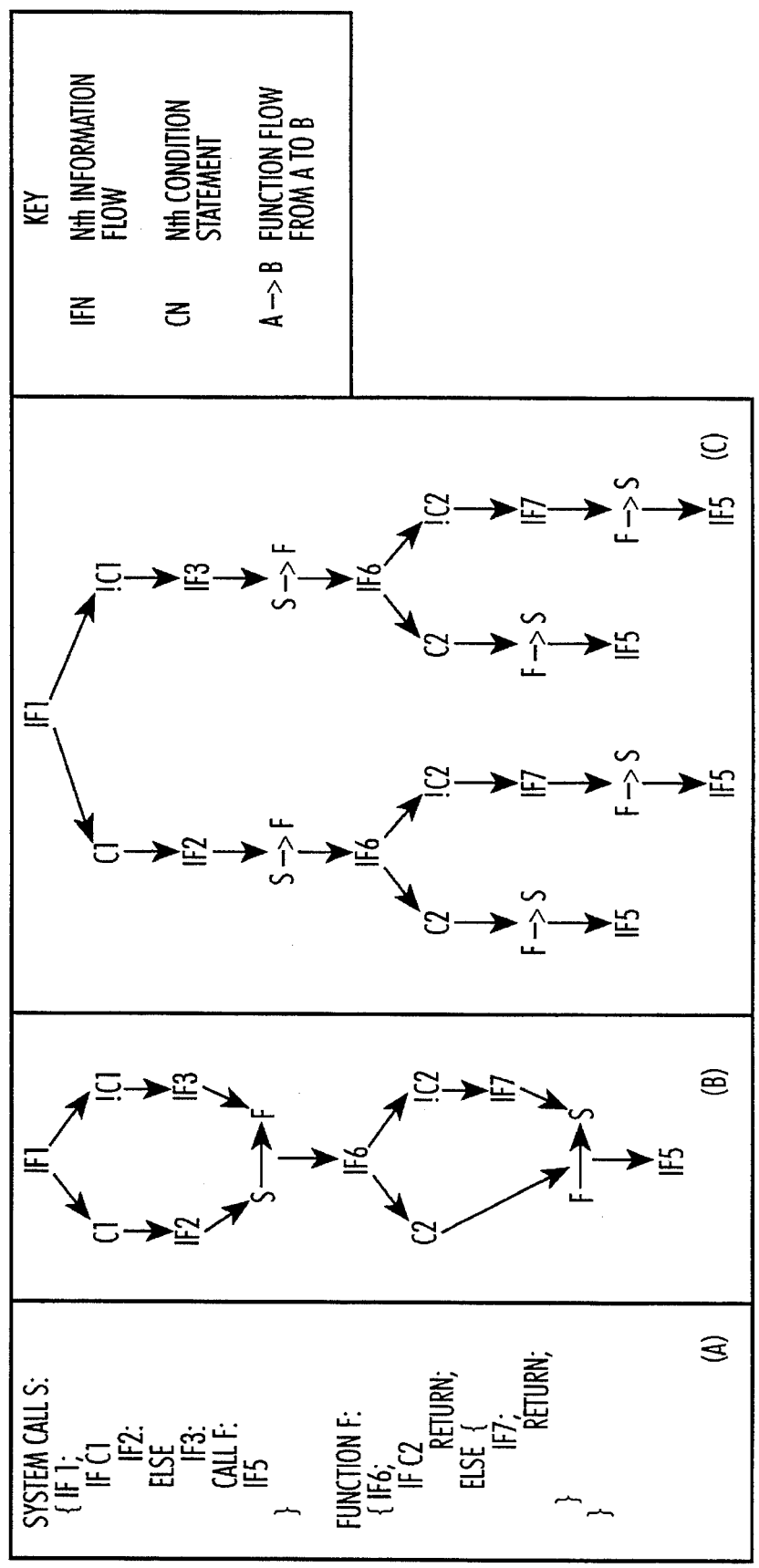
FIG. 21(a), FIG. 21(b), and FIG. 21(c) shows sample source code, a source code graph generated from the sample source code, and an execution tree generated from the source code graph.

To understand the implementation of the flow integrators 530, 535, try to visualize the source code of a system call, and the internal functions it invokes, in the form of a graph (see FIGS. 21(a) and 21(b)) In the graph shown in FIG. 21(b), the nodes represent either information flows, function flows or condition statements, and the edges represent the sequencing of the nodes. A condition check in the source code gives rise to a set of choices; each such choice is represented as a condition statement node in the graph. The various execution paths through a system call can thus be represented collectively as an execution tree-as illustrated in FIG. 21(c)—where the nodes and edges have the same meaning as in the graph. Tracing a single path through the execution tree will provide a single execution path.

The primitive flow statements essentially represent the nodes of the execution tree. The flow integrators 530, 535 consolidate the set of primitive flow statements 515 to generate the execution tree, and then perform a depth-first search of the execution tree to find a specified information or function flow starting at a specified system call. Due to the inherent tree search capabilities of the Prolog language, the (i) condition statements, (ii) information flows, and (iii) function flows along the various branches of the execution tree, and the exact sequential order in which they were encountered, are kept track of by arguments to recursively called procedures.

The Information Flow Integrator (IFI) used by the preferred embodiment were adapted from the covert storage-channel analysis project, described in He, J., *An Automated System for Covert Channel Analysis in Multilevel Secure Operating Systems*, Ph.D. Dissertation, Department of Electrical Engineering, University of Maryland (August 1990), which is hereby incorporated by reference in its entirety, to design the information and function flow integrators 530, 535. When the IFI 530 is tracing an altering path to a global variable, it traces an execution path from the system interface to a information flow which alters a given global variable. In other words, it searches the execution tree for a information flow from a to b, where b is the given global variable. Along this altering path, we need to know all the condition checks that have been done to see if the set is inclusive of the checks mandated by the penetration resistance properties. Since global variables are almost always aliased to local variables inside the function in which they are either altered, viewed, or checked as a part of a condition, we need to keep track of all the variable aliases that exist at every point along the execution path; this allows us to disambiguate the variables involved in the condition checks and to identify the (global) variables involved in the individual information flows.

The above argument about disambiguation of variables also applies when the IFI 530 is tracing a viewing path to a global variable. In this case, the IFI 530 searches for a (global) flow from a to b, where a is the given global variable and b is a variable that is directly or indirectly visible at the user interface (e.g. the u.u_error variable in Unix). The integrated paths for both altering as well as viewing flows also need to show the set of unit information flows that transitively result in the alteration or viewing of the global variable.

The FFI 535 traces execution paths that lead to a call statement to a given critical internal function. For penetration analysis, we need to know the condition checks done along the path to ensure that the mandated checks have been carried out. We also need to know the unit function flows that transitively result in the invocation of the critical function from the entry point at the TCB interface. Furthermore, we also need to know the unit information flows from the actual parameters of the target function call to the formal parameters. In order to disambiguate the variables which form the actual parameters of the target function call, and the variables involved in the condition checks, we need to keep track of all the aliases set up along the execution paths just as in the Information Flow Integrator.

The flow integration stage of the APA tool 500 is the most complex and difficult one of the three. Since it involves simultaneous execution path integration and search for a target information or control flow, the procedure is of exponential time complexity. [The target flow is the (information or control) flow that we are searching for as we traverse the execution tree.] Hence, even for a relatively small operating system such as Secure Xenix, a large amount of computational power is required. Consequently, we looked for ways to optimize the integration and search process as much as possible.

Two databases of Prolog facts are used by the integrators to prune the search tree. The first database represents hints about the possibility of reaching a target information and function flow through a particular entry point at the TCB interface (or TCB internal function). This database is generated by analysis of the set of primitive flows. The second database represents the knowledge acquired by the integrators and is updated with each new run to record the actual reachability of particular (information or function) flows through TCB entry points.

The flow integration stage of the tool include a number of major and minor methods of optimization. Some of the more noteworthy optimization techniques are detailed in the following paragraphs.

When the integration process comes to a call statement to a function F, the (hint and knowledge) databases are consulted to determine whether there exists a possibility of reaching the target information or function flow through F; if so, the code for F is traversed for flow integration; otherwise, the code for F is bypassed and integration proceeds to the statement sequentially next to the call statement. In other words, the databases are used to avoid entering functions which are known not to lead to the given target flow.

If the integrators 530, 535 come to a call statement to a function F, and it decides to traverse the code for F (for integration purposes), it remembers the set of conditions C1 checked up to that call statement. If that same call statement is encountered again through some other execution path under a different set of conditions C2, the integrators will not traverse the code for F if C1 is a subset of C2. This saves the effort of generating integrated execution paths which are supersets of other integrated execution paths.

When an integrator 530, 535 finds an integrated path to the target flow, it remembers the successful integrated flow path FP1. If any of the call statements along that successful path is encountered again (with the set of conditions C2) while trying to integrate additional paths to the target flow, then the integrator 530, 535 locates the previous set of conditions C1 for that same call statement. If C2 is not a superset of C1, then the integrator 530, 535 generates a second successful integrated flow path FP2 by appending the appropriate parts of FP1 to the current integrated flow path. (Obviously, the CSCP 540, described in detail below, is consulted to ensure that FP2 is a consistent set. This results in very large savings in time and effort by avoiding duplication of parts of the integration process.)

If the integrator 530, 535 comes to a conditional statement, it tries to determine if the statements within the "then" or "else" sections of code are relevant to the target flow in any way; if not, the code for the entire conditional section is skipped and execution proceeds to the statement that follows the conditional block.

Whenever the integrator 530, 535 reaches a dead end in the execution path tree, it remembers the statement beyond which no more useful flows were found. If that statement is encountered again during the process of integration, the integrator 530, 535 discards the branch originating from that statement so that effort is not spent twice pursuing a useless branch. For example, if a search along the path (IF1, C1, IF2, S→F, IF6, C2,F→S, IF5) in FIG. 21(c) does not lead to the target flow we are looking for, then path (IF1, C1, IF2, S→F, IF6, !C2, IF7, F→S, IF5) will be discarded after IF7 since it is already known that the rest of that execution path is not fruitful.

The CSCP 540 is consulted at each branching point (condition check) in the execution tree to evaluate whether a certain choice in the current condition is the contradiction to any of the choices made in the condition checks that were encountered already along the execution path. If a contradiction is detected, that branch is discarded, and execution path integration proceeds along the next branch which does not contradict the previous set of conditions. This method of tree pruning is very effective and allows the integrator 530, 535 to discard impossible execution paths.

However, this is more difficult than is readily apparent for several reasons. First, condition statements in a high level language such as C may be fairly complex with a large number of operators and variables, conjunctions, disjunctions, negations, and two or more levels of nesting. The condition statement has to be broken down to the simplest basic components before comparisons can be made. Each such basic component has to be interpreted in the context it appeared in the original condition and all the possible ways of contradicting the basic components have to be considered. Moreover, the variables involved very often are aliases of other (local or global) variables and, unless we disambiguate the variables using the current set of aliases, there is a very high probability of missing contradictions. One or more levels of indirection introduced by pointer addressing further complicates the discovery of impossible execution paths. Sometimes a condition choice is self-contradictory when the variables involved are disambiguated and has to be detected as such.

The Flaw Detection Module (FDM) 550 analyzes the integrated flows 545, 547 or execution paths generated by the flow integrators 530, 535. It is based on the Hypothesis of Penetration Patterns, and uses the rules of the penetration analysis model to detect penetration flaws in the integrated execution paths. The set of condition statements required for penetration resistance is supplied to the submodules in the form of a database of Prolog specifications derived from an interpretation of the penetration-resistance properties for the system under consideration. The submodules then analyze the integrated flow paths input to the FDM 550 and compare the actual checks present with the set of required validation checks. Whenever a submodule fails to find a specified validation check, it flags that path as containing a penetration related flaw. Thus, it separates the flawed integrated flow paths from the correct ones.

Figure 6A:
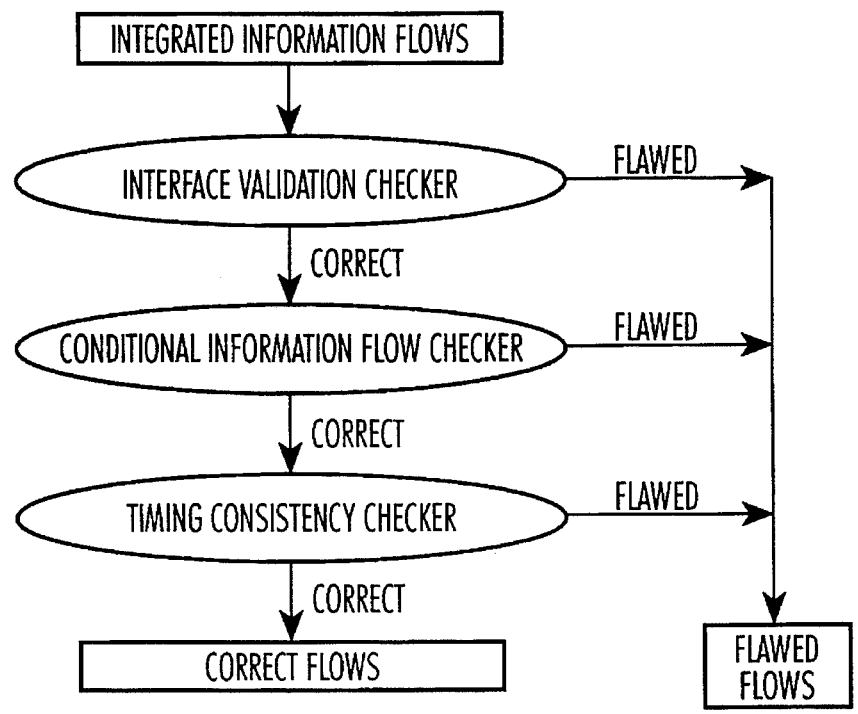
FIG. 6(a) and FIG. 6(b) are flowcharts of the process used by the automated penetration analysis tool for verification of integrated flow paths.
Figure 6B:
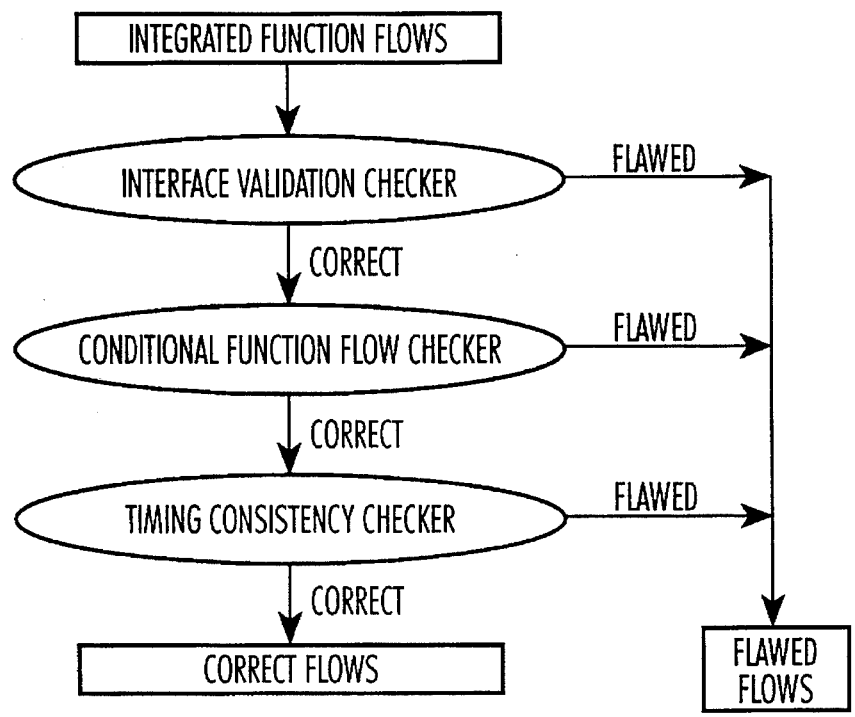

The FDM 550 has four submodules: (i) the Interface Validation Checker 560—which checks for incorrect/missing validations of entry point parameters and privileges, (ii) the Conditional Information Flow Checker 520—which detects incorrect/missing access to global variables, (iii) the Conditional Function Flow checker 555—which detects incorrect/missing validation checks required for invoking critical internal functions, and (iv) the Timing Consistency Checker 565—which looks for timing inconsistencies of condition checks. (Of course, the number of validation-check specifications for each system call depends usually on the call itself; e.g., on the interface conditions and execution paths shared with other calls). The verification of the integrated flow paths is illustrated in FIGS. 6(*a*) and 6(*b*).

The user interface of the Automated Penetration Analysis tool 500 consists of a set of commands that either, a) search for integrated flow paths that lead to a target information or function flow starting from a given set of system entry points, or b) perform penetration analysis on the set of integrated flow paths found for a given set of entry points and a given target flow, to flag the flow paths that possibly contain penetration-related flaws.

In both cases, the command parameters specify the set of entry points, the target flow and whether one or all such integrated flow paths are to be located.

(2) An Example of Automated Penetration Analysis In this section, a simple example is presented to illustrate the function of the various stages of the Automated Penetration Analysis tool 500 and to provide some intuition for the practical use of the penetration analysis method.

TABLE A illustrates the simplified source code of the Secure Xenix system call ustat which has two user-supplied parameters dev and buf.

TABLE A

```
SYSTEM CALL
ustat()
{
    register struct mount *mp;
    filsyps_t fp;
    register struct a{
        int dev;
        faddr_t buf;
    } *uap;
    uap = (struct a *) u.u_ap;
    for (mp=mount;
         mp < &mount[v.v_mount];
         mp++) {
        if (mp -> m_dev==uap->dev) {
            fp = (filsysp_t)bimap(mp->m_bufp);
            if(copyseg(&fp->s_tfree, uap->buf,
               sizeof(daddr_t) + sizeof(ino_t)) == -1) {
                u.u._error = EFAULT
            }
            return;
        }
    }
    u.u_error = EINVAL;
}
```

This call returns information about a mounted file system identified by device number dev, and writes it out to a location pointed at by parameter buf. ustat calls the assembly routine copyseg to write out to location buf.

The kernel internal function copyseg is considered a critical function because it copies the contents of one segment to another without checking for read/write access to the segments being read/written and without checking whether the segment selectors refer to user area or system area. The reason of omitting these checks is that, by the time this function is executed, the user's access to objects have been already verified. copyseg has three arguments, src, dst and cnt specifying the source and destination segment selectors (for the copy operation) and the number of bytes to be copied.

Figures 7A, 7B:
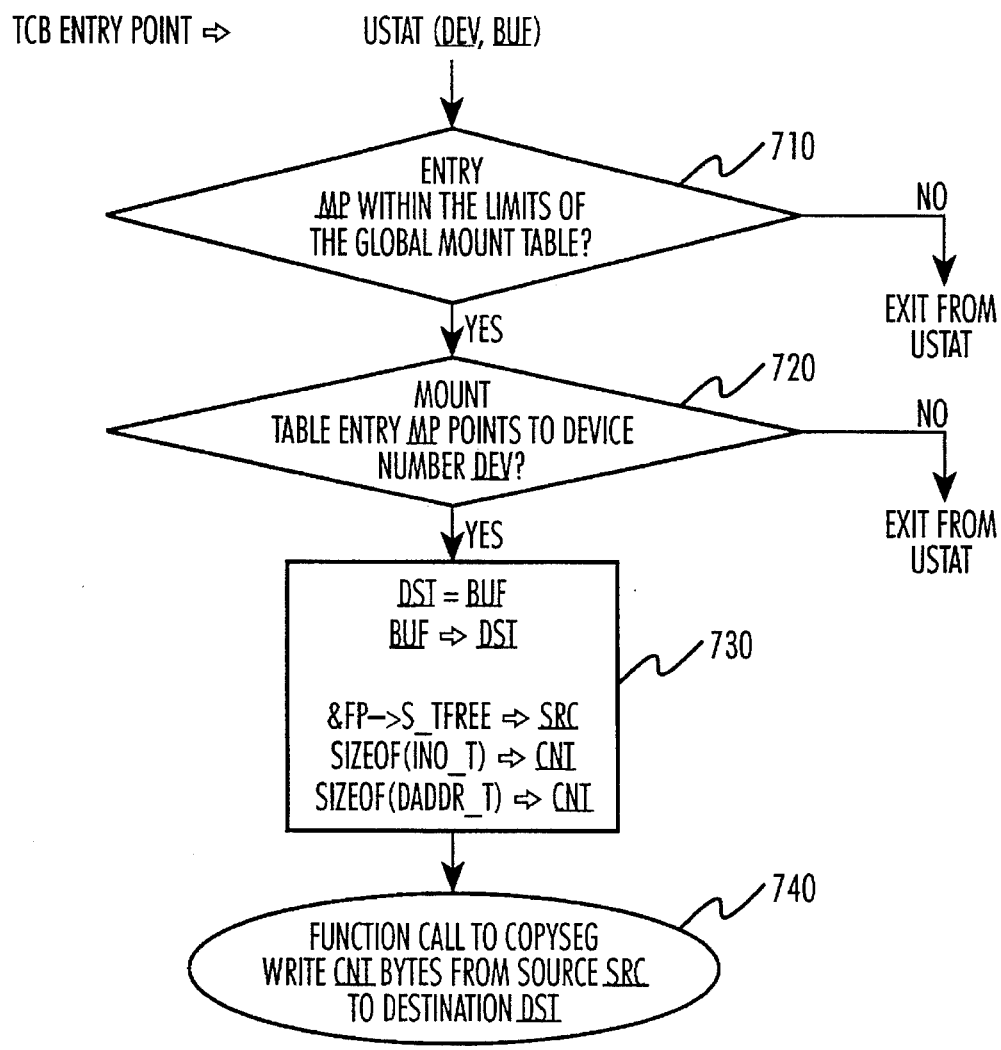
FIG. 7 shows a single integrated flow path including a function flow to copyseg starting at the ustat system call.

When the segment of code for ustat shown in TABLE A is input to the PFG 510, the output is a set of primitive flow statements 515*a*, 515*b*. The set of primitive flows are then fed to the FFI 535. The FFI 535 integrates (execution) flow paths leading to a given function flow. FIG. 7 shows a single integrated flow path including a function flow to copyseg starting at the ustat system call, first in APA format (FIG. 7a) and then in block diagram format (FIG. 7b).

The penetration-resistance specifications relevant to this example are shown below, first in plain English (TABLE B), then in APA syntax (TABLE C).

TABLE B

```
parchecks(ustat,
         [mount table entry corresponding to dev exists]
         ci,
         '_').
parchecks(ustat,
         [buf is in user space and is writable],
         ci,
         '_').
funcchecks(copyseg,
         cd,
         [source address is supplied by user],
         ['IMPOSSIBLE']).
funcchecks(copyseg,
         cd,
         [destination address is supplied by user],
         ['IMPOSSIBLE'].
```

TABLE C

```
parchecks(ustat,
     [_, ->, m_dev, ==, '.', u_ap. ->, dev],
     ci,
     '_').
parchecks(ustat,
     [copyout, '(',_, ',', u, '.', u_ap, ->buf, '.',_],
     ci,
     '_').
funcchecks(copyseg,
     cd,
     [_, [u, '.', u_; ap, ->, _], _, ==>, copyseg, src, 0],
     ['IMPOSSIBLE']).
funcchecks(copyseg,
     cd,
     [_, [u, '.', u_ap, ->, _], _, ==>, copyseg, dst, 0],
     ['IMPOSSIBLE'].
```

The FDM 550 uses the specifications to analyze the integrated flow path and arrives at the conclusion that the flow path is flawed since the parameter checks for buf cannot be matched in the flow path. Specifically, the flaw appears because rnstat proceeds to write into the location pointed at by buf, but fails to check that buf points to a writable location within the invoking user's address space.

Figure 8:
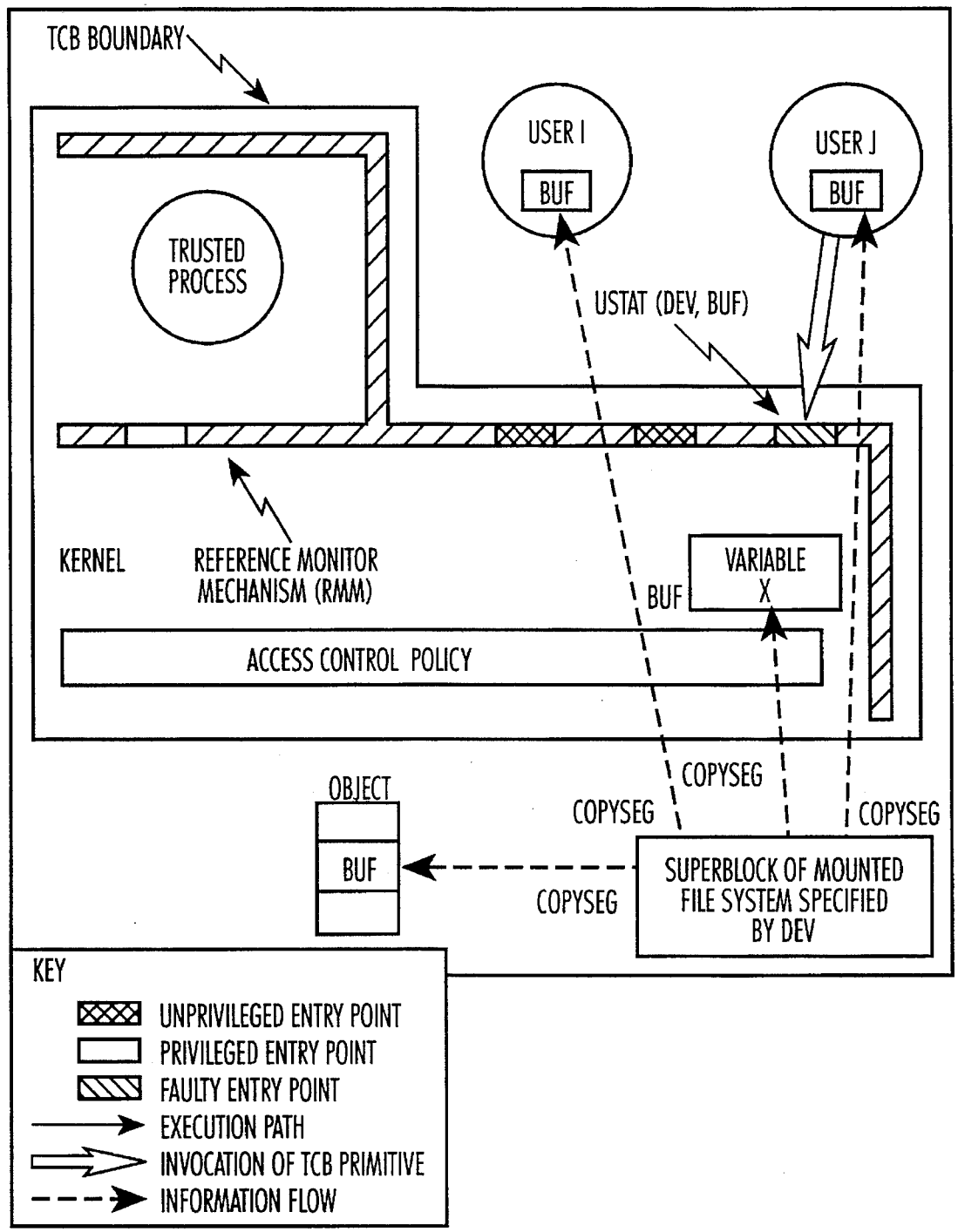
FIG. 8 illustrates the penetration scenario for exploiting the flaw illustrated in FIG. 7.

The penetration scenario for exploiting this flaw is illustrated in FIG. 8. As the figure shows, the user invoking ustat can cause the kernel to write to any memory location (even outside his own address space) and can clobber useful information there. This example illustrates a violation of the isolation property because of inadequate parameter validation and/or absent system/user address space separation checks.

(3) Experiments Using the Automated Penetration Analysis Tool on Secure Xenix Source Code Several additional experiments were conducted using the Automated Penetration Analysis tool 500 on the source code Secure Xenix, a Unix®—type operating system. A few of them will be described here in detail to Illustrate the usefulness of the tool in determining both correct and flawed implementations of the penetration-resistance properties.

In FIGS. 9–17, sections of Secure Xenix integrated (execution) flow paths are shown in block-diagram format. For the sake of brevity, only the selected path components are included. The following conventions are adopted in illustrating integrated flows: (1) the information flows are represented by rectangles, (2) the function calls and returns are represented by ovals, (3) the conditions checked are represented as diamond shaped boxes, and (4) the sequencing between flows, calls, and condition checks are represented by arrows.

(a) Experiments on Kernel Code

Experiment 1. Path to the panic function: This experiment illustrates a case of TCB penetration without Reference Monitor Mechanism penetration, which is caused by an undesirable system/user dependency. The paths from all the system entry points (system calls) are traced to the Secure Xenix internal function panic, which causes the system to crash. The experiment revealed that out of the 110 system calls in the system analyzed, 38 of the system calls could lead an unprivileged user to the panic function. In fact, there are 15 independent paths to the panic function that could be traced from the user interface.

Figure 9A:
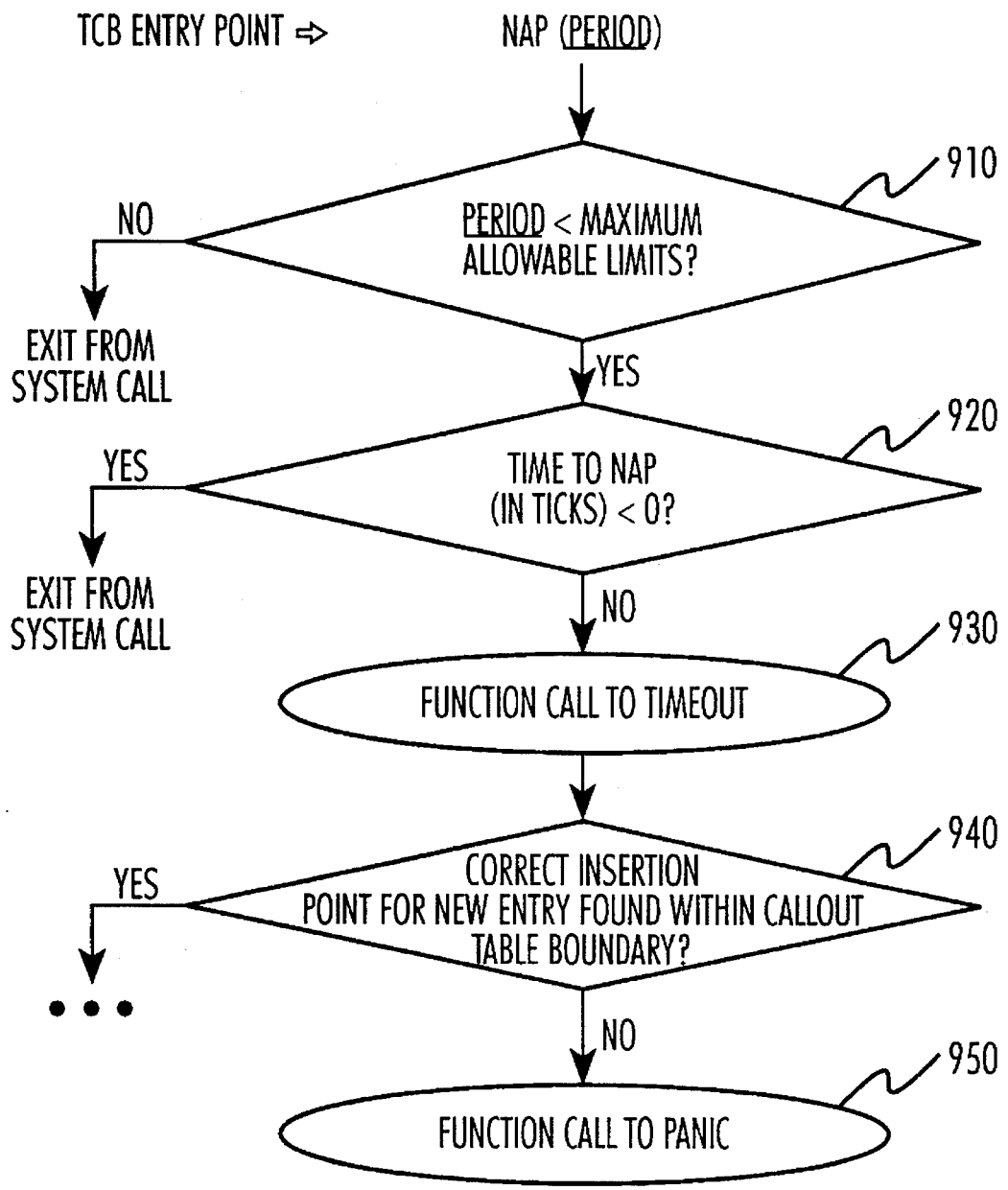
FIG. 9(a) and FIG. 9(b) show an example of a flow path to the panic function and the resulting scenario of penetration.
Figure 9B:
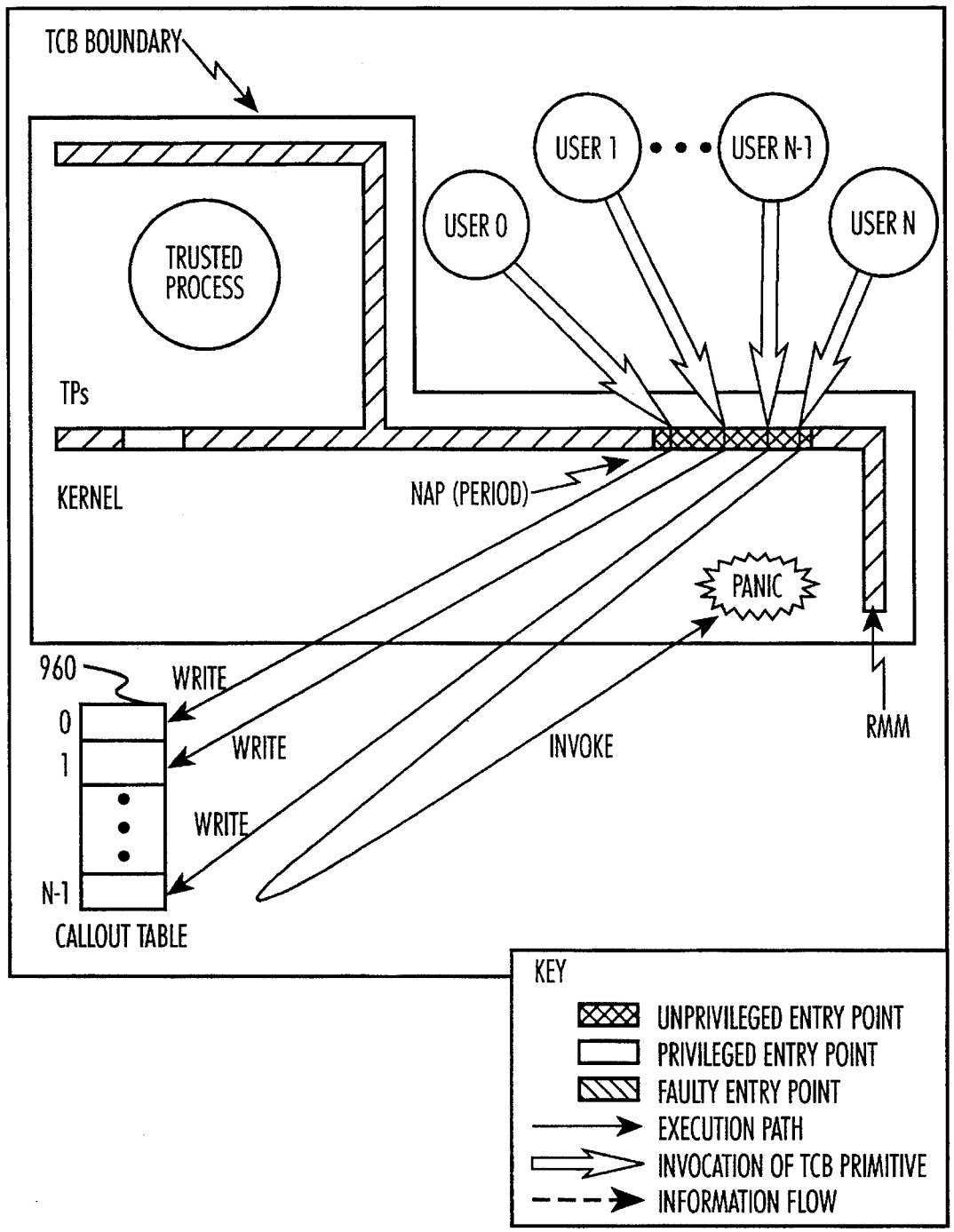

In FIG. 9(a) and FIG. 9(b), one such path is shown to the panic function and the resulting scenario of penetration. This path starts at the nap system call which suspends the calling process from execution for at least the number of milliseconds specified by parameter period. The parameter period is first checked to be within the maximum allowable range, as indicated in block 910. In block 920, the number of clock ticks corresponding to the value of period is also checked to be greater than zero. Next, the function timeout is invoked to insert an appropriate entry into the global callout table, as indicated in block 930. The callout table is a list of entries each specifying that a certain function is to be called after a certain number of clock ticks. The kernel sorts entries in the callout table based on the number of ticks for that entry. The function timeout searches the callout table for the index of the correct insertion point for the new entry, as shown in block 940; if this index is beyond the table limits (i.e., the callout table would overflow if the new entry is inserted), then the system crashes by invoking the panic function, as shown in block 950. This is unsatisfactory, because a user could deliberately fork a large number of processes each of which invokes system call nap, thus causing the system to crash and resulting in denial-of-service to other users.

The scenario in FIG. 9(b) typifies an undesirable system/user dependence which should not be allowed to exist within a penetration-resistant system. It must be noted that the callout table 960 is a global variable and is not a system defined object. Hence, access to the callout table 960 is not monitored or controlled by the Reference Monitor Mechanism. In fact, there is no evidence of a breach of the Reference Monitor requirements, yet we have a scenario of TCB penetration.

Experiment 2. Interprocess signaling: The properties of isolation and noncircumventability are an integral part of the TCB penetration resistance properties as well as the Reference Monitor Mechanism. This experiment illustrates the correct implementation of both these properties in the context of interprocess signaling.

In a Unix type system, interprocess signaling is clone by altering the p_sig field of the proc structure associated with the process receiving the signal (see Bach, M., *The Design of the UNIX Operating System,* Prentice-Hall, Inc., Englewood Cliffs, N.J. (1986)). In this experiment, all the paths that alter the global variable procvm→p_sig starting from the user interface were traced using the IFI 530. It was found that this global variable was alterable only through three system calls, namely, kill, rexit, and wait. The Unix model of interprocess signaling is clearly exhibited in the integrated flow paths through these system calls to the global proc→p_sig variable.

Figure 10A:
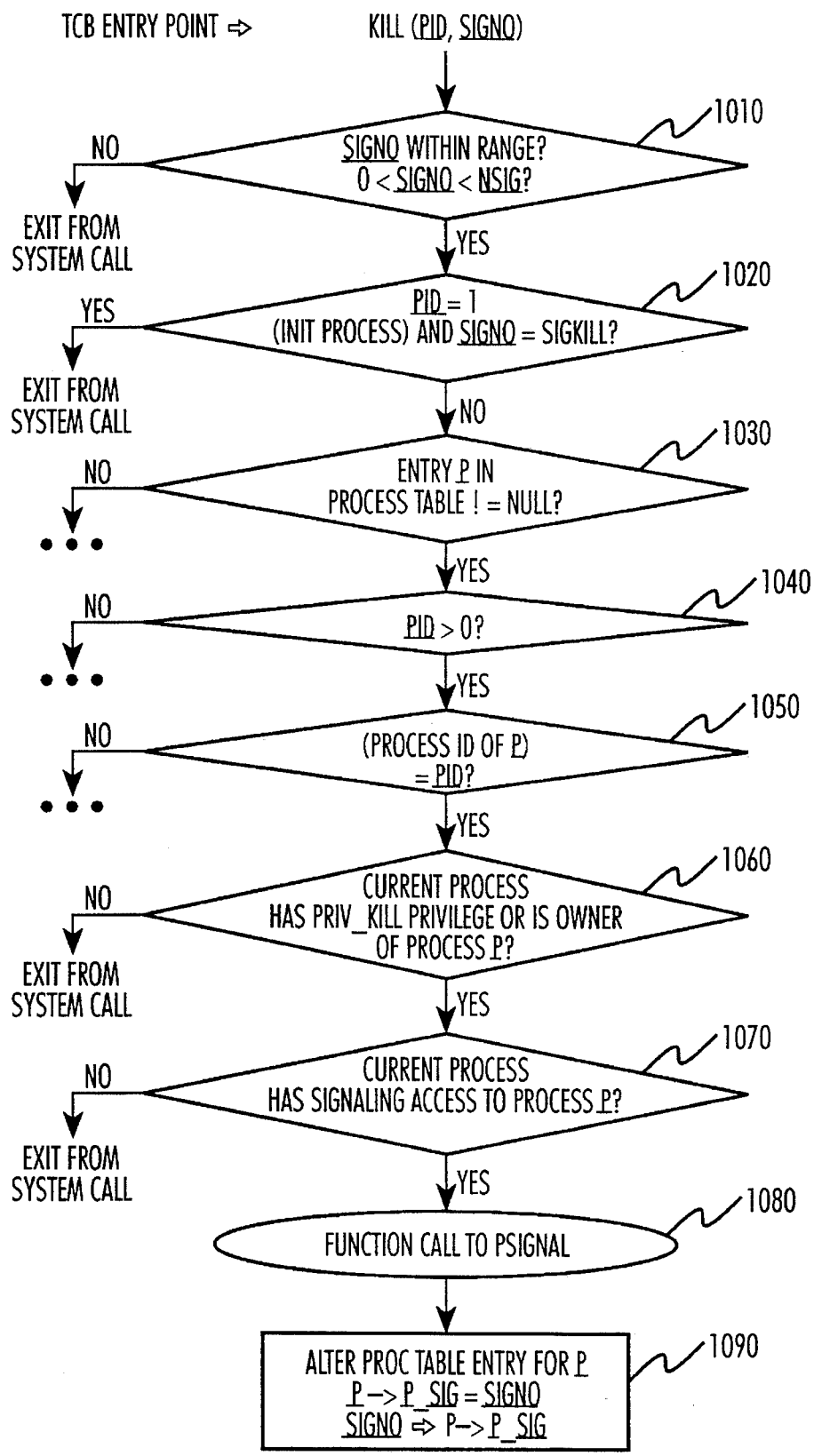
FIG. 10(a) and FIG. 10(b) show an example of a flow path from the kill system call to the signaling variable proc→p_sig and the access scenario within the TCB.
Figure 10B:
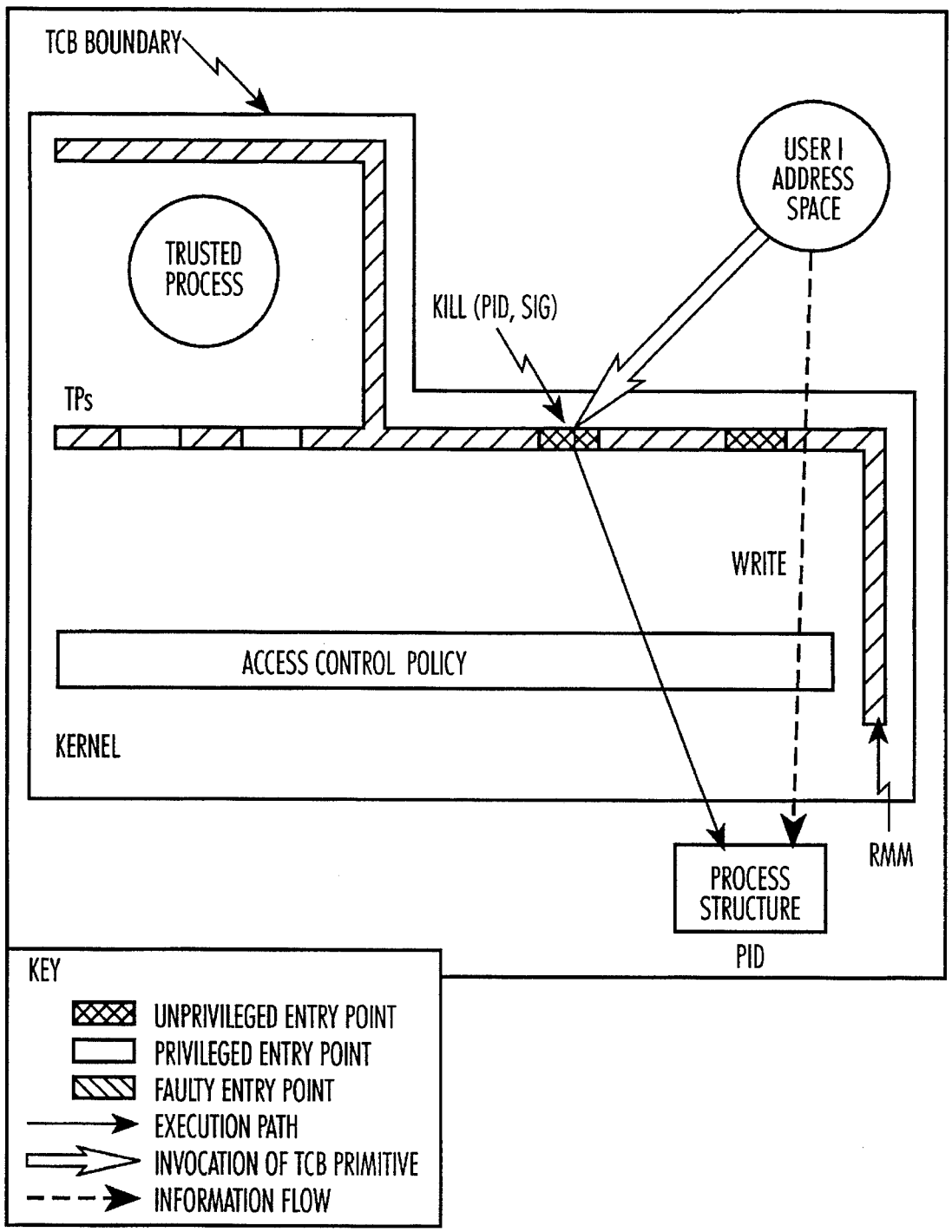

In FIG. 10(a) and FIG. 10(b), the flow path from the kill system call to the signaling variable proc→p_sig is shown, and the access scenario within the TCB. This system call sends a signal (specified by parameter signo) to a process or a group of processes specified by parameter pid. Parameter signo is verified to be within the allowable range for signal numbers, as indicated in block 1010. It is also checked that the user invoking the system call is not requesting that the init process (process id = 1) be killed, as indicated in block 1020. The global process table is then searched to locate the process p whose id matches pid and it is ensured that either the calling process has the PRIV_KILL privilege or is the owner of the process p, as shown in blocks 1030 through 1060. Next, the access control module is invoked to check whether the calling process has the access rights to send a signal to process p, as indicated in block 1070. If so, signo is entered into the p_sig field of the proc structure of process p, as shown in block 1090

The execution path in this example illustrates the correct implementation of the isolation property (since the parameter and privilege validations are performed adequately) and of the noncircumventability property for inter-process signaling (since alteration of the process signaling variable proc→p_sig is preceded by an access check for signaling.) If one or more of the required checks were missing, then we would have a TCB penetration scenario which would be caused by a direct breach of the Reference Monitor Mechanism.

Experiment 3. Paths to internal functions readi and writei: This experiment was done to identify violations of the noncircumventability property with respect to object content accessibility. No violations were found. We traced all the execution paths from the user interface leading to the invocation of the flat file system functions readi and writei. The flat file system service of a Unix based system provides the functions readi and writei to read and write the contents of a file as identified through the file inode pointer ip. Four user area variables specify the destination(source) address, the byte offset in the file, the number of bytes to read(write) and the type of segment from(to) which the read(write) operation is to be done. In other words, reading or writing the contents of a file is equivalent to invocation of the readi or writei functions with the inode pointer of the file.

Figure 11A:
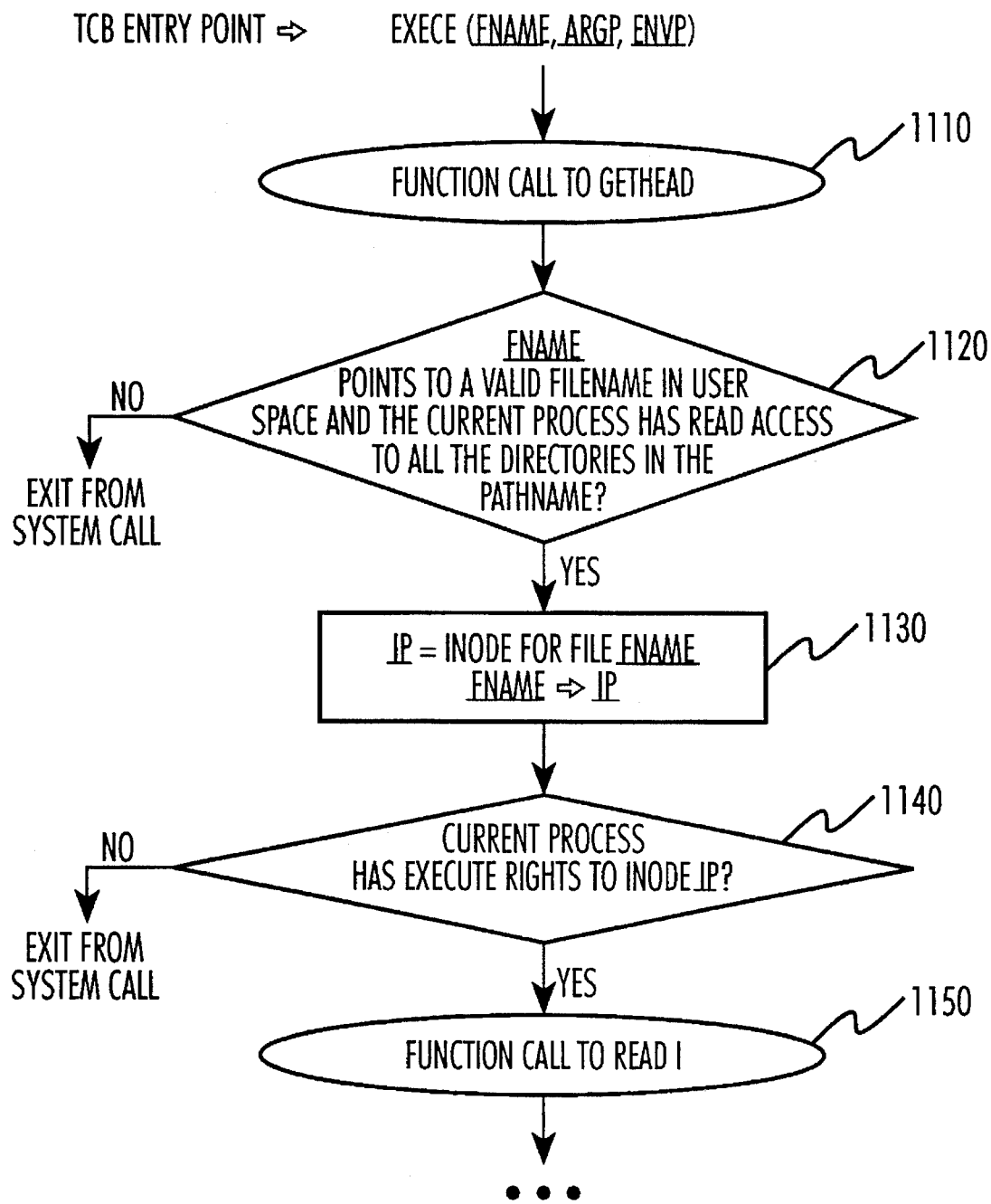
FIG. 11(a) and FIG. 11(b) show an example of a flow path to the readi function through the exece system call and the TCB scenario represented by it.
Figure 11B:
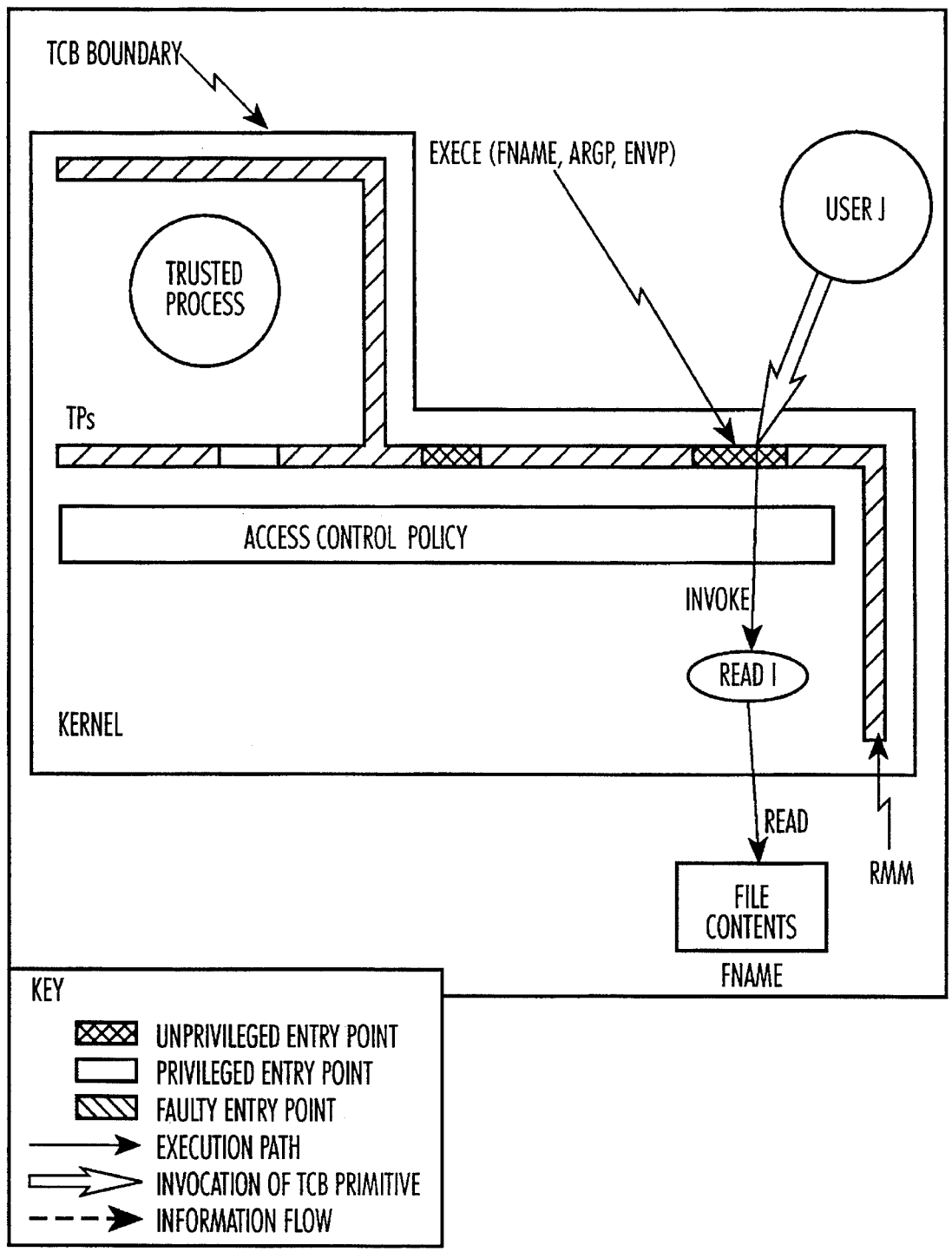

The FFI 535 was used to generate all the integrated function flow paths to the readi and writei internal functions. In FIG. 11(a) and FIG. 11(b), one such path is illustrated to the readi function through the exece system call and the TCB scenario represented by it. exece overlays the calling process with a new process constructed from an executable file pointed at by parameter path. Parameter argv is an array of character pointers constituting the argument list available to the new process and parameter envp is an array of character pointers constituting the environment of the new process. exece calls function gethead to locate the file pointed at by path and to read in the file header. Gethead checks access permission before calling readi to actually read in the file header.

This example is included to illustrate the correct implementation of the noncircumventability property for reference to object contents, since the invocation of the readi function to read from the file specified by path is preceded by an execute access check on that file. Again, as in the last example, there is a degree of penetration resistance owing to the correct implementation of the Reference Monitor Mechanism.

Experiment 4. Paths to the internal function copyseg: This experiment illustrates violations of the properties of isolation and noncircumventability through flow paths that lead to invocation of the critical internal function copyseg. In this experiment, all the integrated flow paths that lead to the copyseg routine starting from the user interface were raced. As mentioned in the last section, in all but two cases, copyseg was called to copy from/to segment selectors specified by the kernel. In the other two instances, namely through system calls ustat and shutdn, copyseg was called with user specified segment selectors. One such integrated execution path through the ustat system call and the resultant penetration scenario was illustrated in the last section in FIGS. 7 and 8. Here, in FIG. 12(a) and FIG. 12(b), a single integrated execution path is illustrated through the system call shutdn and the penetration scenario caused by it.

System call shutdn is part of the security operator function, and is used to halt the CPU. Before halting, it updates the information on disk based on the information in core memory and sends out appropriate messages to the console. It has a single argument addr. If addr is nonzero, it specifies the address of a superblock that is written to the root device before the CPU is halted. This feature facilitates filesystem repair when the root superblock is corrupted and has to be replaced. Shutdn can be called only by a user possessing the privilege SHUTDN, which is possessed by the security operator role.

Figure 12A:
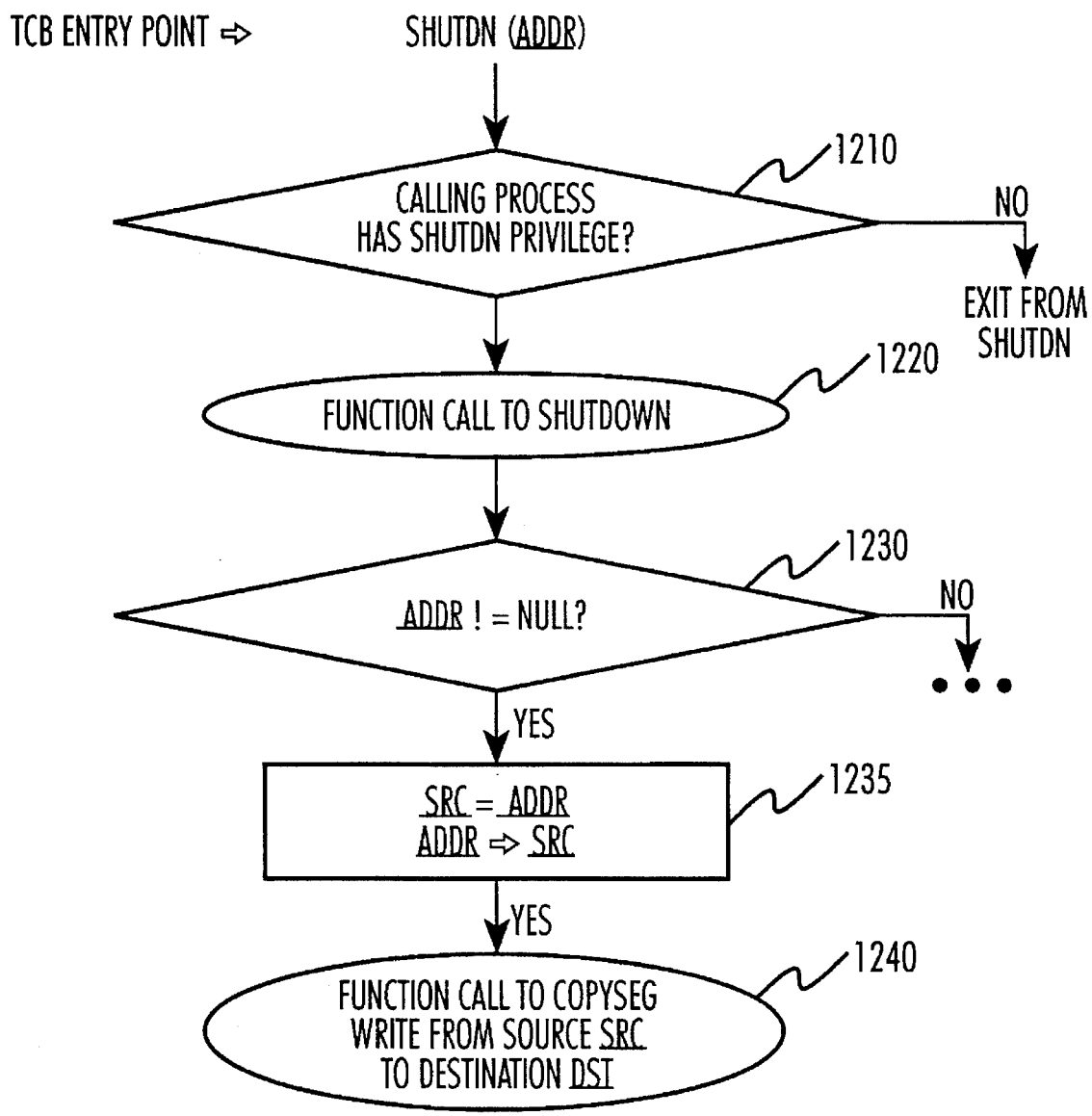
FIG. 12(a) and FIG. 12(b) show an example of a single integrated execution path through the system call shutdn and the penetration scenario caused by it.

Referring to FIG. 12(a), the SHUTDN privilege is first checked in block 1210 and then a function flow to internal function shutdown occurs in block 1220. Next, as shown in block 1230, the user parameter addr is checked to be nonzero before the function copyseg is called to write from the address specified by addr to the root superblock, as indicated in block 1240.

Figure 12B:
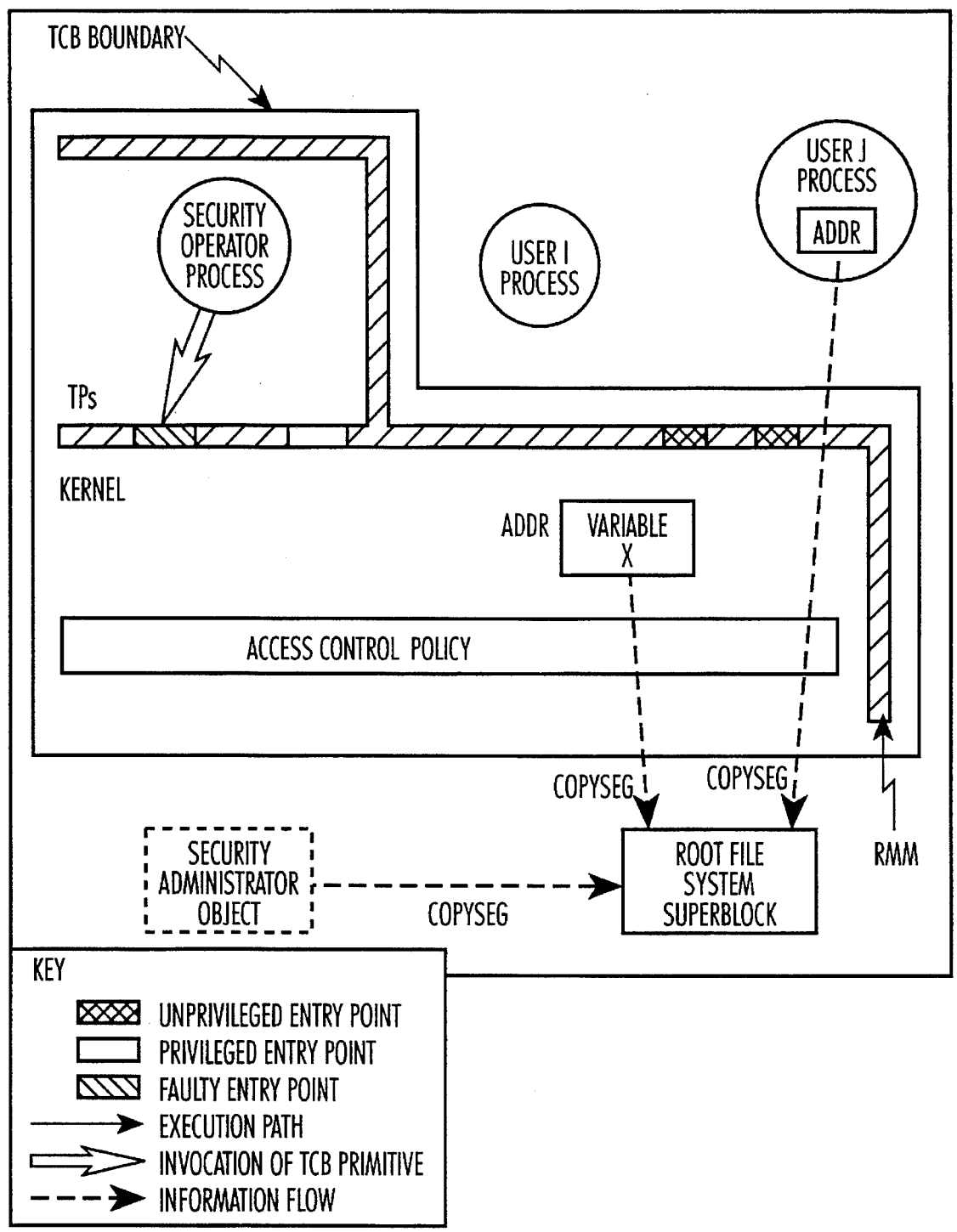

A problem of role separation arises here, because addr is an address specified by the user, and the execution path reveals that addr is not checked (to point to a readable location within the user's address space) before a copyseg operation writes the contents to the root superblock. Thus, as shown in FIG. 12(b), addr can point to any system area (including objects belonging to other system administrators) and the contents of addr are written to the root superblock which happens to be universally readable. This is a direct breach of role separation (see National Computer Security Center, *Trusted Facility Management Guideline*, NCSC-TG-015, Version 1, (Oct. 18, 1989), and represents a TCB penetration scenario which is caused by inadequate implementation of the Reference Monitor Mechanism.

Experiment 5. Alteration of the global mount table: This experiment illustrates penetration resistance checks that result from the property of consistency of globals. This property requires (among other things) that all global tables be maintained to be within the allowed bounds. In this experiment, all the ways of altering the global mount table are traced through the system calls amount and sumount to identify inadequate bounds checking that could result in table overflows or underflows.

The mount table maintains an entry for every mounted filesystem and serves as an association list for (device, i-number) pairs. The smount system call connects a filesystem in a specified section of a disk to the existing filesystem hierarchy, and system call sumount disconnects a filesystem from the hierarchy.

Figures 1, 13A:
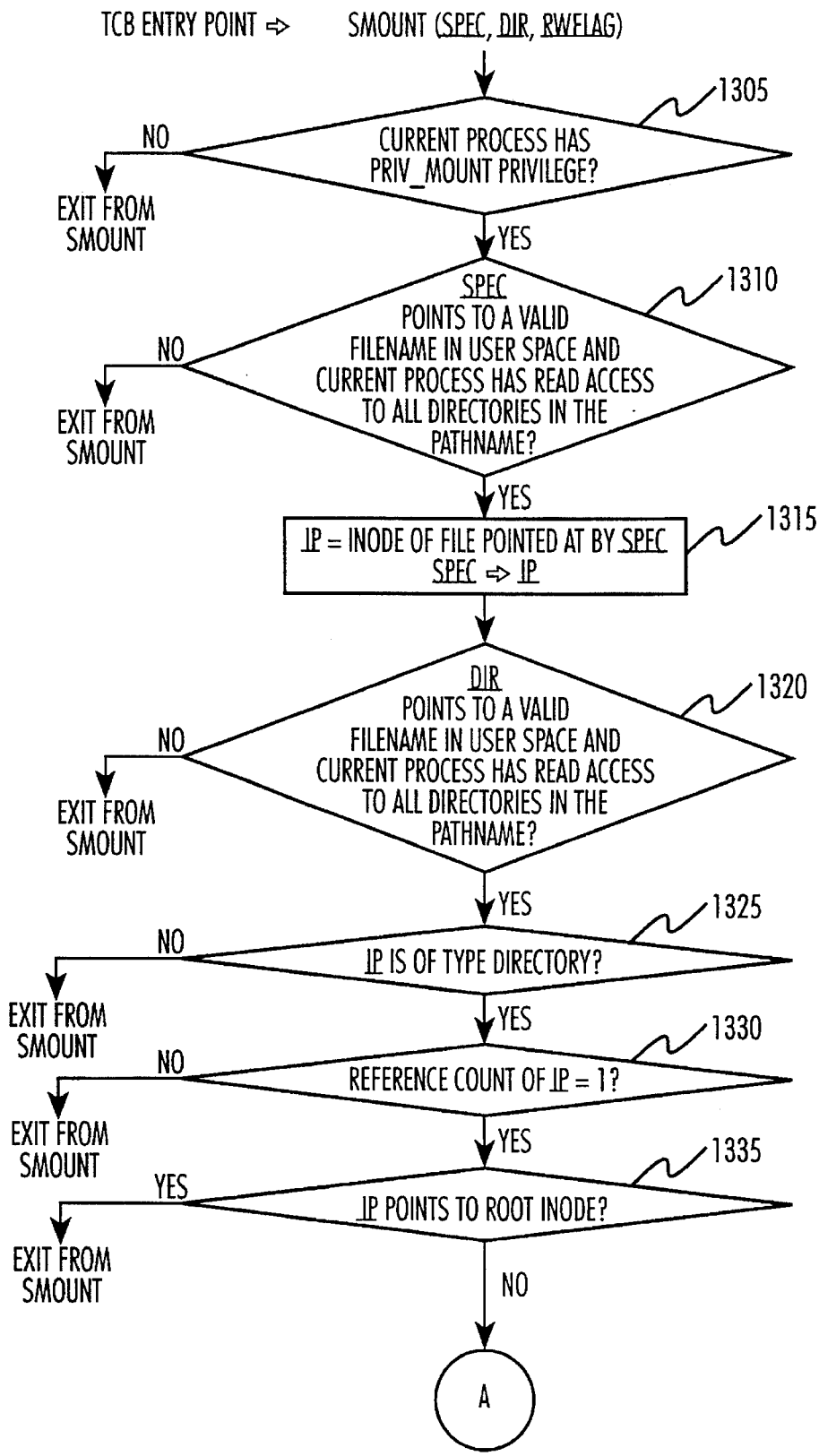
Figures 2, 13A:
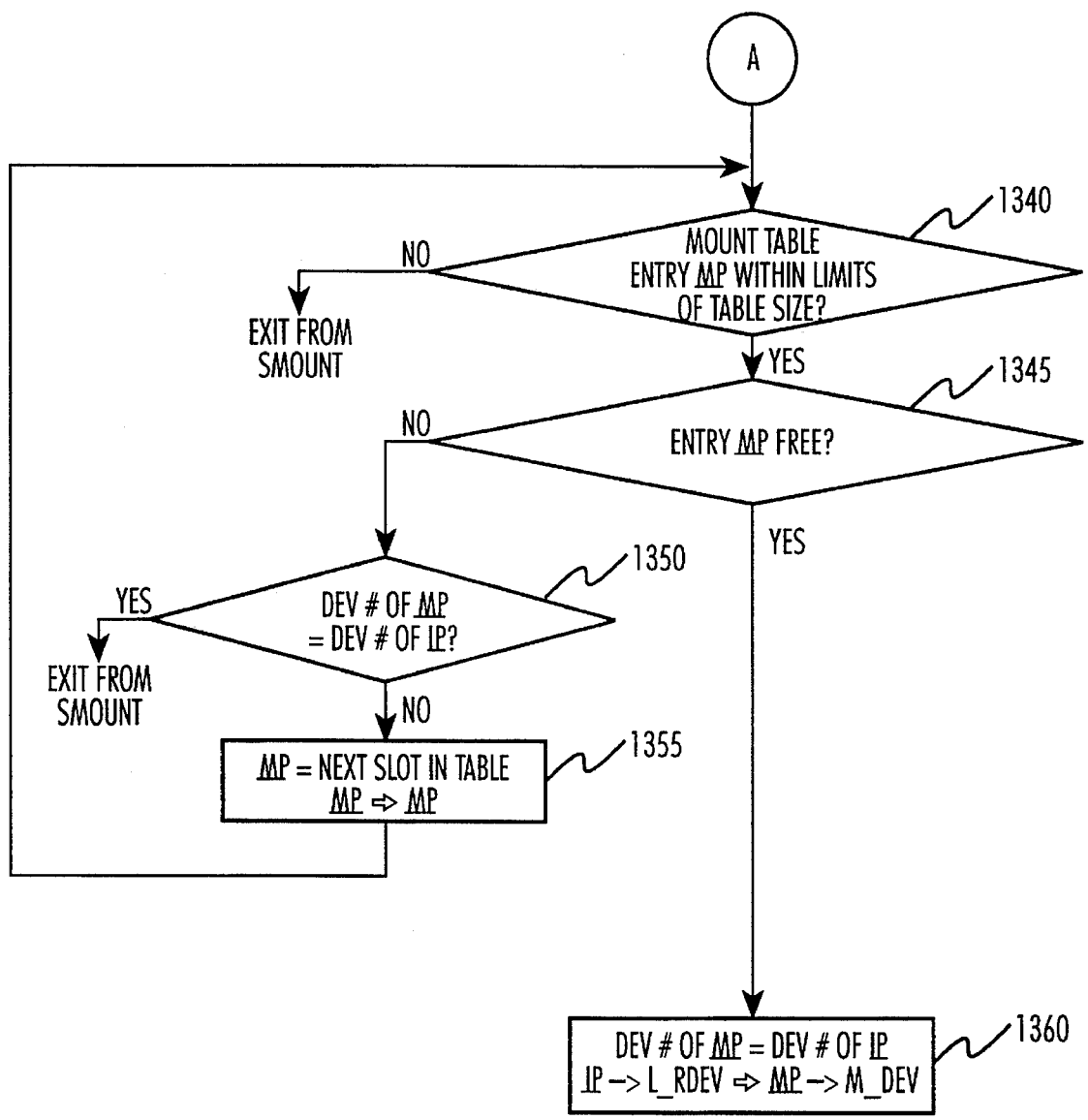
Figure 13B:
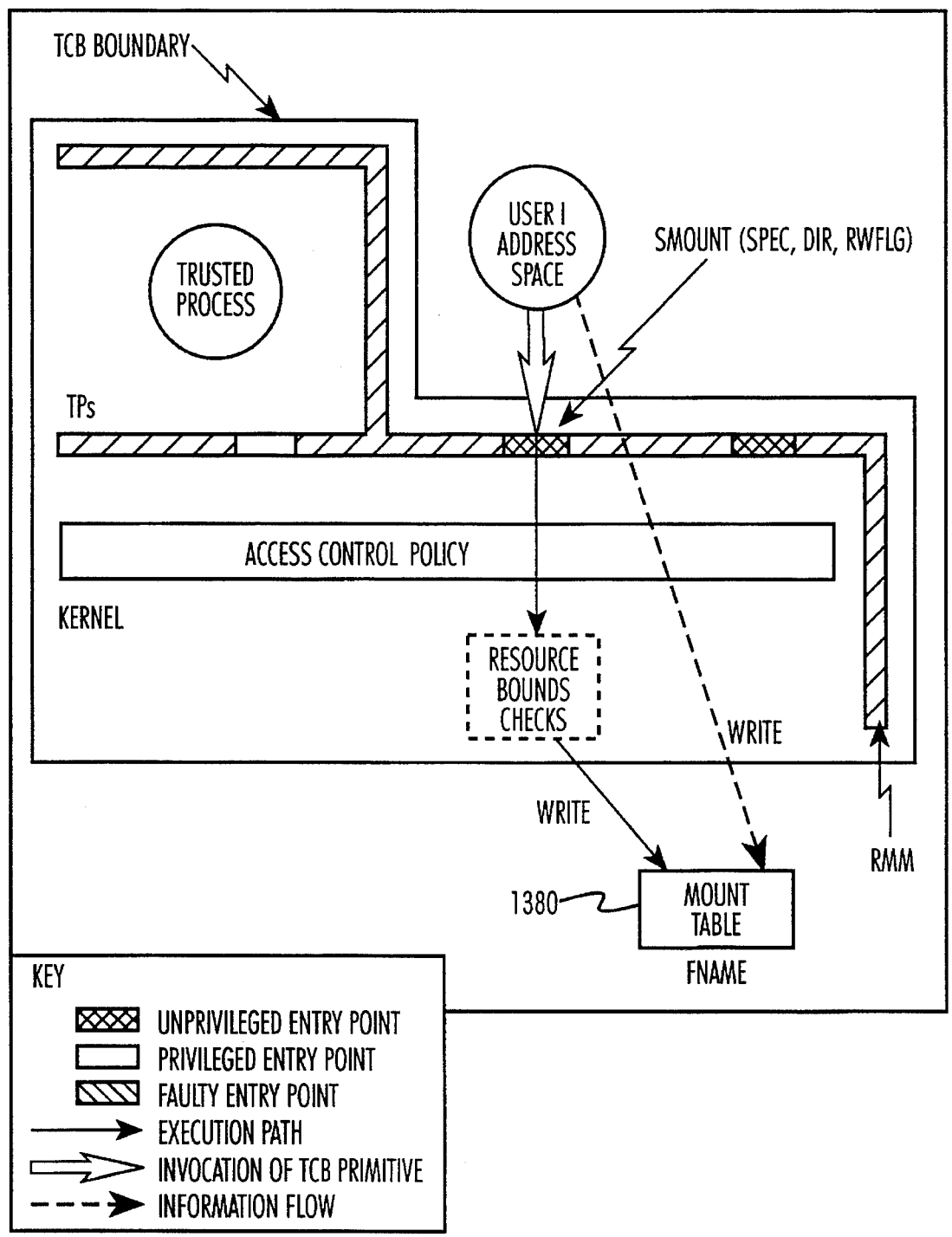

All the execution paths that led to the alteration of the mount table were found to perform adequate bounds checking. FIGS. 13A-1 and FIG. 13A-2 illustrate one of the integrated paths that alters the global variable mount→m_dev (the field that specifies the device number of a mounted filesystem), and the scenario within the TCB. System call smount mounts a filesystem identified by parameter spec on the directory identified by parameter dir, and parameter rwflag specifies the read/write access permission for the filesystem to be mounted. Within smount, the calling process is first verified to possess the PRIV_MOUNT privilege, as shown in block 1305. Next, as shown in blocks 1310 through 1320, the parameters spec and dir are checked to point to valid files in user space with read access (to the parent directories) for the calling process. dir is also verified to point to a directory file (other than the root directory) with a reference count of 1, as shown in blocks 1325 through 1335. The mount table entries are then scanned (within the limits of the maximum allowable size of the mount table), as shown in block 1340, and each non-free entry is checked to ensure that the device number for that entry is not the same as the device that is about to be mounted, as shown in blocks 1345 through 1355. When a free entry is found, the mount table is updated so that the device field of the free entry is set to equal the device number of the mounted on device, as shown in block 1360. In this example, the consistency of the global mount table is maintained by checking for the presence of a free entry within the limits of the table boundaries before making a new entry and altering the global mount→m_dev variable.

The execution path in this example satisfies the property of consistency of globals since the bounds checks are performed correctly. The property would be violated if the checks were absent or incorrect, and we would have a TCB penetration scenario that was not caused by a breach of the Reference Monitor Mechanism. This is because the mount table does not have an object representation in the system and, thus, access to it would not be mediated by the Reference Monitor Mechanism.

Experiment 6. Alteration of the global message queue table: This experiment reveals a violation of the property of timing consistency of condition checks. In system call msgsnd, the operations of access authorization and actual access are not done in an atomic sequence resulting in a potential timing inconsistency.

In a Unix-type system, a message queue (msgque) is a mailbox where the order of message arrival is maintained and senders and receivers are processes. The global msgque table has entries that describe all the message queues currently in existence in the system.

Figures 1, 14A:
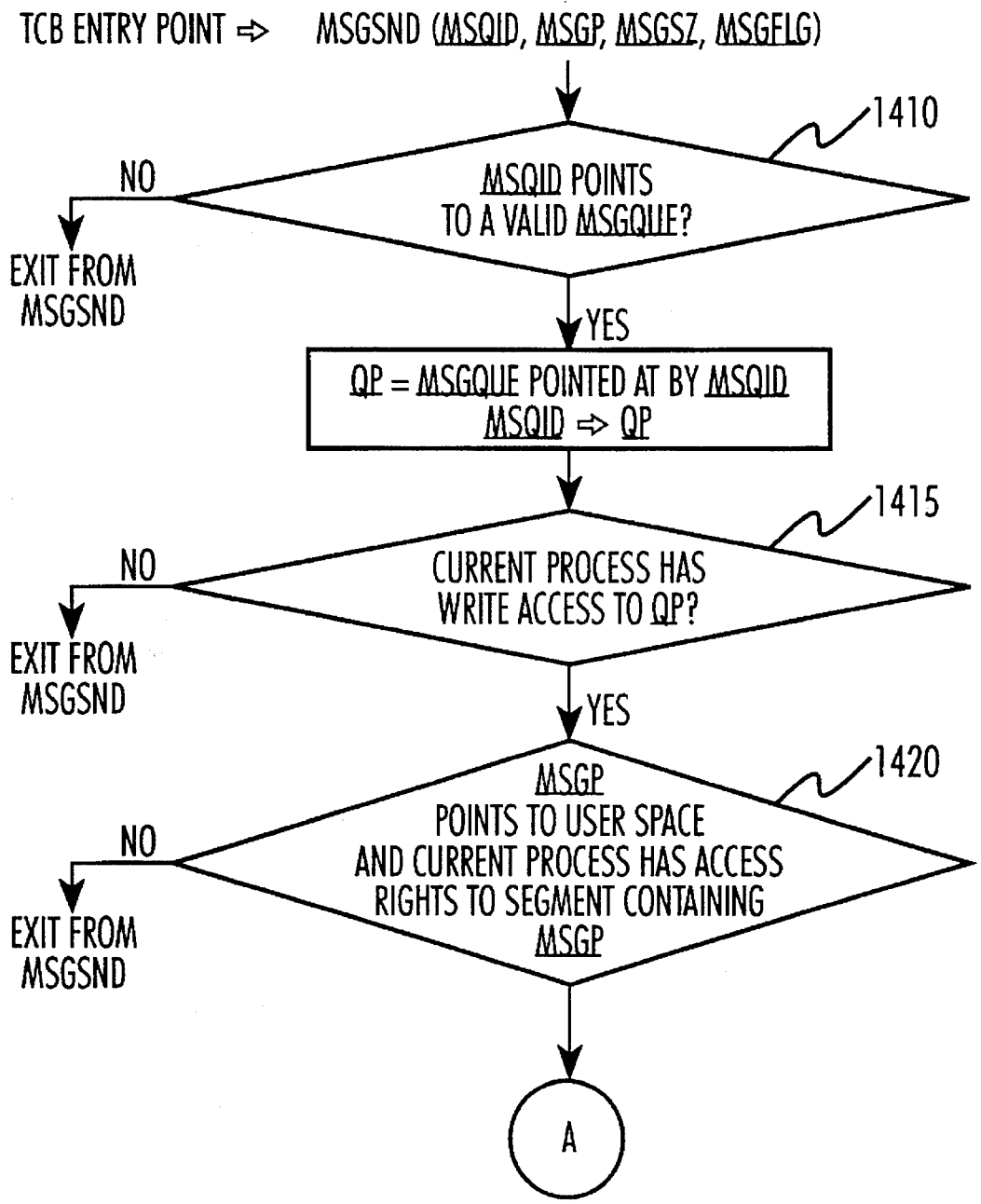
Figures 2, 14A:
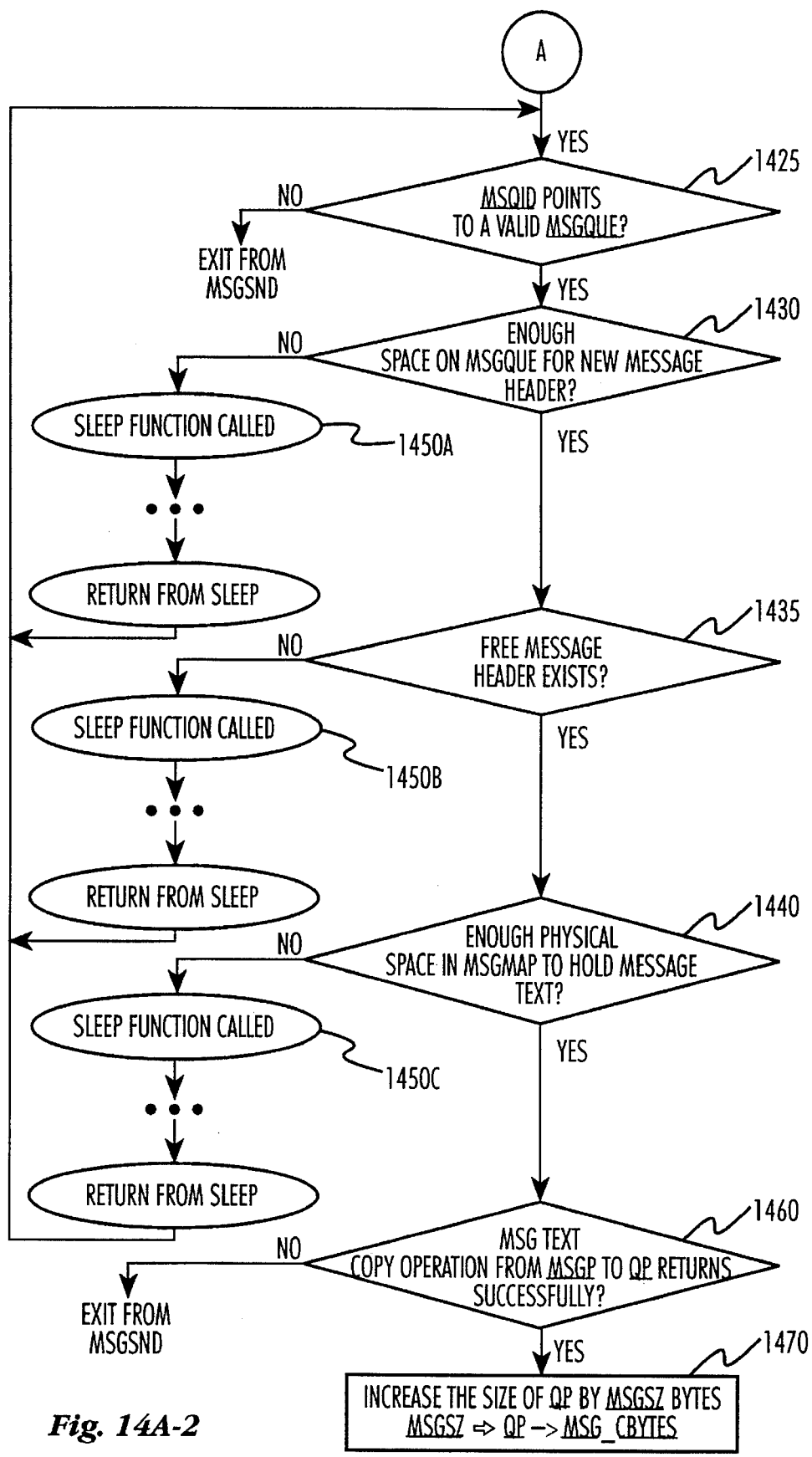
Figure 14B:
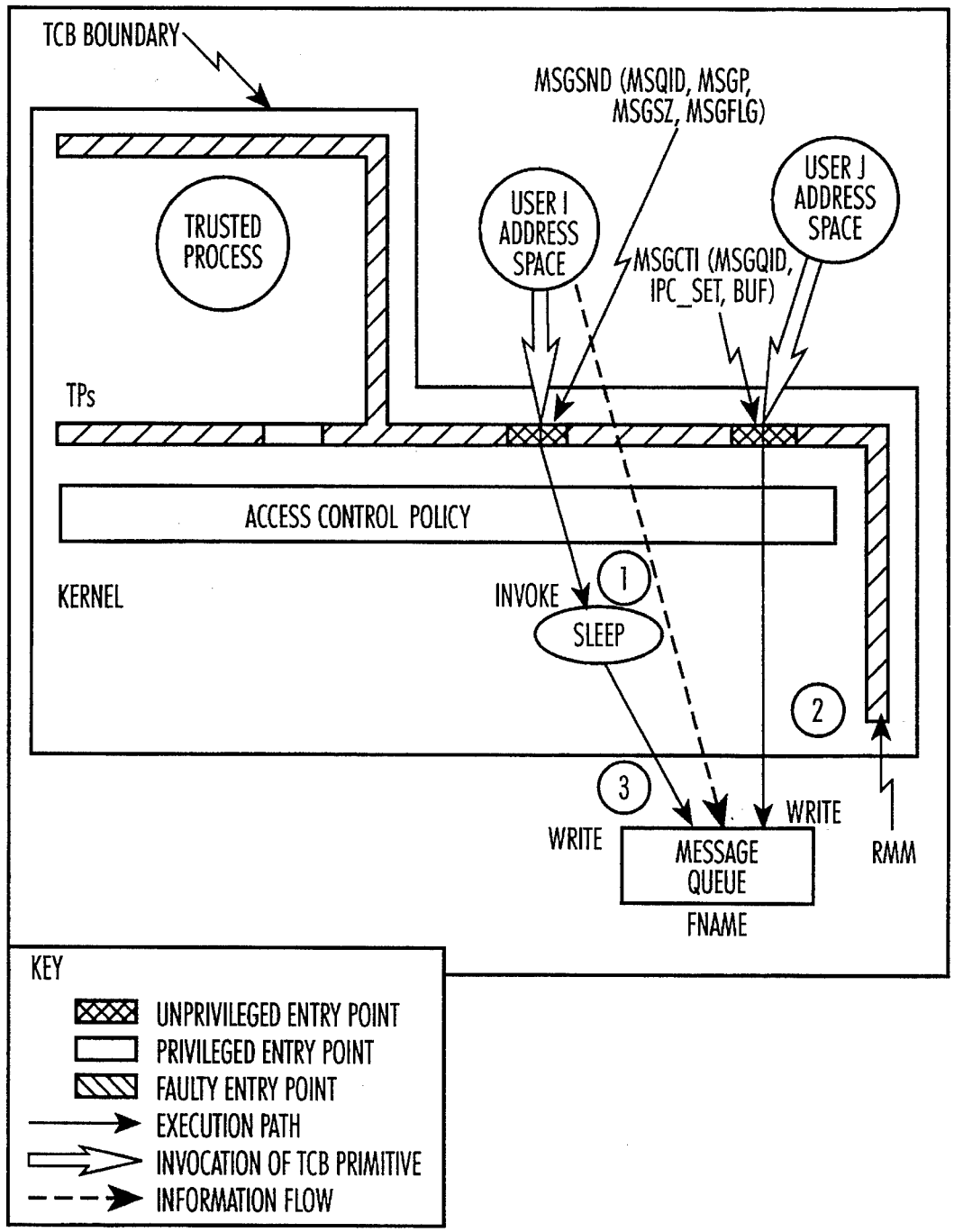

In FIGS. 14A-1 and 14A-2, an integrated flow path originating at the msgsnd system call and leading to an alteration of the message queue table is illustrated, and the resulting scenario of penetration. This system call is used to send a message to a queue identified by parameter msqid. Parameter msgp points to a data structure containing the message type and the message text; msgsz specifies the size of the message text in bytes; msgflg specifies the action to be taken when certain error conditions occur.

In blocks 1410 and 1415, the system checks that msqid points to a valid message queue and that the calling process has write access to that message queue, respectively. Memory location msgp (which has to be read from) is then validated to lie within user space readable by the calling process, as indicated in block 1420. The system then checks for availability of the three types of resources necessary to add the new message to the message queue, namely, i) there is enough space on the message queue to add the new message (block 1430), ii) there is a free message header available (block 1435), and iii) there is enough physical space in the message map to hold the entire message text (1440). If any one of these resources is not currently available, the system goes to sleep waiting for the resource to become available, as indicated in blocks 1450a, 1450b, and 1450c. Once it returns from sleep the system checks to see if the message queue still exists before going on, as indicated in block 1425. In fact, only when all the resources become available and the message queue is checked to still be in existence, will the message actually be put on the queue. At that time, the size field of the message queue (global variable msgque→msg_cbytes) will be altered along with several other fields.

The validation check for the write access to the message queue is performed early in the execution path. This check is required, however, for the altering flow to the global variable msgque msg_cbytes. Since the process can go to sleep several times between the access check and the actual information flow, the effect of this validation check is not assured at the time the flow occurs. Thus, this integrated flow path violates the property of timing consistency of validation checks. It is possible that at the time of message queue alteration, the access rights of the message queue have been changed (by another user process invoking the msgctl system call) while the calling process slept, and the calling process no longer has write access to it.

This experiment shows a scenario where the timing consistency of a validation check is not properly enforced by the Reference Monitor Mechanism, leading to a scenario of Reference Monitor as well as TCB penetration.

(b) Experiments on Trusted Process code

Experiment 7. Timing Inconsistency in trusted process mkdir: In this experiment, a scenario where a potential timing inconsistency exists within a trusted process is illustrated. In Unix-based systems, the kernel maintains consistency mainly through a discipline of non-preemption. Trusted processes, however, do not enjoy the luxury of non-preemption and hence need other methods such as locks and ignoring signals to maintain timing consistency of the condition checks.

Figure 15A:
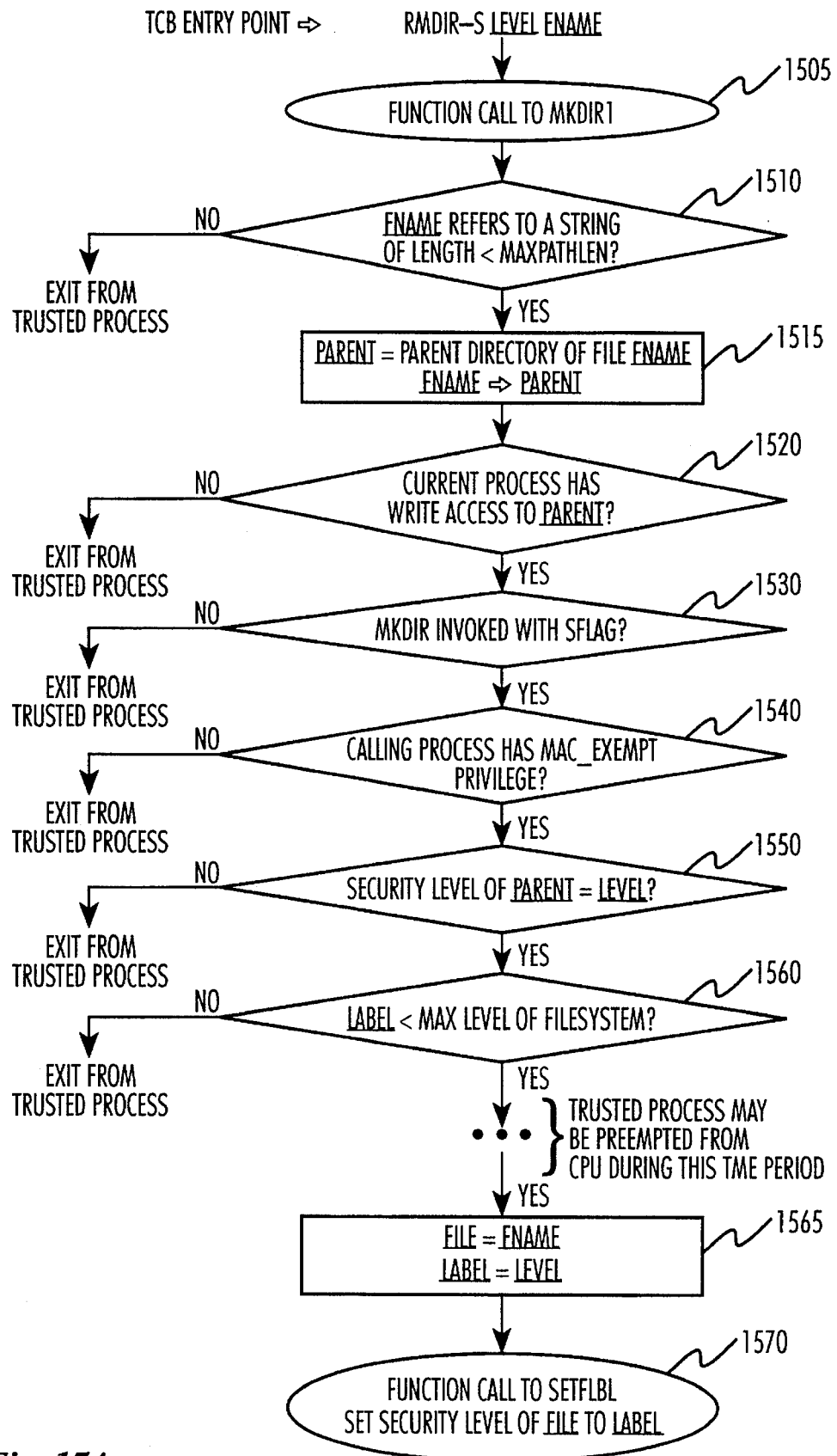
FIG. 15(a) and FIG. 15(b) illustrate the integrated flow path that causes timing inconsistency in trusted process mkdir and the penetration scenario that results from it.
Figure 15B:
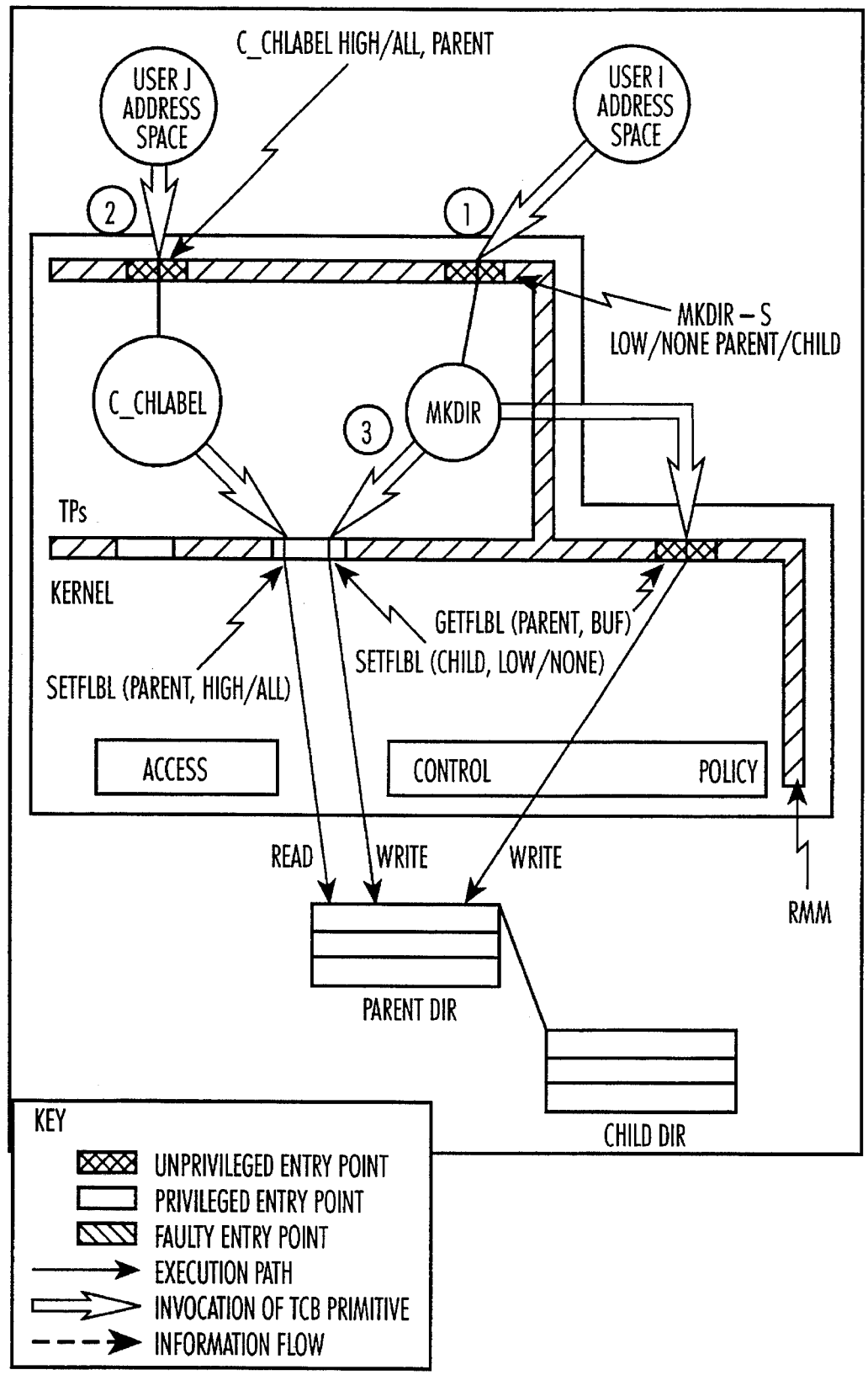

In FIG. 15(a) and FIG. 15(b), illustrated is the integrated flow path that causes timing inconsistency in trusted process mkdir and the penetration scenario that results from it. The trusted process mkdir is used to create directories in the filesystem hierarchy. One or more directories may be created depending on the number of arguments supplied. There is a −s (security) option which allows the invoker to create directories with a specified higher security level, not lower than the level of the parent directory and not higher than the file system maximum security level. System call setflbl allows a privileged user to set the level of a file to any arbitrary value.

In this integrated flow path, the trusted process mkdir is invoked with one directory argument fname and the −s option with option argument level. That is, mkdir is requested to create a directory named fname with security level level. As shown in FIG. 15(a), the length of the string given by argument fname is checked in block 1510 to be shorter than the maximum allowable length for a directory. Then, write access to the parent directory (of fname) is checked for the calling process, as indicated in block 1520. Block 1530 checks if the −s flag is specified. Next, block 1540 checks if the calling process possesses the MAC_EXEMPT privilege. If blocks 1530 and 1540 answer in the affirmative then security level level is validated to be equal to the security level of the parent, as indicated in block 1550, and no higher than the filesystem maximum level, as indicated in block 1560.

These compatibility checks ensure that the security level hierarchy in the filesystem (where the security level of a parent is no higher than the child, and the filesystem maximum level is no lower than the level of the files within it) is maintained. Then after a number of other operations-that actually create the new directory fname and initialize it-system call setflbl is invoked to set the security level of the new directory to level, as shown in block 1570. Since trusted processes are preemptible, it is obvious that in the integrated execution path shown in FIG. 15(a), the mkdir process can be preempted between the security level compatibility check and the call to setflbl. It is quite possible that another process takes control of the CPU within this time interval and raises the security level of the parent directory so as to make it higher than level. However, when mkdir regains the processor, it calls setflbl in privileged mode and sets the level of fname to level, which is now higher than the level of the parent directory, thus directly violating the access-control policy of the system. To maintain timing consistency, mkdir should have placed a write-lock on parent while performing the compatibility check and then calling setflbl to set the label of fname.

The timing inconsistencies of this experiment causes a violation of access control of the TCB without violating the requirements of the Reference Monitor Mechanism. This is the case because the timing inconsistency occurs in a trusted processes access which, in fact, legitimately circumvents the Reference Monitor validation checks.

Experiment 8. Timing Inconsistency in Trusted Process rmdir: This experiment reveals another timing inconsistency in a trusted process that leads to a penetration flaw. Here we have a TCB penetration without a penetration of the RMM, for the same reason as that with Experiment 7; i.e., the trusted process causing the timing inconsistency legitimately circumvents the Reference Monitor validation checks.

Figure 16A:
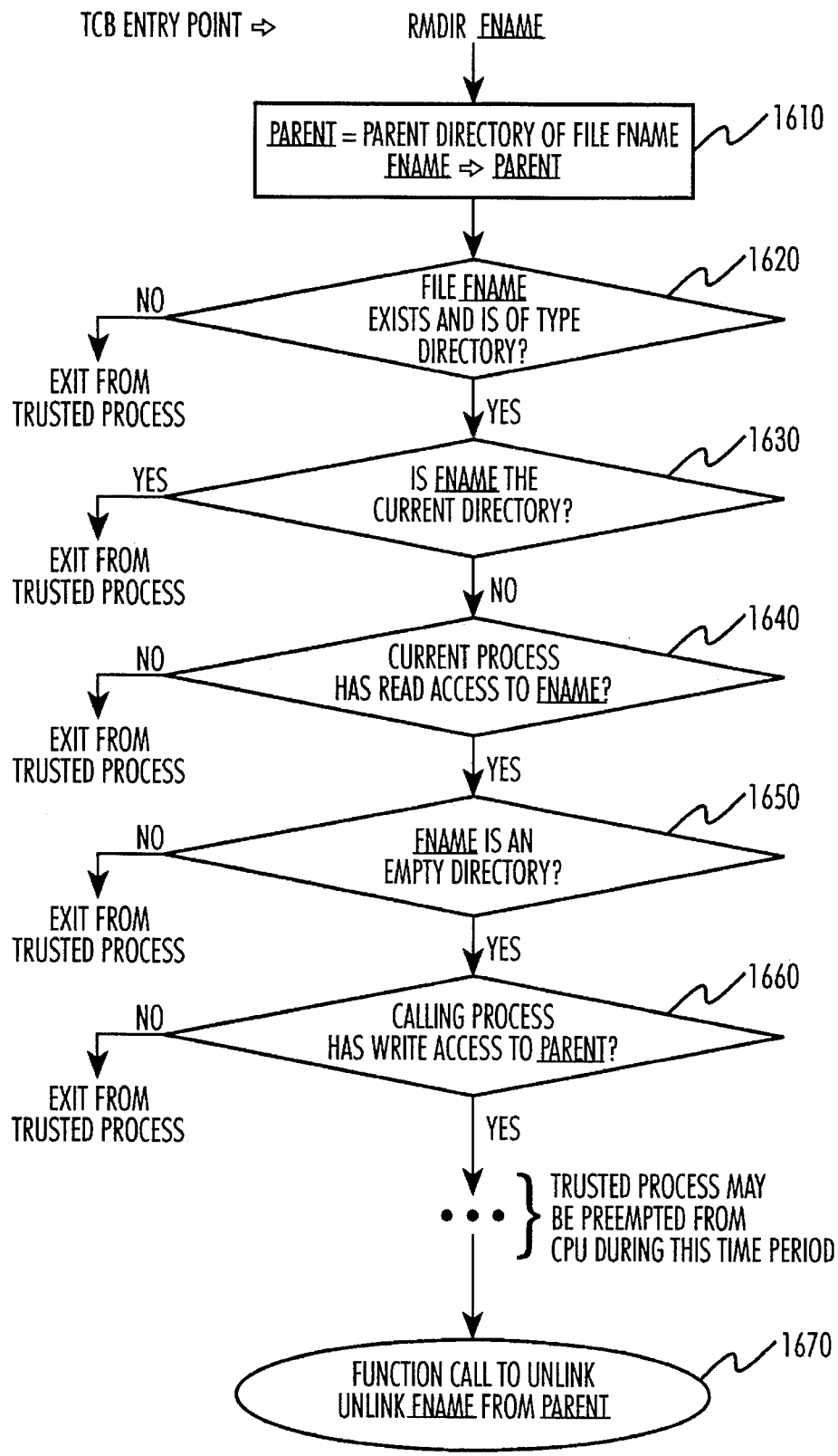
FIG. 16(a) and FIG. 16(b) illustrate a flawed function-flow path within the trusted process rmdir and the penetration scenario that rusults from it.
Figure 16B:
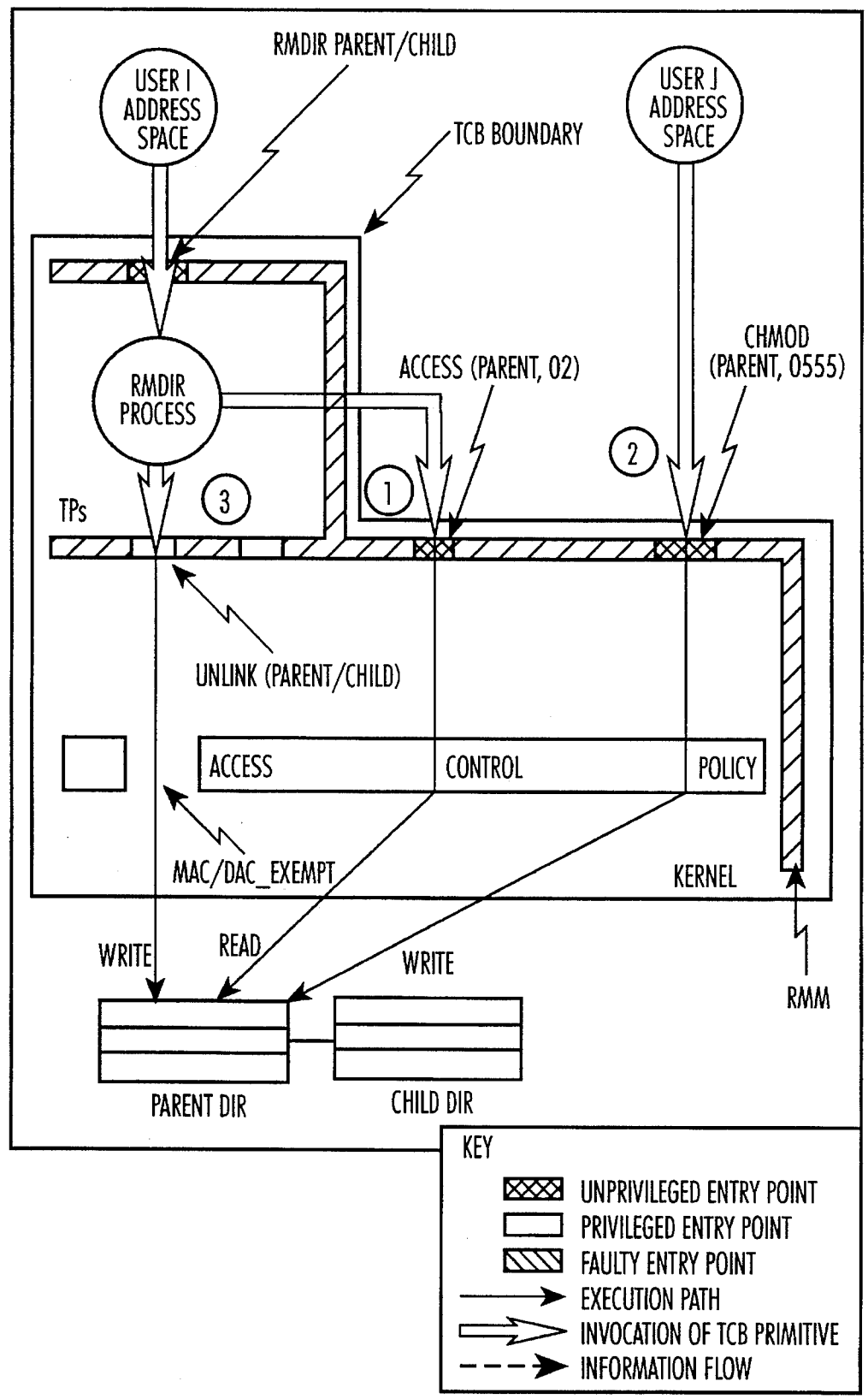

In FIG. 16(a) and FIG. 16(b), a flawed function-flow path within the trusted process rmdir is illustrated. The trusted process rmdir is used to remove one or more directories specified as user parameters. In the figure, rmdir is given a single parameter fname (or parent/child) specifying the directory that is to be removed, as indicated in block 1610. The trusted process checks whether the supplied filename exists, as shown in block 1620. Next, the process checks whether the directory is identical to the current directory, as indicated in block 1630. It then checks for read access to fname, as indicated in block 1640, and reads the file to check if it is an empty directory, as indicated in block 1650. If so, write access to the parent directory of fname, parent, is checked, as indicated in block 1660. If present, fname is removed from the filesystem by unlinking it from its parent, as shown in block 1670.

The integrated execution path shown in the FIG. 16(a) leads from the rmdir trusted process interface to a function call (or function flow) to the unlink system call. unlink writes into a directory and, hence, it checks the write access for all non-privileged processes invoking it. However, rmdir is a privileged process with the MAC_EXEMPT and DAC_EXEMPT privileges, hence, the access check modules inside the kernel are bypassed by unlink in this situation. Thus, when unlink is invoked in a privileged mode, it requires that a write access check be performed in an atomic sequence with the invocation of unlink to maintain timing consistency of the access check. Since trusted processes are preemptible, it is obvious that in the integrated execution path shown in FIG. 16(a), the rmdir process can be preempted between the access check and the call to unlink. It is quite possible that another process takes control of the CPU within this time interval and changes the access permissions on parent. However, when rmdir regains the processor, it calls unlink in privileged mode and writes into a directory to which it may no longer have write access. To maintain timing consistency, rmdir should have placed a write-lock on parent while checking for write access and then calling unlink to write into parent.

Figure 17A:
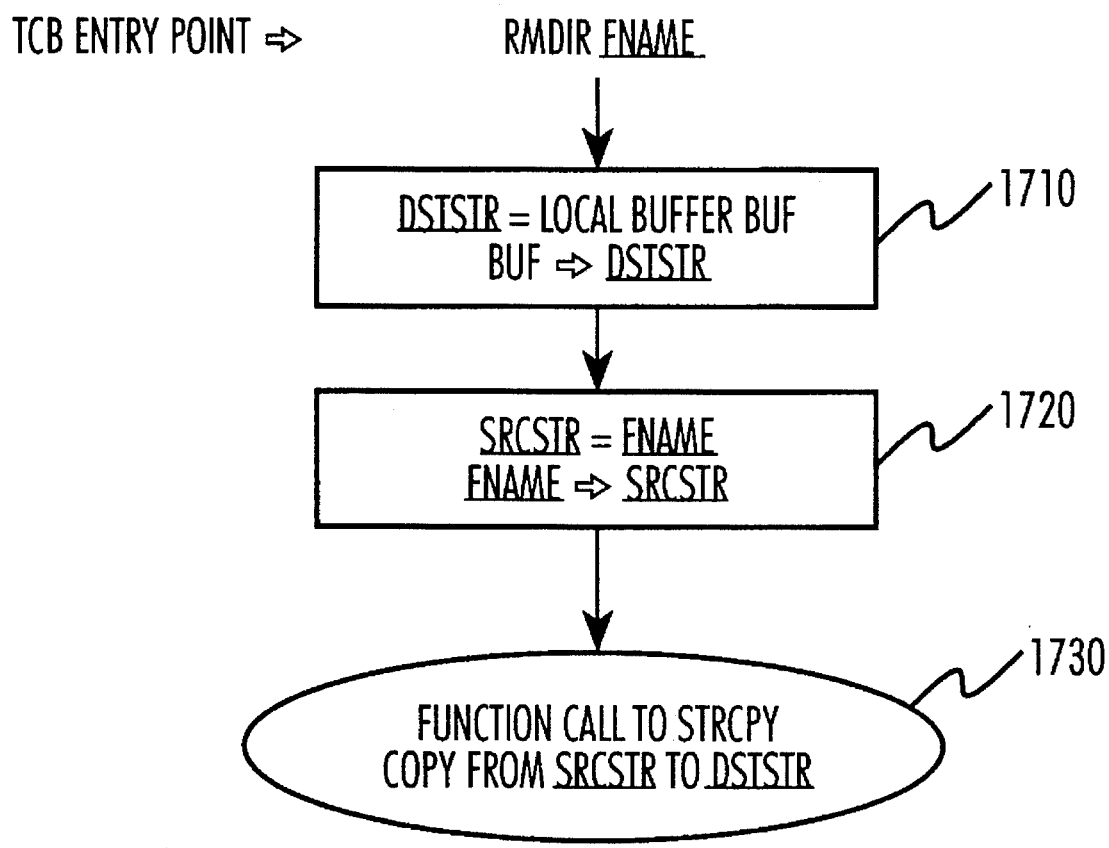
FIG. 17(a) and FIG. 17(b) illustrates a penetration scenario caused by inadequate parameter checking at a trusted process interface.
Figure 17B:
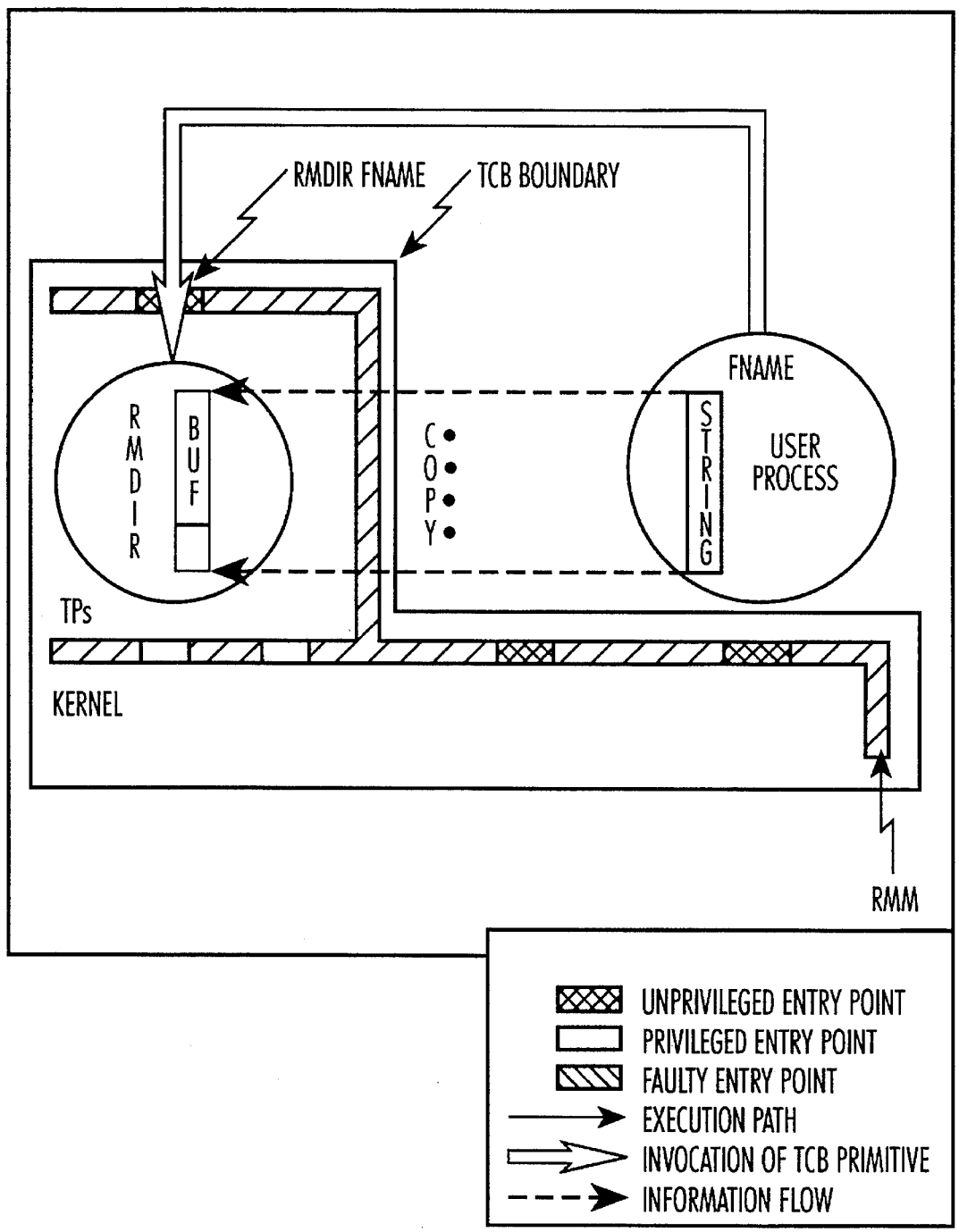

Experiment 9. User Parameter Validation Error in Trusted Process rmdir: This experiment revealed a penetration scenario caused by inadequate parameter checking at a trusted process interface. In FIG. 17(a) and FIG. 17(b), rmdir is also given a single parameter fname which points to a string that specifies the name of the directory that is to be removed. The first action of the trusted process is to copy the string referenced by fname into a fixed length local buffer buf allocated on the user stack, as indicated in blocks 1710 and 1720. This is done by invoking the subroutine strcpy, as indicated in block 1730, which copies one string to another without checking if the length of the second string is large enough to accommodate the first string. The subroutine strcpy presupposes that adequate length checking of the arguments to strcpy was done.

This experiment illustrates a case of inadequate parameter validation by a trusted process, since a user specified parameter was not checked to be within the range of length allowed by the system, before being copied into a fixed length buffer on the process stack. The result is that buf may be overflowed and a false frame is created on the trusted process stack. This false frame can specify any arbitrary address as the return address of a function call. Since rmdir has special privileges, the penetrator can cause any code to be executed with the special privileges of rmdir.

Note that the validation of the string length could not have been performed by the Reference Monitor code since that validation if trusted-process-call dependent; i.e., only the trusted process knows the maximum size of the buffer, bur, meant to receive the user-specified string. Thus, only the TCB, and not the Reference Monitor Mechanism could eliminate this penetration flaw.

VII. Using the Penetration Analysis Method—General Observations (1) Scope of Penetration Analysis The boundary of a system that is subject to penetration analysis can be viewed as the boundary of a Trusted Computing Base (TCB) defined to contain the "security relevant portions of a system" (National Computer Center, *Trusted Computer System Evaluation Criteria,* DoD STD-5200.28, (December 1985). Thus, in addition to the access-control policy modules, which are encapsulated by the Reference Monitor Mechanism, the TCB usually contains other security relevant modules, such as those for audit, identification and authentication, and trusted path.

The concept of a reference monitor was introduced in the Anderson report (Anderson, J. P., *Computer Security Technology Planning Study,* Volume 2, NTIS: AD-772 806, NTIS (October 1972)) to be an element of a secure system "which enforces the authorized access relationships between the subjects and objects of the system." The Reference Monitor Mechanism (RMM) is required to be (i) tamperproof, (ii) always invoked, and (iii) small enough to be verifiable. Since the RMM only refers to the access control policy, and its verifiability is only with respect to the in-variants of that policy, the RMM can be viewed as being a strict subset of the TCB. The RMM tamperproofness and noncircumventability provide assurance regarding the integrity of the RMM and, implicitly, of the RMM implementation of the access-control policy.

It has been commonly believed that if the RMM tamperproofness and noncircumventability requirements are supported in a TCB, then the penetration-resistance of the entire TCB can be asserted. However, the experiments presented in Section VI show that penetration resistance of a TCB cannot be guaranteed by these RMM requirements alone, even if we assume that other system policies and mechanisms (e.g., identification and authentication, audit) are penetration resistant. (It should be obvious that one could penetrate the identification and authentication mechanism without penetrating the RMM; e.g., via password attacks.) This is the case for, at least, the following three reasons:

—TCB penetration may be caused (1) by references which alter internal variables that are not part of any object, or (2) by users' invocations of the TCB that cause a critical internal TCB function to be invoked (viz., Experiments 1 and 5). Therefore, the RMM cannot mediate these accesses since, by definition, it can only mediate subjects' access to objects (viz., Experiments 2–4);

—TCB penetration may be caused by flawed implementation of the penetration-resistance properties in trusted processes that may, otherwise, legitimately bypass the RMM (viz., Experiments 7 and 8). In such cases, the RMM is, by definition, unable to mediate these accesses;

—TCB penetration may be caused by inadequate context-dependent checking of parameters by trusted processes (viz., Experiment 9). In such cases, the RMM is unable to enforce TCB isolation properties, by definition, since it cannot be expected to understand context dependencies of trusted processes.

Experience with the penetration analysis method described above shows that the set of penetration-resistance properties for a TCB are a strict superset of the RMM requirements, and these properties have to be observed to ensure the security of the TCB and entire system. Furthermore, the tamperproofness and noncircumventability properties of a system (e.g., TCB) are a strict superset of the TMM requirements, in the sense that they apply to the whole TCB as opposed to only the RMM. Thus, a penetration scenario caused by a violation of (1) consistency of global system variables, (2) timing consistency of validation checks, and (3) undesirable system/user dependencies, may illustrate TCB penetration without RMM-penetration.

(2) Validation-Check Dependencies on Design and Programming Disciplines

The validation checks that should be included in a system's source code (and specified for use by the FDM 550) depend on both the design and programming disciplines used in system development. Design-level validation dependencies are common to most operating systems, whereas programing-level dependencies are specific to the actual disciplines used. Identifying both of these types of dependencies is important for the correct (automated or manual) generation of validation-check specifications for use by the FDM 550. Without the benefit of a correct set of validation-check specifications, the penetration analysis process loses precision.

Validation checks for penetration resistance are of two major types: interface validations involving parameters and privileges at the TCB interface, and functional (correctness) validations required elsewhere within the system. Typically, the isolation property dictates the validations required at the interface, whereas the other properties determine the validations required elsewhere.

(a) Examples of Design-level Dependencies

The penetration analysis experiments reveal several types of design level dependencies of validation-checks. Combinations of such dependencies may arise in specifying validation checks for individual system calls.

Call-Dependencies of Validation Checks: Validation checks (or condition check statements) required by penetration-resistance are sometimes dependent on the particular system call in which they occur. For example, in Unix, the global variable inode may be altered via both the mknod and write system calls. Due to the difference in the semantics of the two system calls, however, write alters an inode that already exists, whereas mknod alters an inode it has just created on behalf of the user invoking the systemcall. Thus, the validation-check specification for the altering flow through write must state that a validation of the write access to the inode is required (based on some policy (Note that the policy under which the access is deemed valid is irrelevant to whether the validation is performed)). In contrast, the validation-check specification for the altering flow through mknod will not include this write access check. Validation checks that depend on the system call in which they occur are named "call dependent." It should be obvious that all interface validations are call dependent, since the very definition of the parameters and privileges are implicit within the system call in which they occur. However, functional validations may or may not be call dependent.

Type-Dependencies Validation Checks: Validation checks may also be dependent on the type of object the system kernel) is working on or on the type of command/argument specified at the user interface. For example, within the Secure Xenix system call semctl, user parameter are specifies a pointer to a buffer to be either read or written depending on the value of the parameter cmd. If cmd is equal to IPC_SET, the system call reads from the buffer, and hence a validation check for reading from the buffer is required (based on some policy); whereas if cmd is equal to IPC_STAT, the system call writes to the buffer, and hence a validation check for writing to the buffer is required (based on some policy). Thus, depending on the type of the parameter cmd, the parameter arg is validated in different ways and, thus, different validation specifications must be provided. Similarly, in the system call aclquery of Secure Xenix, which queries the access control list of an object, the validation checks are different for different object types specified via the user interface. This kind of dependence of a validation check is termed "type dependence."

Since "call dependence" and "type dependence" are both related to the context in which the user is requesting service from the kernel, we will group them together as context dependence. In general, validation-check specifications may be either "context dependent" or "context independent" (see FIG. 18). The "context" of those specifications is provided by an execution path, which is determined by the kernel entry point and the entry point parameters.

Figure 18:
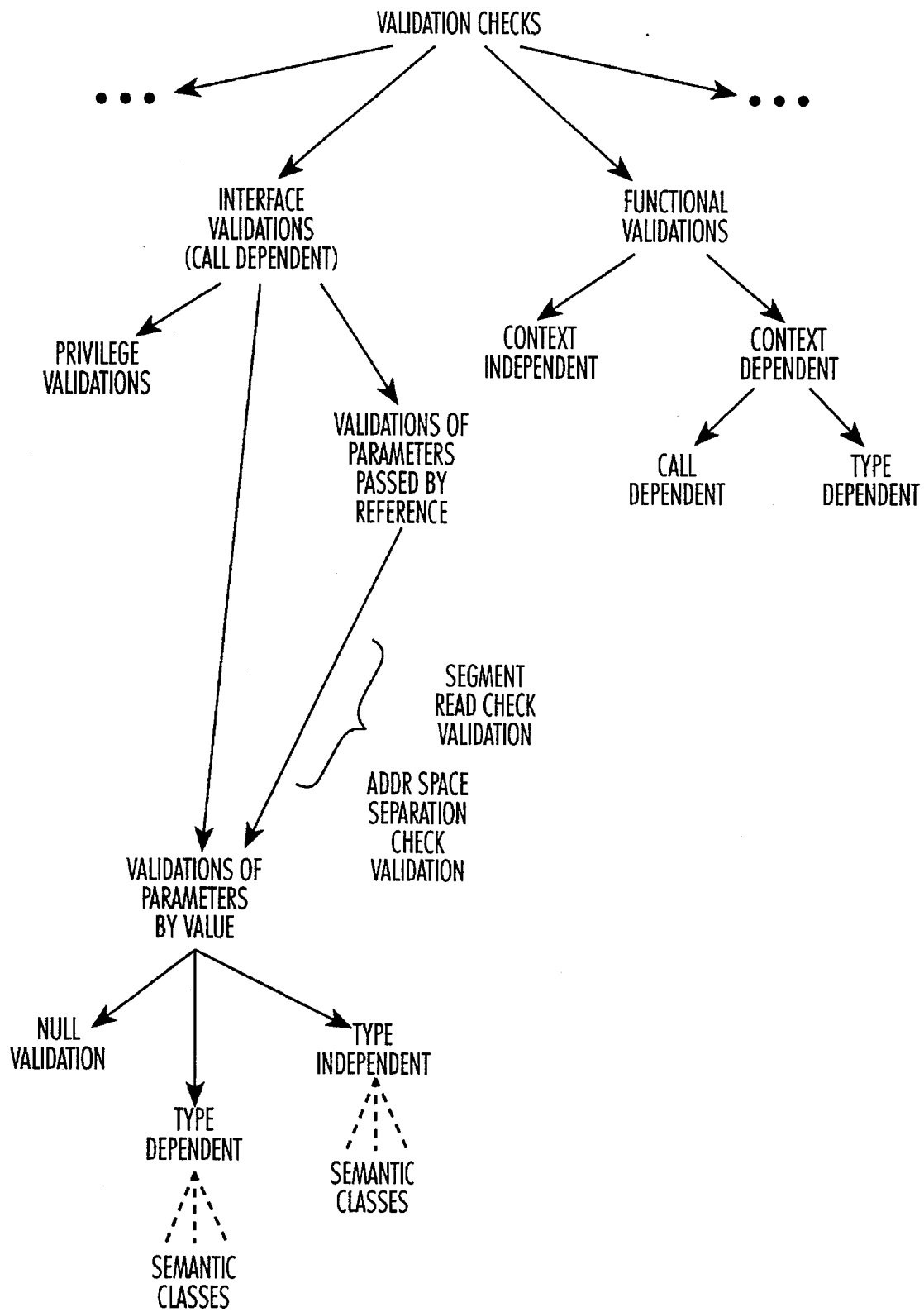
FIG. 18 shows examples of validation-check dependencies.

Dependencies of Interface Validations: The validations required at the user interface include, (i) parameter validations, (ii) privilege validations and (iii) user/kernel address space separation checks. System call parameters can be passed either by value or by reference. The latter type of parameters have to be read into system space to convert them to parameters by value. During the reading in of these parameters, the system should check for (segment) read access as well as whether it is reading from the address space of the invoker, as illustrated in FIG. 18. Parameters passed by value can be further classified as either "type independent" or "type dependent" (e.g., parameter arg in semctl), or as requiring no validation whatsoever (e.g., when a parameter specifies a numerical value that has no legality bounds associated with it).

Semantic Dependencies of Parameter Classes: During the analysis of the parameter validation for the Secure Xenix kernel, it has been determined that it is possible to classify the system call parameters based on call semantics, and that, in the majority of cases, parameters belonging to the same semantic class are validated in an almost identical way. Such classification simplifies the process of generation of the set of parameter validations that need to be performed at the user interface. For example, in Secure Xenix, there are a large number of system call parameters that specify a filename in the form of a character string. Every single such filename parameter is validated in exactly the same way (through the internal function namei) to ensure that the string indeed represents a valid filename in the system and that the calling process has search access to all the directories in the pathname. Similarly there are other obvious semantic classes such as read and write buffers, file descriptors, message or semaphore identifiers.

Theoretically, every single system call parameter can be placed in a semantic class and the interface validations required for each such class can be clearly specified. When a complete set of semantic classes is obtained, the automated analysis of system call parameter validation becomes possible for a given system by making the specifications of the required validation checks available to the Automated Penetration Analysis tool 500.

Semantic classes with a large number of members are especially suitable for automated analysis. However, some of the semantic classes will have a single member, and hence, in those cases, automated analysis will involve as much effort as manual analysis of the source code. System call parameters that are type independent can usually be placed in large-sized semantic classes. In contrast, type dependent parameters are the ones that are the most difficult to classify and usually belong to single member semantic classes.

(b) Examples of Programming Discipline Dependencies for Trusted Processes

Explicit Object Sharing Among Trusted Processes: Trusted processes of Secure Xenix, and those of most Unix systems, rarely interact with each other except inside the kernel via system calls. Shared global variables between trusted processes exist in a few cases but, in general, trusted processes share no global variables, except in the form of shared (system) objects such as files, pipes, and these objects are shared through system calls. Since the kernel is analyzed for penetration-resistance separately, trusted processes that share no global program variables can be analyzed as separate entities. However, trusted processes that do share global program variables amongst themselves (such as the "lp" subsystem commands) must be analyzed collectively as a subsystem. Their relationships with respect to the shared objects must be explicitly defined such that the required validation checks can be specified.

Explicit Parameter Passing to Trusted Processes

Parameter Passing: Unlike the user specified parameters of kernel cells, the user-specified parameters of trusted processes are not as easily identified syntactically in the code. This is because a single variable might specify a string of parameters passed by reference. When these parameters are validated, the validation condition statements refer repeatedly to the same string identifier (the pointer to the string identifier is advanced successively to refer to the successive parameters referred by the string). Thus, it becomes very difficult to uniquely identify the individual user parameters, and hence to derive the syntactic form of the penetration-resistance specifications, whenever parameter passing is not explicit.

Interactive Input: Many user parameters to trusted processes are input interactively from the user interface and are copied into local variables of trusted processes before validation. The identification of which local variables receive user-specified values via interactive input should be explicit. Otherwise, deriving the penetration-resistance specifications becomes as difficult as analyzing the source code manually and is hence not cost effective.

Explicit Specification of Trusted Process Protection Mechanisms: The majority of the protection mechanisms used by the trusted processes depend on properties possessed by the executable modules of trusted processes and are not always apparent by an analysis of the code. Such mechanisms include setuid/setgid mechanisms, special.users and groups (representing administrative roles) with discretionary access to special administrative files and data structures, and special privileges which are endowed directly (and not explicitly acquired). The use of such mechanisms in trusted processes should be made explicit. Otherwise, a potentially large number of extra facts must be manually fed into the FDM 550 thereby reducing the degree of automation possible.

Whenever trusted processes are relatively small (in terms of lines of source code) it may be easier to perform the flaw detection manually by assuming that the trusted process is endowed with power which is not obvious through code inspection. In such cases, automated analysis of trusted processes may not always be cost effective. In these cases, trusted processes can be analyzed manually using the model and the penetration-resistance properties as guidelines.

(3) Interpreting the Penetration-Resistance Properties

To generate penetration-resistance (i.e., validation-check) specifications at the source-code level of a system, we must interpret the abstract penetration-resistance properties discussed in Section II above in source code. In conducting the experiments presented in Section V, it was determined that instead of trying to interpret the abstract properties in the source code directly in a single step, it is easier to first interpret these properties using internal design-level specifications. This additional step allows the present invention to generate a set of concrete properties from the abstract properties, through a study of the system documentation, and then to interpret these concrete properties in the source code. The interpretation of the abstract properties and the of integrated flow paths could be used to determine whether validation checks in source code satisfy the abstract properties. This approach would be advisable when an attempt is made to formally verify the penetration-resistance properties of a kernel.

System Isolation: Validation of system call parameters refers to legality checking of user specified parameters. This usually involves checking identifiers specifying system objects and path-names, address space separation checking for segment selectors, range checking for numerical values, etc. FIG. 7 illustrates a system call parameter validation flaw, where the user supplied parameter buf is not validated (to point to a readable segment in user space) before it is used as an argument to internal function copyseg which performs a copy operation between memory segments.

The semantics of a system call may dictate the type of check required. Parameter validation checks are necessary to ensure that the system does not behave abnormally even if supplied with unexpected or unallowed parameters. For system calls that may be invoked only by users possessing special privileges, privilege checking must be done (e.g., as illustrated in FIG. 13(a), the calling process must possess the PRIV_MOUNT privilege in order to execute the smount system call).

System call parameters can be classified by call semantics as well as by type dependence. Parameter fname in FIG. 11(a) and parameters spec and dir in FIG. 13(a) are context independent parameters belonging to the same semantic class of filename strings. Validation checks are not required for parameters rwflag of FIG. 13(a) and msgflg of FIG.

14(a). Parameter addr in FIG. 12(a) is context independent and belongs to the semantic class of write buffers and so on for the other parameters.

Whenever the property of isolation is applied to the trusted processes, it mandates the validation of user-supplied parameters (e.g., length checking) and of privileges for the invocation of privileged functions. generation of design-level (concrete) properties in the context of Secure Xenix is illustrated below. For example, the abstract property of ncncircumventability can be interpreted to generate the properties of inter-process signaling and inode alterability, among others. These design-level, penetration-resistance properties can then be used to derive the set of validation-check specifications for verifying that the actual source-code level checks for alter/view/invoke accesses are correctly performed within the system.

The process of interpreting abstract penetration-resistance properties in design- level specifications and then in source code is analogous to that of performing model interpretation in a systems' descriptive/formal top-level specifications (DTLS/FTLS) and source-to-code correspondence. However, the DTLS/FTLS differ from the design specifications need for interpreting penetration resistance properties. In general, the DTLS/FTLS are intended to define the system behavior in terms of user-level objects (e.g., processes, files, directories) and, therefore, do not include specifications of internal system behavior. Thus, DTLS/FTLS are usually not detailed enough to reveal the flaws that cause system penetrability. For example, no amount of analysis at the DTLS/FTLS level documentation would have revealed the timing consistency flaw illustrated in Experiment 6, or the use of copyseg to copy to/from a user supplied address illustrated in Experiment 4. Instead of DTLS/FTLS, internal system specifications should be used to derive the concrete properties of penetration- resistance from the abstract properties.

Figure 19:
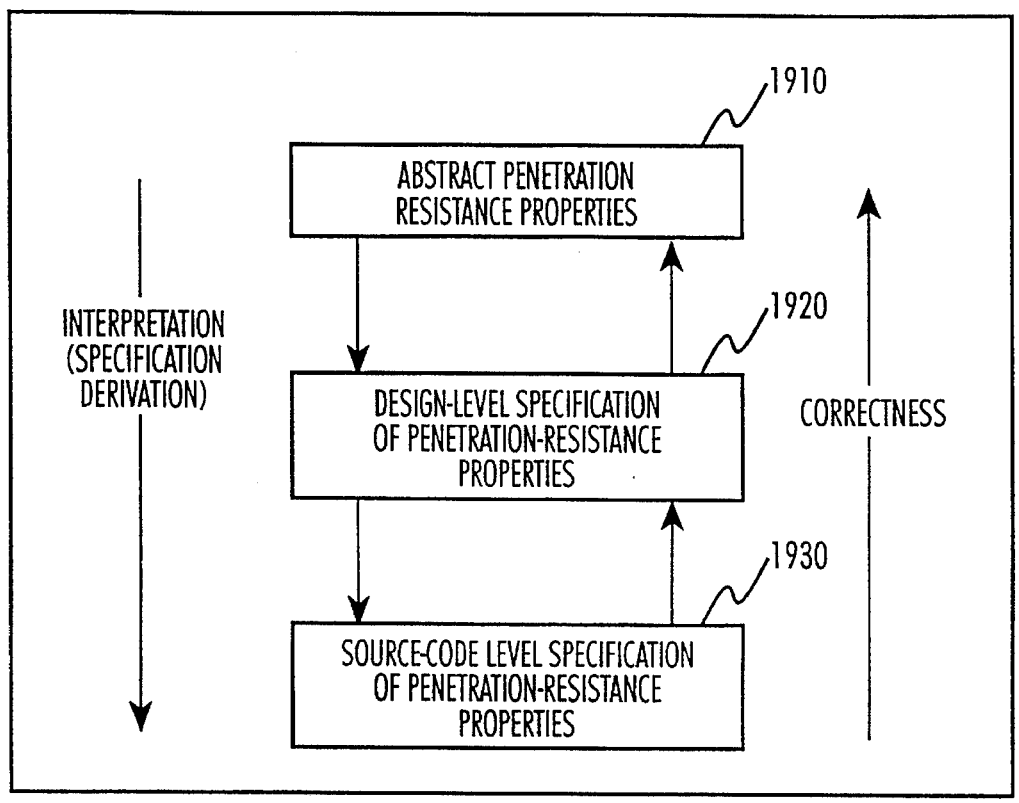
FIG. 19 is a flowchart illustrating an example of a derivation of penetration resistance specifications.

Referring to FIG. 19, the penetration analysis of a given system can be done in either of two ways. You can start from the abstract properties to generate the concrete properties, which in turn may be used to generate the set of required source code level checks. This is the approach adopted in developing the Automated Penetration Analysis tool implementation, where the method of the present invention ensures that the required checks are indeed present in the integrated flow paths. Alternately, the set System Noncircumventability: The property of noncircumventability is exhibited within operating system kernels in various ways. For example, in Secure Xenix, reference to object status variables is equivalent to access to the various fields within the inode structure for a file; reference to object contents is equivalent to invoking internal functions readi and writei; and reference to object privileges can be thought of either as read/write access to the access control list (ACL) file, or access to the mode field of the inode variable. Reference to subjects (i.e. subject-to-subject signaling) is the same as access to the signal field within the process structure for the receiving subject. Noncircumventability is maintained in each of these cases if the access involved is preceded by a validation check to verify that the calling process has the adequate access privileges in a time-consistent manner. However, segment read/write validation check for user supplied addresses does not fall under our noncircumventability property; rather, it is a validation check for system-call parameters, and is imposed by the isolation property (which also requires validation checks for user/system address space separation for all user specified addresses).

As illustrated above, validation checks may be context (call or type) dependent, meaning that access to the same variable or internal function may require different access checks based on the "context" of the access. For example, the global proc→p_sig variable may be altered through system calls kill, rexit, and wait. However, interprocess signaling requires that the validation checks involved in each of these altering access paths be different since this is a call dependent check. The proc→p_sig variable is altered through rexit to send kill child-process signal to the parent process. Since in the context of this call it is known that the owner of the parent and child processes is one and the same, this validation check can be, and is, eliminated. Similarly, this validation check is unnecessary when the proc→p_sig variable is altered through the wait system call. This is the case because this variable is altered when the process structure of a "zombie" child is freed, and again, the owner of parent and child processes is one and the same. In contrast, as illustrated in FIG. 10(a), the altering access to the proc→p_sig variable in the context of the system call kill must be preceded by a validation check to verify that the calling process has signaling access to the receiving process since there can be no a priori assumptions regarding the owners of the sending and receiving processes.

The validation check required to alter the contents of a file through invocation of internal function readi is also a call-dependent check. When readi is invoked through system call erece, the system verifies whether the calling process has execute access to the file in question (as illustrated in FIG. 11(a)). However, invocation of readi through the read system call involves checking for the FREAD flag in the file table entry for the given file. Another validation-check example is illustrated in FIG. 14(a), where write access to a given message queue is verified before altering the fields of the message structure for that queue.

In Secure Xenix, some trusted processes are endowed with special privileges to bypass the kernel access-control policy modules (i.e., the MAC_EXEMPT and DAC_EXEMPT privileges). These trusted processes must themselves enforce part of the noncircumventability policy in the bracketed sections of code where they possess these privileges. In other words, the property of noncircumventability translates to access-control policy checks inside trusted processes only in sections of code possessing special privileges that allow the TP to unconditionally "fall through" the kernel policy modules. Validation-check specifications must cover all checks in bracketed code areas.

Consistency of Global Variables: Validation checks that ensure consistency of global variables and tables usually include checking for table overflow and underflow, checking for duplicate table entries, and checking for availability of system resources before allocation. FIG. 13(a) illustrates that the global variable mount→m_dev is altered only after checking that the mount table limits are not exceeded, and that the mount table does not contain duplicate entries. In FIG. 14(a), we see that the global variable msgque→msg_cbytes (the number of bytes on the queue) is altered only after checking that there is available space on that queue to add the new message of the given size.

Validation checks for shared data structures defined only inside the trusted process modules must also be specified. These checks must ensure that the consistency of the shared global data structures is maintained.

Figure 20:
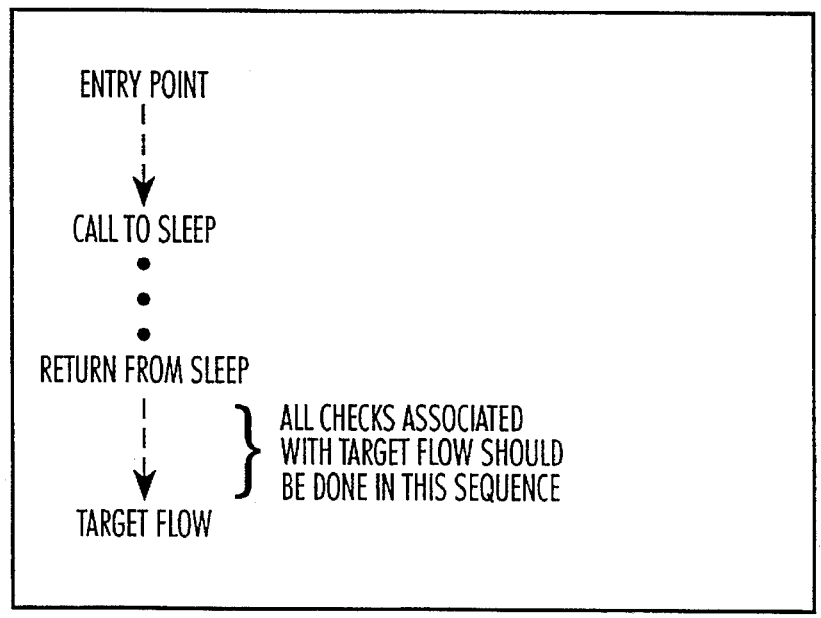
FIG. 20 illustrates the concept of timing consistency in the kernel.

Timing Consistency of Validation Checks: In a Unix type system, a kernel mode process is non-preemptible. In a single processor system, a kernel process relinquishes control of the processor only when it voluntarily goes to sleep or when it terminates. Thus, conditions validated by a kernel process are guaranteed to hold true as long as the kernel has control of the processor since no other process can change the variables involved in the validation check. To ensure timing consistency of validation checks, it is therefore required that all the validation checks associated with an information or function flow be conducted in an atomic sequence with the flow itself; i.e., the process should not invoke sleep in the middle of this sequence (viz., FIG. 20).

The timing consistency property is more difficult to achieve in trusted processes than in kernels of Unix-based systems. In these systems, as in most other operating systems, the kernel maintains timing consistency mainly through a discipline of non-preemption. Thus, while integrated flow paths in the kernel are atomic unless there is an explicit function call to sleep, integrated flow paths within trusted processes are assumed to be non-atomic unless explicit steps are taken to ensure timing consistency of the objects or variables which are involved in the validation checks.

Note that the timing consistency property applies to the validation checks derived from all the other properties and, as such, need not be specified explicitly. The requirement for the timing consistency of the validation checks is derived directly from the penetration resistance model.

Undesirable System/User Dependencies: FIG. 9(b) illustrates an undesirable system/user dependency that exists in an Unix type system where an ordinary user is able to crash the system by directly or indirectly invoking the internal function panic. This is viewed as unsatisfactory, since in a multi-user system, a crash could lead to denial-of-service to other users of the system.

VIII. Conclusion

The Automated Penetration Analysis tool based on the penetration-analysis method described above can be used to detect violations of additional penetration resistance properties. It may also be used for other Unix systems implementing the same set of properties. Furthermore, by merging new flows with old flows, and new checks with old checks of the same system (e.g., TCB), the tool can be used for incremental analysis (of penetration resistance) of updates. Lastly, it can be used for penetration analysis in other applications; e.g., database management systems.

The observations regarding the separability of the policy concerns from those of penetration resistance, and the insufficiency of the reference monitor mechanism in providing assurance regarding penetration resistance of a system, helps delimit the usefulness of the Reference Monitor properties in penetration analysis. Designs of secure systems can also benefit from the observation that the design and programming disciplines of a system have a large impact on the ease (or difficulty) of performing (automated) penetration analysis. Finally, the observation that the assurance process for penetration resistance is similar to that for policy implementations will allow the use of well-accepted assurance techniques for the purpose of penetration analysis.

While the invention has been particularly shown and described with reference to preferred embodiment thereof, it will be understood by those skilled in the art that various changes in form and details may be made therein without departing from the spirit and scope of the invention.

Having thus described our invention, what we claim as new and desire to secure by Letters Patent is:

1. A method for preventing users of a computer system from exploiting system flaws to gain illegal or unintended access to system variables, objects and/or operations, comprising the steps of:

(1) generating a set of interpretation constants by applying a set of penetration-resistant properties to a given system, wherein said set of interpretation constants represent a database of required conditions, parameter validations and privilege checks that are associated with access to each abstract cell and critical function in said given system, wherein said given system has previously been determined to be penetration-resistant;

(2) generating an integrated flow path within said given system which records information regarding flows and condition checks that would be encountered along a given integrated flow path to an alter operation or a view operation on a particular abstract cell or an invoke operation on an internal system function;

(3) applying, in response to said alter operation, said view operation, or said invoke operation, a set of model rules to said given integrated flow path to determine whether said given integrated flow path conforms to said penetration-resistant properties, wherein said model rules are based on said interpretation constants: and (4) allowing said alter operation, said view operation, or said invoke operation to proceed if said given integrated flow path was in conformity with said penetration-resistant properties.

2. The method of claim 1, wherein said interpretation constants include an alter set, a view set, a critical function set, and an entry point set.

3. The method of claim 1, wherein said penetration-resistant properties include (a) system isolation, (b) system noncircumventability, (c) consistency of system global variables, (d) timing consistency of system condition checks, and (e) elimination of undesirable user and system dependencies.

4. The method of claim 1, wherein said integrated flow path is modified if all conditions of an alter model rule are met, said alter model rule comprising the steps of:

(a) determining whether said given integrated flow path includes all required entry point parameter validation checks;

(b) determining whether said given integrated flow path includes all required conditions that need to be checked to alter a given abstract cell; and (c) determining whether all of said required conditions are checked and said given abstract cell is altered in a sequence that does not invoke a sleep function;

wherein said alter model rule is applied when said alter operation attempts to alter said given abstract cell through a system entry point along said given integrated flow path.

5. The method of claim 1, wherein said integrated flow path as modified if all conditions of a view model rule are met, said view model rule comprising the steps of:

(a) determining whether said given integrated flow path includes all required entry point parameter validation checks;

(b) determining whether said given integrated flow path includes all required conditions that need to be checked to view a given abstract cell; and (c) determining whether all of said required conditions are checked and said given abstract cell is viewed in a sequence that does not invoke a sleep function;

wherein said view model rule is applied when said view operation attempts to view said given abstract cell through a system entry point along said given integrated flow path.

6. The method of claim 1, wherein said integrated flow path is modified if all conditions of an invoke model rule are met, said invoke model rule comprising the steps of:

(a) determining whether said given integrated flow path includes all required entry point parameter validation checks;

(b) determining whether said given integrated flow path includes all required conditions that need to be checked before a critical function can be legally invoked; and (c) determining whether all of said required conditions are checked and said critical function is invoked in a sequence that does not invoke a sleep function;

wherein said invoke model rule is applied when said invoke operation attempts to invoke said critical function through a system entry point along said given integrated flow path.

* * * * *